(12) United States Patent
Makhlouf

(10) Patent No.: US 10,368,141 B2
(45) Date of Patent: Jul. 30, 2019

(54) SYSTEM AND METHOD FOR ENGAGEMENT AND DISTRIBUTION OF MEDIA CONTENT

(71) Applicant: Samir B. Makhlouf, Atlanta, GA (US)

(72) Inventor: Samir B. Makhlouf, Atlanta, GA (US)

(73) Assignee: Dooreme Inc., Atlanta, GA (US)

( * ) Notice: Subject to any disclaimer, the term of this patent is extended or adjusted under 35 U.S.C. 154(b) by 0 days.

(21) Appl. No.: 15/684,515

(22) Filed: Aug. 23, 2017

(65) Prior Publication Data
US 2017/0353774 A1 Dec. 7, 2017

Related U.S. Application Data

(63) Continuation of application No. 15/226,810, filed on Aug. 2, 2016, now Pat. No. 9,781,490, which is a
(Continued)

(51) Int. Cl.
*H04N 21/81* (2011.01)
*H04N 21/431* (2011.01)
(Continued)

(52) U.S. Cl.
CPC .......... *H04N 21/812* (2013.01); *G06Q 30/02* (2013.01); *G06Q 30/0241* (2013.01); *G06Q 30/0246* (2013.01); *G06Q 30/0625* (2013.01); *G06Q 30/0643* (2013.01); *H04N 21/222* (2013.01); *H04N 21/2387* (2013.01);
(Continued)

(58) Field of Classification Search
CPC ............... H04N 21/812; H04N 21/222; H04N 21/2387; H04N 21/2542; H04N 21/25883; H04N 21/25891; H04N 21/4312; H04N 21/4314; H04N 21/4316; H04N 21/44204; H04N 21/44222; H04N 21/4667; H04N 21/47205; H04N 21/4722; H04N 21/4725; H04N 21/4755; H04N 21/47815; H04N 21/4784; H04N 21/482; H04N 21/6582; H04N 21/8173; H04N 21/8547; H04N 21/8549; H04N 21/858; G06Q 30/02;
(Continued)

(56) References Cited

U.S. PATENT DOCUMENTS 6,008,803 A 12/1999 Rowe et al.
6,177,931 B1 1/2001 Alexander et al.
(Continued)

OTHER PUBLICATIONS froogle.google.com, entire document, Jun. 24, 2004 (Year: 2004).*
(Continued)

*Primary Examiner* — Hunter B Lonsberry
(74) *Attorney, Agent, or Firm* — Taylor English Duma LLP

(57) ABSTRACT

Disclosed is a system and method for distributing media content. The system can include a processor and a memory coupled to the processor. The memory stores executable instructions for causing the processor to present a mall interface on a display of a user system, detect a user selection of the integrated storefront/internet search, and display customized search result storefronts based on the user selection. The mall interface may include a plurality of storefronts and an integrated storefront/internet search, and the integrated storefront/internet search may include a storefront search and an internet search.

18 Claims, 25 Drawing Sheets

Related U.S. Application Data continuation-in-part of application No. 15/081,353, filed on Mar. 25, 2016, now Pat. No. 9,743,155, which is a continuation of application No. 14/925,409, filed on Oct. 28, 2015, now Pat. No. 9,392,342, which is a continuation of application No. 14/310,018, filed on Jun. 20, 2014, now Pat. No. 9,326,043.

(51) Int. Cl.

| | | |
|---|---|---|
| *H04N 21/478* | (2011.01) | |
| *H04N 21/442* | (2011.01) | |
| *H04N 21/258* | (2011.01) | |
| *H04N 21/4784* | (2011.01) | |
| *H04N 21/2387* | (2011.01) | |
| *H04N 21/466* | (2011.01) | |
| *G06Q 30/06* | (2012.01) | |
| *G06Q 30/02* | (2012.01) | |
| *H04N 21/222* | (2011.01) | |
| *H04N 21/254* | (2011.01) | |
| *H04N 21/472* | (2011.01) | |
| *H04N 21/4722* | (2011.01) | |
| *H04N 21/4725* | (2011.01) | |
| *H04N 21/475* | (2011.01) | |
| *H04N 21/482* | (2011.01) | |
| *H04N 21/8547* | (2011.01) | |
| *H04N 21/858* | (2011.01) | |
| *H04N 21/658* | (2011.01) | |
| *H04N 21/8549* | (2011.01) | |

(52) U.S. Cl.
CPC ... *H04N 21/2542* (2013.01); *H04N 21/25883* (2013.01); *H04N 21/25891* (2013.01); *H04N 21/4312* (2013.01); *H04N 21/4314* (2013.01); *H04N 21/4316* (2013.01); *H04N 21/44204* (2013.01); *H04N 21/44222* (2013.01); *H04N 21/4667* (2013.01); *H04N 21/4722* (2013.01); *H04N 21/4725* (2013.01); *H04N 21/4755* (2013.01); *H04N 21/4784* (2013.01); *H04N 21/47205* (2013.01); *H04N 21/47815* (2013.01); *H04N 21/482* (2013.01); *H04N 21/6582* (2013.01); *H04N 21/8173* (2013.01); *H04N 21/858* (2013.01); *H04N 21/8547* (2013.01); *H04N 21/8549* (2013.01)

(58) Field of Classification Search
CPC ........... G06Q 30/0241; G06Q 30/0246; G06Q 30/0625; G06Q 30/0643
See application file for complete search history.

(56) References Cited

U.S. PATENT DOCUMENTS

| | | |
|---|---|---|
| 6,230,324 B1 | 5/2001 | Tomita et al. |
| 6,718,551 B1 | 4/2004 | Swix et al. |
| 7,293,066 B1 | 11/2007 | Day |
| 7,444,659 B2 | 10/2008 | Lemmons |
| 7,493,636 B2 | 2/2009 | Kitsukawa et al. |
| 7,496,945 B2 | 2/2009 | Rodriguez |
| 7,739,710 B2 | 6/2010 | Kwon et al. |
| 7,839,385 B2 | 11/2010 | Hunleth et al. |
| 7,900,228 B2 | 3/2011 | Stark et al. |
| 7,992,179 B1 | 8/2011 | Kapner, III et al. |
| 8,079,054 B1 | 12/2011 | Dhawan et al. |
| 8,453,171 B2 | 5/2013 | Koplar |
| 8,522,281 B1 | 8/2013 | Sahami et al. |
| 8,607,269 B2 | 12/2013 | Needham et al. |
| 8,656,431 B2 | 2/2014 | Cavicchia |
| 8,661,466 B2 | 2/2014 | Stephens |
| 8,799,977 B1 | 8/2014 | Kapner, III et al. |
| 9,049,471 B2 | 6/2015 | Krapf et al. |
| 9,326,043 B2 | 4/2016 | Makhlouf |
| 9,392,342 B2 | 7/2016 | Makhlouf |
| 9,479,838 B2 | 10/2016 | Makhlouf |
| 9,743,155 B2 | 8/2017 | Makhlouf |
| 9,781,490 B2 | 10/2017 | Makhlouf |
| 10,182,272 B2 | 1/2019 | Makhlouf |
| 2001/0034883 A1 | 10/2001 | Zigmond |
| 2003/0131357 A1 | 7/2003 | Kim |
| 2004/0103439 A1 | 5/2004 | MacRae et al. |
| 2004/0154040 A1 | 8/2004 | Ellis |
| 2004/0221303 A1 | 11/2004 | Sie et al. |
| 2005/0028206 A1 | 2/2005 | Cameron et al. |
| 2005/0076130 A1* | 4/2005 | Anand ............. G06F 17/30867 709/228 |
| 2005/0086692 A1 | 4/2005 | Dudkiewicz et al. |
| 2005/0192946 A1* | 9/2005 | Lu .................... G06F 17/30864 |
| 2005/0251820 A1 | 11/2005 | Stefanik et al. |
| 2005/0262539 A1 | 11/2005 | Barton |
| 2005/0278794 A1 | 12/2005 | Leinonen et al. |
| 2006/0004892 A1* | 1/2006 | Lunt ................. G06F 17/30864 |
| 2006/0064716 A1 | 3/2006 | Sull et al. |
| 2006/0090131 A1 | 4/2006 | Kumagai |
| 2006/0136246 A1* | 6/2006 | Tu ..................... G06F 17/30256 725/52 |
| 2006/0136980 A1 | 6/2006 | Fulcher |
| 2007/0124777 A1 | 5/2007 | Bennett et al. |
| 2008/0196075 A1 | 8/2008 | Candelore |
| 2008/0244657 A1 | 10/2008 | Arsenault et al. |
| 2008/0281699 A1 | 11/2008 | Whitehead |
| 2008/0300985 A1 | 12/2008 | Shamp |
| 2009/0006937 A1 | 1/2009 | Knapp et al. |
| 2009/0007178 A1 | 1/2009 | Artom |
| 2009/0138904 A1* | 5/2009 | Kitsukawa ........... G06Q 20/387 725/23 |
| 2009/0141174 A1 | 6/2009 | Hardacker et al. |
| 2009/0199242 A1 | 8/2009 | Johnson |
| 2009/0241145 A1 | 9/2009 | Sharma |
| 2009/0254931 A1 | 10/2009 | Pizzurro |
| 2009/0327346 A1 | 12/2009 | Teinila |
| 2010/0175090 A1 | 7/2010 | Cordray |
| 2010/0199312 A1 | 8/2010 | Chang et al. |
| 2010/0269140 A1 | 10/2010 | Shin et al. |
| 2011/0107372 A1 | 5/2011 | Walter |
| 2011/0126226 A1 | 5/2011 | Makhlouf |
| 2011/0126234 A1 | 5/2011 | Makhlouf |
| 2011/0126249 A1 | 5/2011 | Makhlouf |
| 2011/0292283 A1 | 12/2011 | Stephens |
| 2012/0278727 A1 | 11/2012 | Ananthakrishnan |
| 2012/0291104 A1 | 11/2012 | Hasek |
| 2013/0046641 A1 | 2/2013 | Devree |
| 2013/0169510 A1 | 7/2013 | Tahara |
| 2013/0276008 A1 | 10/2013 | Wu |
| 2013/0305273 A1* | 11/2013 | Hadfield .......... H04N 21/44204 725/14 |
| 2014/0157299 A1* | 6/2014 | Alcala ............. H04N 21/44222 725/14 |
| 2014/0173652 A1* | 6/2014 | Patel .................... H04N 21/812 725/34 |
| 2014/0207565 A1* | 7/2014 | Jacobs ................ G06Q 30/0246 705/14.43 |
| 2014/0259045 A1 | 9/2014 | Sangal |
| 2015/0373396 A1 | 12/2015 | Makhlouf |
| 2016/0050466 A1 | 2/2016 | Makhlouf |
| 2016/0212500 A1 | 7/2016 | Makhlouf |
| 2016/0345076 A1 | 11/2016 | Makhlouf |
| 2016/0360261 A1 | 12/2016 | Makhlouf |
| 2018/0098017 A1 | 4/2018 | Vaysman et al. |
| 2019/0149893 A1 | 5/2019 | Makhlouf |

OTHER PUBLICATIONS

Steiner, Ina, New Google Retail Search Engine Gives Small Online Merchants Exposure, entire document, Dec. 12, 2002. (Year: 2002).*
Makhlouf, Samir B.; Final Office Action for U.S. Appl. No. 14/207,091, filed Mar. 12, 2014, dated Nov. 20, 2017; 22 pgs.
Makhlouf, Samir, B.; Non-Final Office Action for U.S. Appl. No. 15/226,085, filed Aug. 2, 2016, dated Nov. 16, 2017, 35 pg.

(56) References Cited

OTHER PUBLICATIONS

Makhlouf, Samir B.; Final Office Action for U.S. Appl. No. 14/207,091, filed Mar. 12, 2014, dated Oct. 18, 2016; 22 pgs.
Makhlouf, Samir B.; Final Office Action for U.S. Appl. No. 14/207,091, filed Mar. 12, 2014, dated Oct. 27, 2015, 12 pgs.
Makhlouf, Samir B.; Non-final Office Action for U.S. Appl. No. 14/207,091, filed Mar. 12, 2014, dated May 15, 2017; 16 pgs.
Makhlouf, Samir B.; Non-Final Office Action for U.S. Appl. No. 14/207,091, filed Mar. 12, 2014, dated Apr. 15, 2016, 32 pgs.
Makhlouf, Samir B.; Non-Final Office Action for U.S. Appl. No. 14/207,091, filed Mar. 12, 2014, dated May 6, 2015, 19 pgs.
Makhlouf, Samir B.; Issue Notification for U.S. Appl. No. 14/310,018, filed Jun. 20, 2014, dated Apr. 6, 2016, 1 pg.
Makhlouf, Samir B.; Non-Final Office Action for U.S. Appl. No. 14/310,018, filed Jun. 20, 2014, dated Sep. 21, 2015, 22 pgs.
Makhlouf, Samir B.; Notice of Allowance for U.S. Appl. No. 14/310,018, filed Jun. 20, 2014, dated Nov. 2, 2015, 5 pgs.
Makhlouf, Samir B.; Notice of Allowance for U.S. Appl. No. 14/310,018, filed Jun. 20, 2014, dated Mar. 10, 2016, 17 pgs.
Makhlouf, Samir B.; Issue Notification for U.S. Appl. No. 14/925,409, filed Oct. 28, 2015, dated Jun. 22, 2016, 1 pg.
Makhlouf, Samir B.; Non-Final Office Action for U.S. Appl. No. 14/925,409, filed Oct. 28, 2015, dated Dec. 10, 2015, 19 pgs.
Makhlouf, Samir B.; Notice of Allowance for U.S. Appl. No. 14/925,409, filed Oct. 28, 2015, dated Feb. 1, 2016, 9 pgs.
Makhlouf, Samir B.; Notice of Allowance for U.S. Appl. No. 14/925,409, filed Oct. 28, 2015, dated Mar. 16, 2016, 17 pgs.
Makhlouf, Samir B.; Examiner Interview Summary for U.S. Appl. No. 15/081,353, filed Mar. 25, 2016, dated Mar. 20, 2017, 2 pgs.
Makhlouf, Samir B.; Issue Notification for U.S. Appl. No. 15/081,353, filed Mar. 25, 2016, dated Aug. 2, 2017, 1 pg.
Makhlouf, Samir B.; Non-Final Office Action for U.S. Appl. No. 15/081,353, filed Mar. 25, 2016, dated Dec. 9, 2016, 31 pgs.
Makhlouf, Samir B.; Notice of Allowance for U.S. Appl. No. 15/081,353, filed Mar. 25, 2016, dated Mar. 31, 2017, 15 pgs.
Makhlouf, Samir B.; Applicant Initiated Interview Summary for U.S. Appl. No. 15/226,810, filed Aug. 2, 2016, dated Apr. 27, 2017, 3 pgs.
Makhlouf, Samir, B.; Issue Notification for U.S. Appl. No. 15/226,810, filed Aug. 2, 2016, dated Apr. 27, 2017, 1 pg.
Makhlouf, Samir, B.; Non-final Office Action for U.S. Appl. No. 15/226,810, filed Aug. 2, 2016, dated Mar. 3, 2017, 28 pgs.
Makhlouf, Samir, B.; Notice of Allowance for U.S. Appl. No. 15/226,810, filed Aug. 2, 2016, dated May 30, 2017, 9 pgs.
Makhlouf, Samir; Final Office action for U.S. Appl. No. 12/592,369, filed Nov. 24, 2009, dated Nov. 27, 2013, 14 pgs.
Makhlouf, Samir; Issue Notification for U.S. Appl. No. 12/592,369, filed Nov. 24, 2009, dated Oct. 5, 2016, 1 pg.
Makhlouf, Samir; Non-Final Office action for U.S. Appl. No. 12/592,369, filed Nov. 24, 2009, dated Nov. 26, 2012, 10 pgs.
Makhlouf, Samir; Non-Final Office action for U.S. Appl. No. 12/592,369, filed Nov. 24, 2009, dated May 20, 2013, 11 pgs.
Makhlouf, Samir; Non-Final Office action for U.S. Appl. No. 12/592,369, filed Nov. 24, 2009, dated May 5, 2015, 12 pgs.
Makhlouf, Samir; Notice of Allowance for U.S. Appl. No. 12/592,369, filed Nov. 24, 2009, dated Jun. 3, 2016, 14 pgs.
Makhlouf, Samir; Response to Amendment under Rule 312 for U.S. Appl. No. 12/592,369, filed Nov. 24, 2009, dated Sep. 16, 2016, 2 pgs.
Makhlouf, Samir; Supplemental Notice of Allowance for U.S. Appl. No. 12/592,369, filed Nov. 24, 2009, dated Jun. 22, 2016, 6 pgs.
Makhlouf, Samir B.; Extended European Search Report for serial No. 14183901.9, filed Sep. 8, 2014, dated Nov. 12, 2015, 9 pgs.
Makhlouf, Samir B.; Summons to Attend Oral Proceedings for Patent Application Serial No. 14183901.9, filed Sep. 8, 2014, mailed Jun. 22, 2017, 10 pgs.
Makhlouf, Sam; U.S. Provisional Patent Application entitled: System and Method for Reinforcing Brand Awareness with Minimal Intrusion of the Viewer Experience under U.S. Appl. No. 61/852,114, filed Mar. 15, 2013; 37 pgs.
Makhlouf, Sam; Applicant Initiated Interview Summary for U.S. Appl. No. 12/592,403, filed Nov. 24, 2009, dated Dec. 23, 2014, 3 pgs.
Makhlouf, Sam; Applicant Initiated Interview Summary for U.S. Appl. No. 12/592,403, filed Nov. 24, 2009, dated Aug. 28, 2014, 3 pgs.
Makhlouf, Sam; Final Office Action for U.S. Appl. No. 12/592,401, filed Nov. 24, 2009, dated Oct. 15, 2012, 21 pgs.
Makhlouf, Sam; Final Office Action for U.S. Appl. No. 12/592,403, filed Nov. 24, 2009, dated Oct. 15, 2012, 12 pgs.
Makhlouf, Sam; Final Office Action for U.S. Appl. No. 12/592,403, filed Nov. 24, 2009, dated Nov. 17, 2014, 10 pgs.
Makhlouf, Sam; Final Office Action for U.S. Appl. No. 12/592,403, filed Nov. 24, 2009, dated Nov. 7, 2013, 12 pgs.
Makhlouf, Sam; Non-Final Office Action for U.S. Appl. No. 12/592,401, filed Nov. 24, 2009, dated Jan. 30, 2012, 25 pgs.
Makhlouf, Sam; Non-Final Office Action for U.S. Appl. No. 12/592,401, filed Nov. 24, 2009, dated May 1, 2013, 25 pgs.
Makhlouf, Sam; Non-Final Office Action for U.S. Appl. No. 12/592,403, filed Nov. 24, 2009, filed Jul. 12, 2013, 16 pgs.
Makhlouf, Sam; Non-Final Office Action for U.S. Appl. No. 12/592,403, filed Nov. 24, 2009, dated Feb. 1, 2012, 16 pgs.
Makhlouf, Sam; Non-Final Office Action for U.S. Appl. No. 12/592,403, filed Nov. 24, 2009, dated May 26, 2015, 12 pgs.
Makhlouf, Sam; Non-Final Office Action for U.S. Appl. No. 12/592,403, filed Nov. 24, 2009, dated Apr. 24, 2014, 11 pgs.
Makhlouf, Samir B.; Non-Final Office Action for U.S. Appl. No. 14/207,091, filed Mar. 12, 2014, dated Mar. 5, 2018, 22 pgs.
Makhlouf, Samir B.; Non-Final Office Action for U.S. Appl. No. 15/226,085, filed Aug. 2, 2016, dated May 15, 2018, 13 pgs.
Makhlouf, Samir B.; Issue Notification for U.S. Appl. No. 14/207,091, filed Mar. 12, 2014, dated Dec. 22, 2018, 1 pg.
Makhlouf, Samir B.; Notice of Allowance for U.S. Appl. No. 14/207,091, filed Mar. 12, 2014, dated Sep. 6, 2018, 17 pgs.
Makhlouf, Samir B.; Final Office Action for U.S. Appl. No. 15/226,085, filed Aug. 2, 2016, dated Oct. 4, 2018, 18 pgs.
Makhlouf, Samir B.; Non-Final Office Action for U.S. Appl. No. 15/226,085, filed Aug. 2, 2016, dated Jan. 10, 2019, 13 pgs.

* cited by examiner

SYSTEM AND METHOD FOR ENGAGEMENT AND DISTRIBUTION OF MEDIA CONTENT

CROSS-REFERENCE TO RELATED APPLICATIONS

This application is a continuation of U.S. application Ser. No. 15/226,810, filed Aug. 2, 2016, which is a continuation-in-part of U.S. application Ser. No. 15/081,353, filed Mar. 25, 2016, now U.S. Pat. No. 9,743,155, which is a continuation of U.S. application Ser. No. 14/925,409, filed Oct. 28, 2015, now U.S. Pat. No. 9,392,342, which is a continuation of U.S. application Ser. No. 14/310,018, filed Jun. 20, 2014, now U.S. Pat. No. 9,326,043, each of which is hereby incorporated by reference in its entirety. Also incorporated by reference herein, in their entireties, are each of U.S. patent application Ser. No. 14/207,091, filed Mar. 12, 2014 and published Sep. 18, 2014 as U.S. Patent Application Publication No. 2014/0282698, which claimed the benefit of U.S. Provisional Patent Application No. 61/852,114, filed Mar. 15, 2013.

FIELD OF THE DISCLOSURE

The proposed system and method is generally directed to building brand or product awareness with minimal disruption of the audience/viewer experience when viewing visually perceivable media content, such as, movies, television, streaming video, still imagery and other motion pictures/video content.

SUMMARY

Disclosed is a system for distributing media content. The system can include a processor and a memory coupled to the processor. The memory stores executable instructions for causing the processor to present a mall interface on a display of a user system, the mall interface comprising a plurality of storefronts and an integrated storefront/internet search, the integrated storefront/internet search comprising a storefront search and an internet search. The memory can further cause the processor to detect a user selection of the integrated storefront/internet search. The memory can further cause the processor to display customized search result storefronts based on the user selection.

Also disclosed is a computer-implemented method for presenting a mall interface on a display of a user system, the mall interface comprising a plurality of storefronts and an integrated storefront/internet search, the integrated storefront/internet search comprising a storefront search and an internet search. The method may further comprise detecting a user selection of the integrated storefront/internet search. The method may further comprise displaying customized search result storefronts based on the user selection.

Also disclosed is a system for distributing media content. The system can include a processor and a memory coupled to the processor. The memory stores executable instructions for causing the processor to receive a highest bid from an advertiser for particular advertisements to be shown during an ad spot for a user, provide the user an ability to forgo the particular advertisements in order to view a selected media content at an original cost, provide the user the ability to select at least one of the particular advertisements to watch in order to discount the original cost of the selected media content, and provide the user the ability to select all of the particular advertisements to watch in order to waive the original cost of the selected media content.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present disclosure describes systems and methods for an advertisement system. Although various implementations of the present disclosure are described with respect to advertisement systems related to lead ads, card ads, engagement ads, ad placement, and ad stamps, it should be understood that the present disclosure also may include other types of content, other than advertisement, without departing from the principles described herein. Other features and advantages will be apparent to one of ordinary skill in the art upon consideration of the general principles described herein, and all such features and advantages are intended to be included in the present disclosure.

Figure 1:
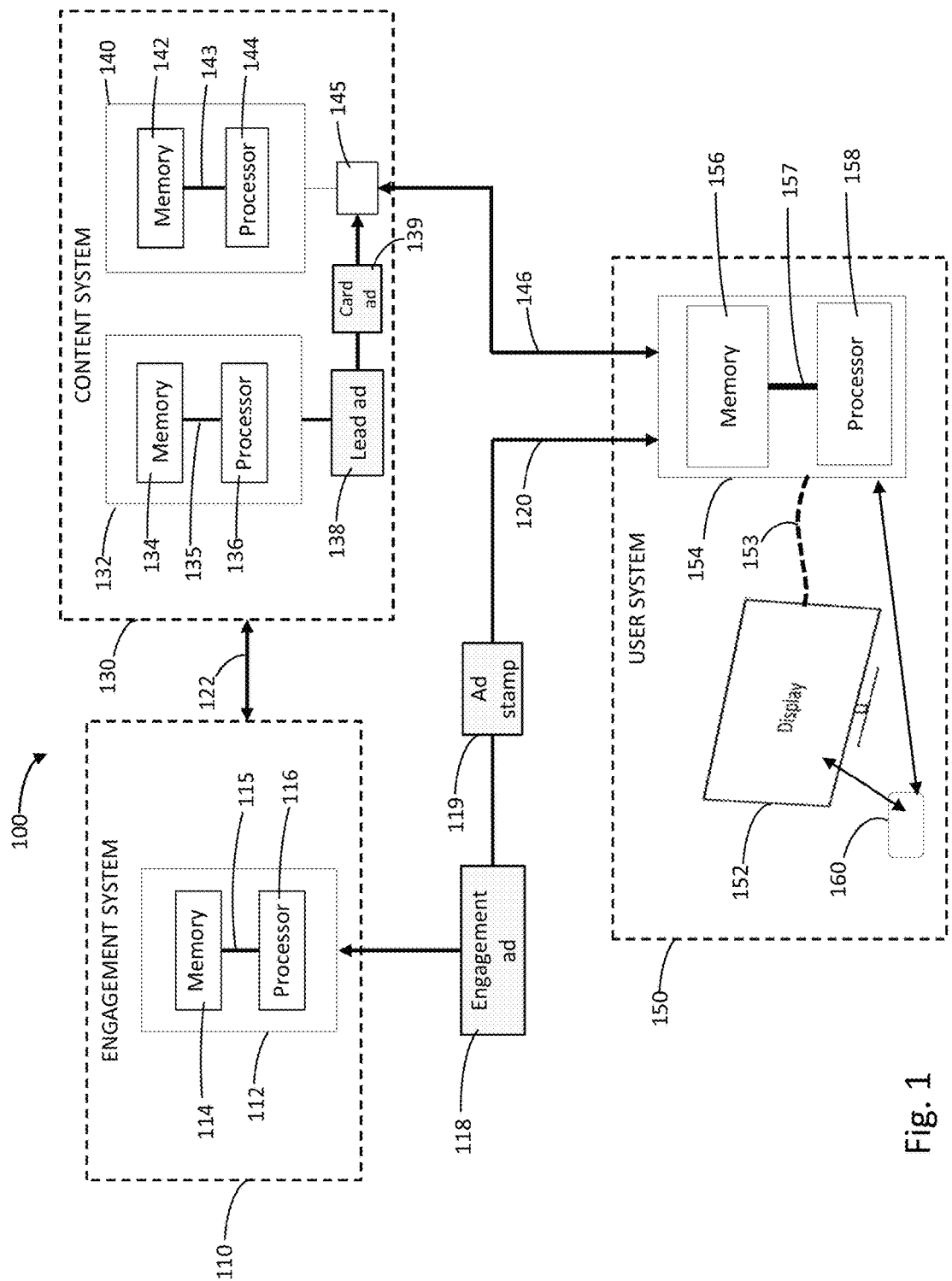
FIG. 1 is a block diagram illustrating an advertisement system, in accord with one embodiment of the current disclosure.

FIG. 1 depicts a block diagram illustrating an advertisement system 100 according to various implementations of the present disclosure. Advertisement system 100 may include an engagement system 110, content system 130, and a user system 150. Engagement system 110 may include an advertisement server 112 that includes one or more memory 114 operatively connected by connection 115 to one or more processor 116. The at least one memory 114 and at least one processor 116 are not required to be at the same location as one another or at the same locations as other portions of the memory 114 and processor 116. Advertisement server 112 may be a web server or any other type of server that enables communication of commands and data content. Also, connection 115 may include a wired connection, wireless connection, or a combination of a wired and wireless connection. The connection 115 may use communication channels for exchanging data and information, such as a computer bus channel, a local area network (LAN), wide area network (WAN), or the Internet, among others. Engagement advertisements ("engagement ads") 118 and advertisement stamps ("ad stamps") 119 (as described in further detail below) may be stored on the engagement system 110. Additionally, engagement system 110 may communicate with the user system 150 by the use of connection 120, which may be a wired communication, wireless communication, or a combination of wired and wireless communication. Connection 120 may use communication channels for exchanging data and information, such as a local area network (LAN), wide area network (WAN), the Internet, cables, fiber optic cables, satellite, Ethernet cable, a satellite dish, a coaxial cable, a telephone line (including DSL connections), broadband over power lines (BPL), ordinary VHF or UHF antennas, among others. Further, in some embodiments, connection 120 may transmit errors, problems, issues, complaints, or comments, among others between the engagement system 110 and user system 150.

Content system 130 may also be included in the advertisement system 100. In the current embodiment, an advertisement server 132 and a content server 140 are included. However, in other embodiments, the advertisement server 132 and content server 140 may be combined and operate on the same one or more servers. Content system 130 includes information and other content that is provided by a distributor, broadcaster, and/or multi-system operator (MSO) of content. In some embodiments, an advertisement agency may provide the content and information to the advertisement server 132 and/or other parts of the content system 130.

Advertisement server 132 may include one or more memory 134 operatively connected by connection 135 to one or more processor 136. The at least one memory 134 and at least one processor 136 are not required to be at the same location as one another or at the same locations as other portions of the memory 134 and processor 136. Advertisement server 132 may be a web server or any other type of server that enables communication of commands and data content. Also, connection 135 may include a wired connection, wireless connection, or a combination of a wired and wireless connection. The connection 135 may use communication channels for exchanging data and information, such as a computer bus channel, a local area network (LAN), wide area network (WAN), the Internet, among others. Lead advertisements ("lead ads") 138 and card advertisements ("card ads") 139 (as described in further detail below) may be stored on the advertisement server 132 or elsewhere in the content system 130.

Also, content server 140 may include one or more memory 142 operatively connected by connection 143 to one or more processor 144. The at least one memory 142 and at least one processor 144 are not required to be at the same location as one another or at the same locations as other portions of the memory 142 and processor 144. Content server 140 may be a web server or any other type of server that enables communication of commands and data content. Also, connection 143 may include a wired connection, wireless connection, or a combination of a wired and wireless connection. The connection 143 may use communication channels for exchanging data and information, such as a computer bus channel, a local area network (LAN), wide area network (WAN), the Internet, among others. Additionally, content system 130 may communicate with the user system 150 by the use of connection 146, which may be a wired communication, wireless communication, or a combination of wired and wireless communication. Connection 146 may use communication channels for exchanging data and information, such as a local area network (LAN), wide area network (WAN), the Internet, cables, fiber optic cables, satellite, Ethernet cable, a satellite dish, a coaxial cable, a telephone line (including DSL connections), broadband over power lines (BPL), ordinary VHF or UHF antennas, among others. Further, in some embodiments, connection 146 may transmit errors, problems, issues, complaints, or comments, among others between the content system 130 and user system 150.

In some embodiments, connection 120 and 146 may be combined to be one connection; however, in other embodiments there may be multiple connections. The lead ads 138 and card ads 139 hosted within the advertisement server 132 of the content system 130 are inserted into entertainment content (output by connection 146) within specified time slots by ad inserter 145. Such practices are done today and are understood by one of skill in the art. The operator of the ad inserter 145 may be the broadcaster, distributor, or MSO providing the content and/or advertisements, another broadcaster, distributor, or MSO, or a third party located in the same location as the content provider or remotely. Further, in some embodiments, connection 120 and/or 146 may transmit information associated with user system 150 to the engagement system 110 and/or content system 130. Information related to the user system 150 may be transmitted to the engagement system 110 and/or content system 130, such as, for example, what channel the user system 150 is tuned to, times of day the user system 150 is on, recorded content the user system 150 has recorded and/or is scheduled to record, genres or categories of programs and shows the user system 150 is tuned to, among others.

Also, in some embodiments, the engagement system 110 and content system 130 may be combined and operate on the same one or more servers. Additionally, in some embodiments, the engagement system 110 may be able to exchange information and communicate with the content system 130, as shown by connection 122. Such communication may include wired communication, wireless communication, or a combination of a wired and wireless communication. The communication may include communication channels for exchanging data and information, such as a local area network (LAN), wide area network (WAN), the Internet, among others. However, connection 122 is not required and some embodiments may not include such a connection. In some embodiments, the advertisement system 100 may include more than one engagement system 110, more than one content system 130, and more than one user system 150.

User system 150 communicates with and receives information, advertisements, and content (including but not limited to engagement ads 118, ad stamps 119, lead ads 138, card ads 139, storefront 519, pop-up interface 620, entertainment content, and/or ad placement 438) from the engagement system 110 and the content system 130, and in the current embodiment, a user system 150 may be included for each user. In some embodiments, a portion of or all of the engagement system 110 may be combined with the user system 150 and operate from the same location as the user system 150 and/or in a remote location. The user system 150 may include a display 152, which may be a television, computer, mobile device, tablet, smart device, or other electronic device, and there may be one or more displays 152. The display 152 may communicate with and receive information from a client server 154 by the use of connection 153. Connection 153 may be a wired connection, a wireless connection, or a combination of a wired and wireless connection. The connection may include communication channels for exchanging data and information, such as a computer bus, a local area network (LAN), wide area network (WAN), the Internet, among others.

Client server 154 may include one or more memory 156 operatively connected by connection 157 to one or more processors 158. The at least one memory 156 and at least one processor 158 are not required to be at the same location or at the same locations as other portions of the memory 156 and processor 158. Client server 154 may be a set-top box, other type of cable box, a web server, over-the-top content device, or any other type of device that enables communication of commands and data content. Also, connection 157 may include a wired connection, wireless connection, or a combination of a wired and wireless connection. The connection 157 may use communication channels for exchanging data and information, such as a computer bus channel, a local area network (LAN), wide area network (WAN), the Internet, among others. In some embodiments, client server 154 may be an over-the-top content device, digital media player (e.g., Apple TV), dongle (e.g., Chromecast), mobile device that connects with the display 152, among others. Moreover, if a user does not have a set-top box or any type of client server 154 connected to their display 152, the user may download a Dooreme application on their computer, tablet, smart phone, or other device that may be configured to work and function as a client server 154. In such embodiments, the memory and/or components of the processor may be located on the device the Dooreme application is running on or remotely on the engagement system 110. Also, other devices and systems may be used. In some embodiments, ad stamps 119 and content advertisements (as described later, content advertisements may include one or more lead ad 138, card ad 139, or advertisement placements ("ad placement") 438) may be initially viewed or recorded on one display 152, and then may be accessed by another display 152 (e.g., via the user profile 510). For example, a user may view or recorded a program on the set-top box with a television connected as the display 152, and the user may access the user profile 510, and ad stamps 119 and content advertisements associated with that viewed or recorded program on their mobile device. Voice control associated with the user system 150 may also be used because, in some embodiments, the components of the user system 150 are compatible with voice control.

A control device 160 may also be included to control the display 152 and client server 154. The control device 160 may be a market provided remote control, a control application on a smart device (e.g., smart phone or tablet), or other type of control that enables a user to manage and control the display 152 and client server 154. The control device 160 may include one or more buttons (raised buttons or touch screen) to make selections in the advertisement system 100.

Figure 2:
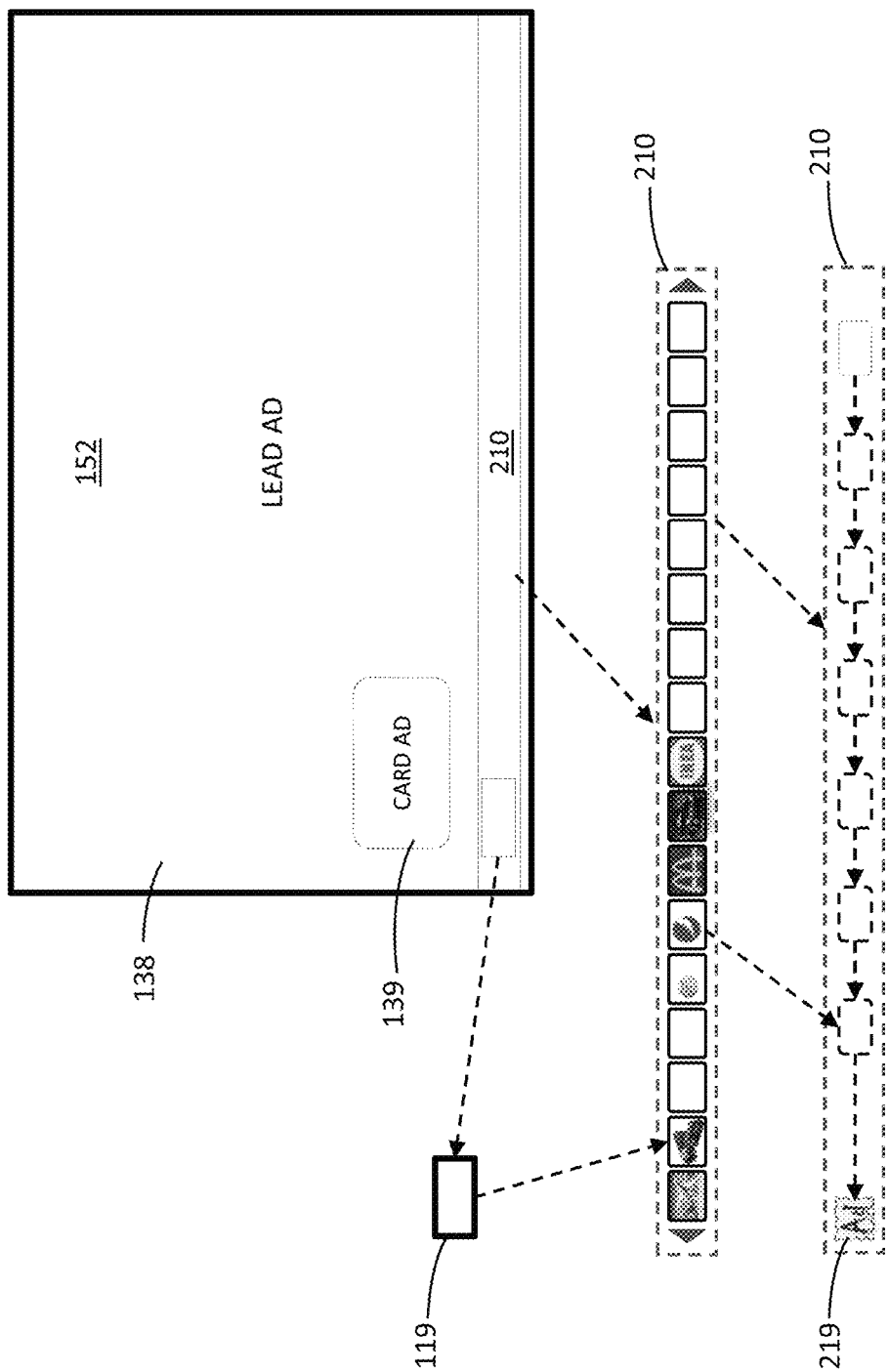
FIG. 2 is an exemplary diagram of a lead ad, card ad, ad stamps, and strip on the display of the advertisement system of FIG. 1.

FIG. 2 shows a lead ad 138 and card ad 139 on the display 152. Additionally, the display 152 may include one or more ad stamps 119 that are included in a strip 210. Each of the lead ad 138, card ad 139, and ad stamp 119 may include one or more images, which may comprise or depict a logo or name of a particular individual, group, or company, a product, good or act of service, or any other type of image. Strip 210 in the current embodiment is located at the bottom portion of the display 152; however, in other embodiments, strip 210 may be located on one or more sides of display 152 or in one or more different locations on the display 152. In the current embodiment, the strip 210 is located on the display 152 in a location that minimizes disruption of the viewer experience when viewing media content, such as movies, television, or streaming video on the display 152. Additionally, in some embodiments, if there is not an ad stamp 119, then strip 210 may or may not be included. As can be seen in the current embodiment, the strip 210 may accumulate a number of ad stamps 119, and in some embodiments once a certain number (e.g., twenty) of ad stamps 119 are accumulated, there may be an ad stamps indicator 219 that takes the place of the certain number of ad stamps 119. In some embodiments, an operator of the engagement system 110 and/or content system 130 may charge prices for ad stamps 119, and a premium price or higher price may be charged for those ad stamps 119 that are requested or selected to be shown earlier in the sequence (before the ad stamps indicator 219 is shown).

Once the ad stamps indicator 219 is shown, a user may be able to select the ad stamps indicator 219 to see all the ad stamps 119 indicated by the ad stamps indicator 219 and other individual ad stamps 119 may begin to accumulate again. Moreover, each ad stamp 119 may be of variable or fixed size, and the same size or different sizes from one another. Also, each ad stamp 119 may be shown for a fixed or variable period of time. For example, each ad stamp 119 may be shown for a certain period of time (e.g., minutes, hours, or days), or in some embodiments, each ad stamp 119 may be shown for a variable period of time (e.g., based on the type of content advertisement or ad stamp, time of day, day of the week, or other information associated with the user, among others). In certain embodiments, the use of the ad stamps 119, the strip 210, and/or the ad stamps indicator 219 enables numerous advertisements to be shown to the viewer, thereby building brand or product awareness, with minimal intrusion on the viewer experience.

Card ad 139, seen in FIG. 2, may be advertisements, information and options regarding other content, or other information that is captured (e.g., shown or recorded) while content is captured. For example, many content providers (e.g., MSOs, distributors, and/or broadcaster) will advertise their own programming or additional advertisements and information at the bottom or side of the display 152 when content is being broadcast or otherwise captured, and card ads 139 may include such advertising and information. In some embodiments, a card ad 139 may transition to an ad stamp 119 (by minimizing or other ways), and in some embodiments, a lead ad 138 may transition to a card ad 139, and the card ad 139 may transition back to a lead ad 138 or to an ad stamp 119.

Figure 3:
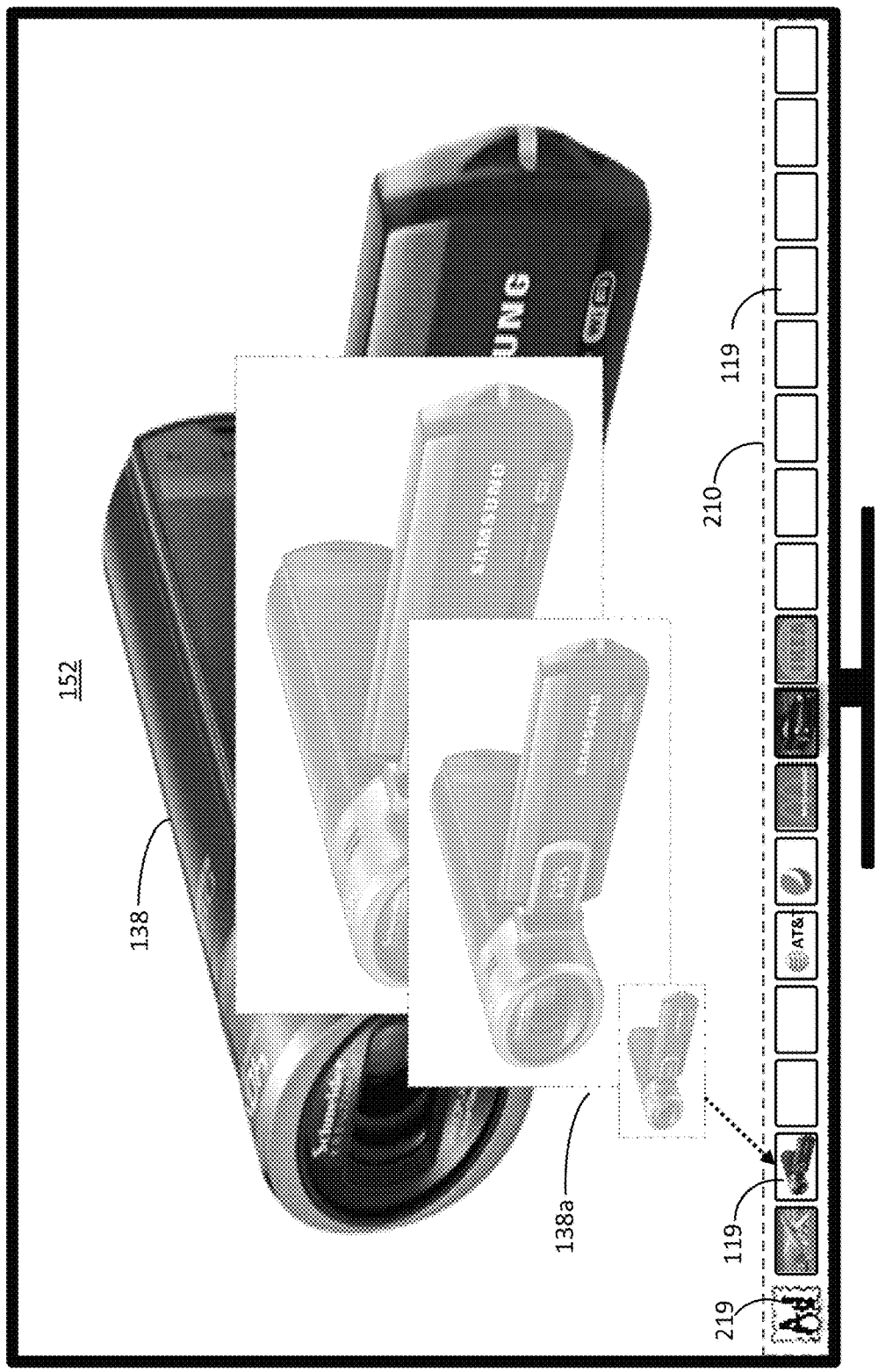
FIG. 3 is an exemplary diagram of a lead ad, minimizing lead ad, ad stamps, and strip on the display of the advertisement system of FIG. 1.

FIG. 3 shows the lead ad 138 and a minimizing lead ad 138a on the display. The minimizing lead ad 138a indicates a transition of an advertisement from the lead ad 138 to the ad stamp 119 after a period of time (e.g., the period of time for the lead ad 138 to complete). Many broadcasters, distributors, and/or MSOs include advertisements in thirty second blocks of time, and in some embodiments, the lead ads 138, card ads 139, or advertisement placements ("ad placement") 438 (discussed below), collectively content advertisement, may be shown for any period of time that is divisible by, or a multiple of, thirty seconds. However, in other embodiments, content advertisements may be shown for other periods of time (e.g., not divisible by or a multiple of thirty seconds). Content advertisement may include one or more lead ad 138, one or more card ad 139, and/or one or more advertisement placement 438.

Further, content advertisements and ad stamps 119 may, in some embodiments, be associated with entertainment content provided by the broadcasters, distributors, and/or MSOs (i.e., content system 130). For example, broadcasters, distributors, MSO, and/or individuals or groups associated with the engagement server 110 and/or content server 140 may label or otherwise correlate a program, show, movie, or other content with an icon (e.g., shown as a content advertisement) that may be shown on the display 152. The icon may notify the user that the content may be viewed now, may be or is being saved or recorded on the user system 150 or remotely (e.g., engagement system 110), and/or notify the user the content may be viewed on demand now or at a later time. By selecting the icon, the user may transition the content to an ad stamp 119 and/or as a storefront (seen as 519 in FIG. 5) in the user profile 510. In some embodiments, when the user selects the storefront 519 or ad stamp 119 associated with the content, the content may be viewed or other options may be provided to the user regarding the content (e.g., remind later, save the content to another location, among others). In some embodiments, the examples and options provided above regarding saving content are not required, and other variations and combinations may be used. In some embodiments, ad stamps 119 may include applications or other types of indicators that enable a user to efficiently work on or view selected material. For example, in some embodiments, a user may be enabled to select one or more ad stamps 119 to be shown on the strip 210 (e.g., the user may select the one or more ad stamps 119 from the user profile 510), and the ad stamps 119 may include ad stamps 119 that enable the user to check the weather, interact with their email, view news, or connect to social media, among others. In some embodiments, the user, by the use of the control device 160 may be enabled to select an ad stamp 119 by a single selection on the control device 160. However, in other embodiments, such a configuration is not required.

In other embodiments, a period of time for content advertisement may be defined by the content system 130, user system 150, and/or engagement system 110. The defined period of time may be the length of each content advertisement to be shown, which may be determined based on stored lengths of time for each content advertisement, or time stamping processes used to determine the length of time for each content advertisement, among others. For example, a length of time determined based on stored lengths of time may include storing the lengths of time in memory 134 or 156 of the advertisement server 132 or client server 154, respectively. Additionally, in another example, by using a time stamping process, the content system 130 or user system 150 may store a time stamp for when a content advertisement is captured the first time or any additional time, and the time stamps, or calculated length of time based on the time stamps, may be stored in any portion of memory in advertisement system 100. Further, the period of time may be a fixed or variable period of time to show the content advertisement. The fixed or variable period of time may be determined by the day of the week, time of day, channel being captured (e.g., shown or recorded), programming captured, or information relating to a particular user's preferences and purchase history, among others.

With respect to FIG. 3, after the lead ad 138 is shown for a period of time, as discussed above, the minimizing lead ad 138a will transition the advertisement from the main area of the display 152 to the strip 210 and utilize the ad stamp 119 for the advertisement. As depicted in the current embodiment (FIG. 3), more than one minimizing lead ad 138a may be shown on the display 152 to transition the lead ad 138 to the ad stamp 119. In other embodiments, one minimizing lead ad 138*a* is shown; in other embodiments, no minimizing lead ad 138*a* is shown. The minimizing lead ad 138*a* may include one or more images, which may comprise or depict a logo or name of a particular individual, group, or company, comprise an image or video frame depicted at any point during the lead ad 138 or the last image or video frame depicted during the lead ad 138, or comprise or depict a picture of a good, product or act of service, or any other type of video frame or image. The broadcaster, distributor, controller of the engagement system 110, individual, company, or group that is represented by the advertisement or that paid for the advertisement, or some other individual or group associated with the advertisement may select one or more images that may appear in the lead ad 138, minimizing lead ad 138*a* and ad stamp 119. Additionally, the image(s) or video frame(s) that appear in the lead ad 138, minimizing lead ad 138*a*, and ad stamp 119 may be the same image(s) or video frame(s) or different image(s) or video frame(s) from one another. Further, card ads 139 (seen in FIG. 2) may also transition to ad stamps 119 on the strip 210 by the minimizing effect described in relation to minimizing lead ads 138*a* or any other way of transitioning.

Additionally, in some embodiments, the advertisement system 100 may recognize if each lead ad 138 was owned and distributed by the content broadcaster or distributor, and report the list to the content system 130 or engagement system 110. In a standard advertising environment, the content broadcasters owns the time slot and/or advertising window when the display 152 is tuned to an associated television channel, and often the broadcaster may not allow the distributor/MSO to modify or add to the image on the screen (except when permitted by the broadcaster). Often, broadcasters own all the commercial or ad space, inventory, and ad breaks within their content broadcasts. In some embodiments, to accommodate the MSO's generation of revenue from advertising, when the broadcaster and MSO agree to share ad revenue, broadcasters often allocates a certain number of ad space inventory to be sold and filed by the MSO. In this case the broadcaster broadcasts "filler ads" in the MSO designated ad space/inventory during preset ad breaks, and then allows the distributor to over lay distributor sold ads when/if the distributor has sold the designated ad space/inventory. If the distributor had not sold the designated ad inventory the filler ads will appear on the user's display 152 by the use of the user system 150. In some embodiments, the advertisement system 100 may recognize when it is optimal to provide filler ads or if the advertisement space has been sold.

Figure 4:
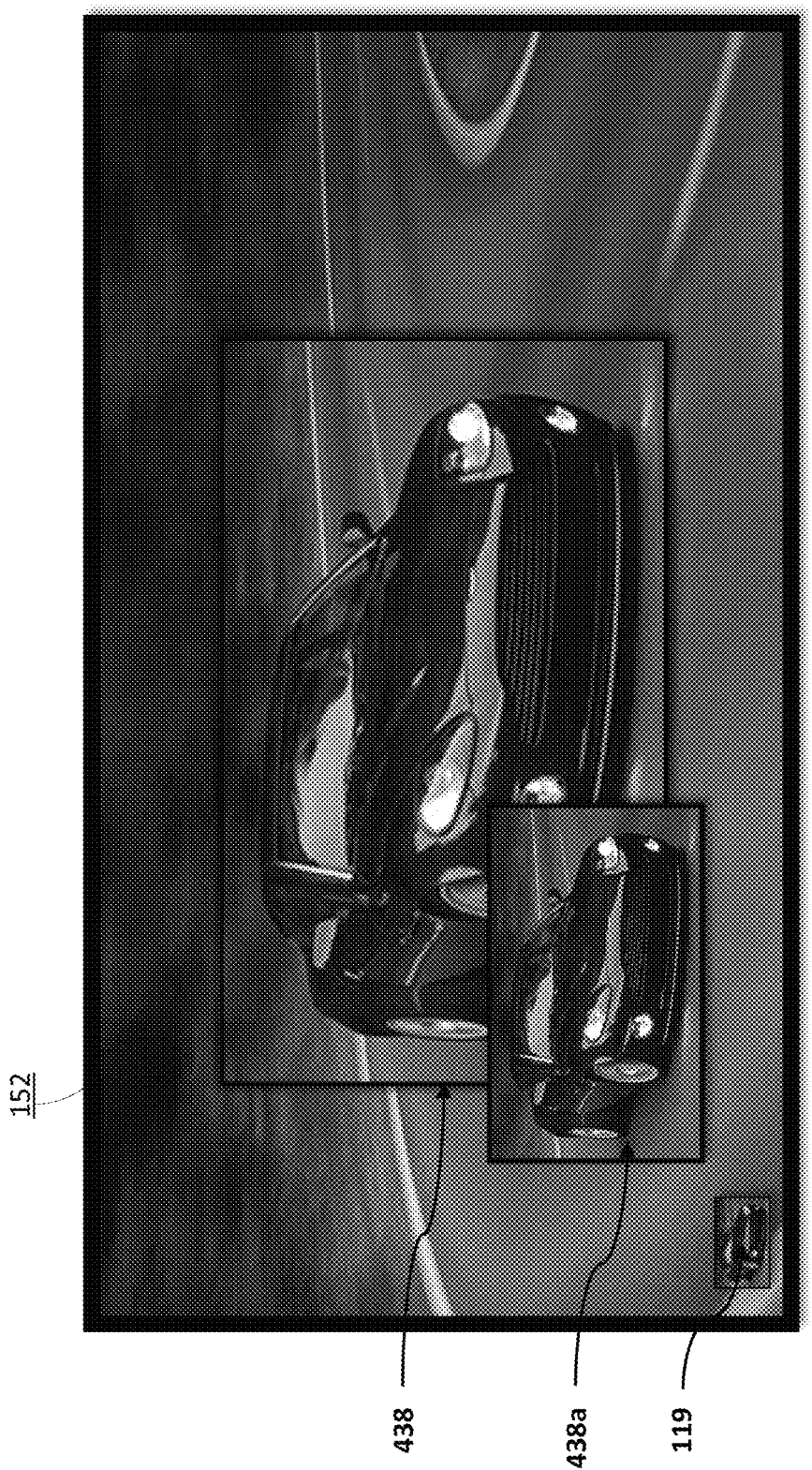
FIG. 4 is an exemplary diagram of an advertisement placement, minimizing ad placement, and ad stamp on the display of the advertisement system of FIG. 1, in accord with one embodiment of the current disclosure.

FIG. 4 shows an ad placement 438 transitioning to an ad stamp 119. Ad placements 438 may be any type of good or service depicted on display 152 by the user system 150 from content system 130, and ad placements 438 are shown during the scheduled content programming (e.g., the content provided from content server 140). For example, ad placements 438 may be a placement of a good or service in programming on the content system 130. As shown in FIG. 4, for example, a car may be depicted in the content of programming, and an ad stamp 119 may be associated with the car. FIG. 4 shows a minimizing ad placement 438*a* transitioning the ad placement 438 to an ad stamp 119, similar to that shown in FIG. 3. A minimizing ad placement 438*a* is not required, and in some embodiments, the ad placement 438 may be transitioned directly to a storefront 519 without an ad stamp 119.

Ad placements 438 may be any type of good or service depicted on display 152 by the user system 150 from content system 130, and ad placements 438 are shown during the scheduled content programming (e.g., the content provided from content server 140). For example, ad placements 438 may be a placement of a good or service in programming on the content system 130. As shown in FIG. 4, for example, a car may be depicted in the content of programming, and an ad stamp 119 may be associated with the car. FIG. 4 shows a minimizing ad placement 438*a* transitioning the ad placement 438 to an ad stamp 119, similar to that shown in FIG. 3. A minimizing ad placement 438*a* is not required, and in some embodiments, the ad placement 438 may be transitioned directly to a storefront 519 without an ad stamp 119.

Figure 5:
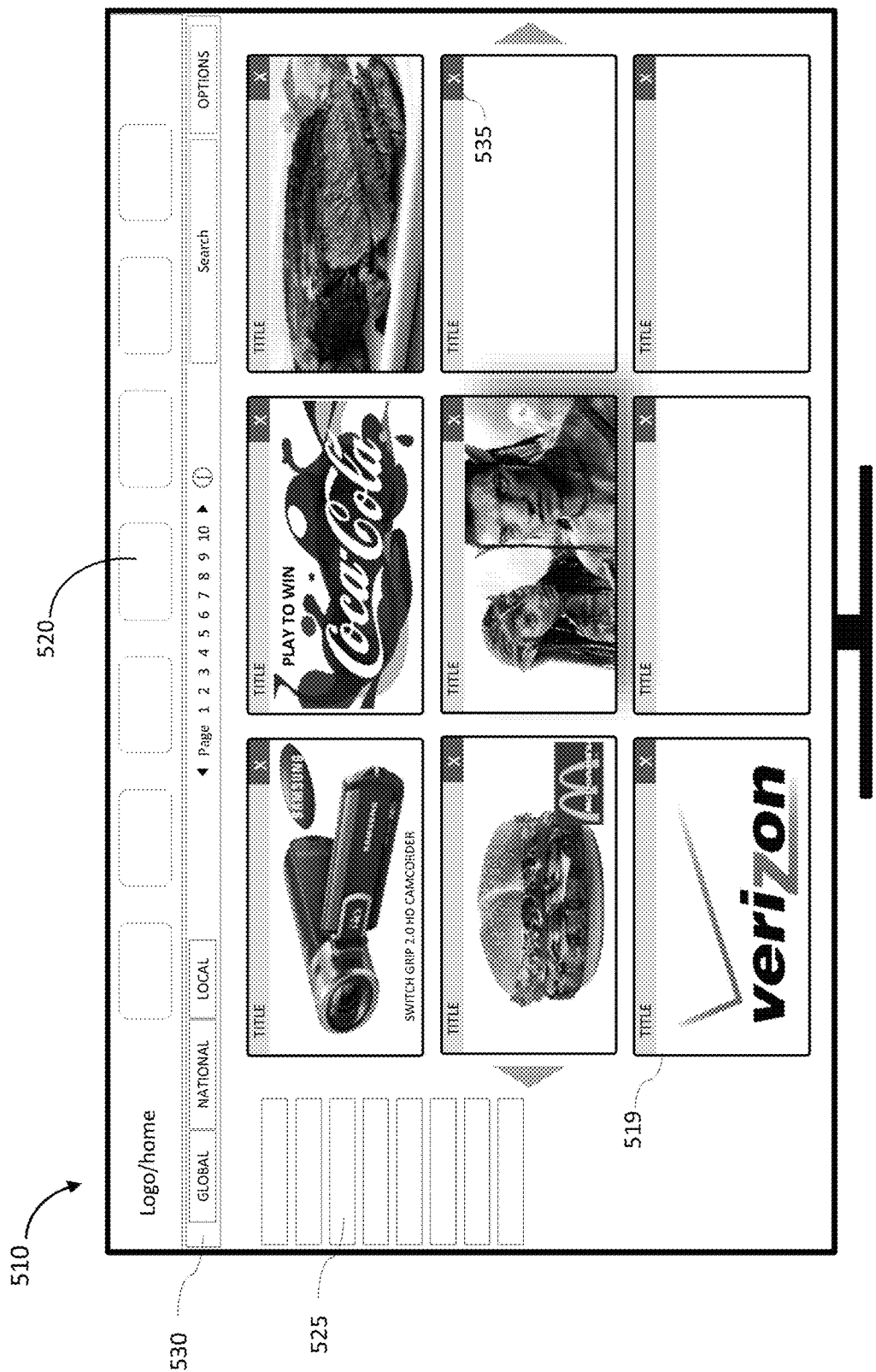
FIG. 5 is an exemplary user profile on the display of the advertisement system of FIG. 1, in accord with one embodiment of the current disclosure.

FIG. 5 shows an interface for a user profile 510. The user profile 510 may be accessed in a multitude of ways, including, for example, the user selecting an ad stamp 119 or the strip 210 with the control device 160, the user selecting a particular option or button on the control device 160 to bring the user to the user profile 510, or the user system 150 automatically causing the display 152 to depict the user profile 510 after one or more condition(s) are met. The user profile 510 may be stored at any location or multiple locations within the advertisement system 100, including engagement system 110 and user system 150.

In some embodiments, the engagement ad 118 (described below) for each, may be downloaded, or otherwise received, by the user system 150 from the engagement system 110 after a period of time of showing the content advertisement; however, in some embodiments, engagement ads 118 may be stored on the user system 150 at a predetermined time (e.g., each day or at the time the user system 150 was set up) where the engagement ads 118 are downloaded or received by the user system 150 from the engagement system 110 once the user profile 510 is accessed. Also, ad stamps 119 may be downloaded by the user system 150 from the engagement system 110 at predetermined times, before or after content advertisements are complete, or before content advertisements are shown, among others. In some embodiments, each engagement ad 118 is streamed from the engagement system 110 when the user selects that particular engagement ad 118. Additionally, in some embodiments, there may be a combination of the different ways listed above, and there may be other ways not listed or described above, for downloading or otherwise receiving content advertisement.

Once the user profile 510 is accessed or otherwise shown, a user may select the ad stamps 119 associated with an engagement ad 118, if available, as shown in FIG. 5. A user profile 510 may include categories 520 and 525 of ad stamps 119. The ad stamps 119 may be shown as storefronts 519 once the user profile 510 is accessed. At the same time, or during, the transmission of the ad stamps 119 in the advertisement system 100, the data and information required for its respective storefront 519 may be transmitted along with the ad stamp 119. However, in some embodiments, a content advertisement may save and include a storefront 519 in the user profile 510 without an ad stamp 119 being associated with the storefront 519. In these embodiments, the storefront 519 may be transmitted in the advertisement system 100 in a similar way to the ad stamps 119. For example, once a user accesses their user profile 510, the user system 150 may pull or the engagement system 110 may push the content and information associated with each storefront 519 that has not been downloaded. However, in some embodiments, the storefront 519 may be streamed, downloaded at preset times, downloaded at times when the storefront 519 is determined to be added to the user profile 510, among others.

Storefronts 519 may include a depiction of an image similar or different to the image shown in the ad stamps 119, and in some embodiments, storefront 519 may include a video clip or other type of moving image. As shown in categories 520 and 525, the engagement system 110 and/or user system 150 may sort the ad stamps 119 into different categories to enable the user to better access and sort the ad stamps 119. In some embodiments, categories 520 and 525 may include subcategories. For example, the categories could be based on criteria such as time of broadcast, type of product or service associated with the ad (e.g., tax services, cars, travel, sports, etc.), duration of ads, expired ads (ads for events or items that have already occurred or are no longer available), viewed ads, among others. In some embodiments, the user may be able to select the categories, alter the categories, and add and delete categories from categories 520 and 525.

Selection strip 530 enables the user to sort and select the storefront 519 based on geographic scope, seen in geographic scope 530a with the options of Global, National, or Local, among others. However, other geographic options may be included, and in some embodiments, there may be no geographic locations to choose from. Also, selection strip 530 may include an option to sort based on a list of pages, seen in page listing 530b, enter a search request in a search bar 530c, or options menu 530d, which in some embodiments may enable a user to adjust or modify settings. For example, users may be able to adjust their profiles or interests, pair devices to the engagement system 110, set parental controls, set the number of pages that are pulled up in each search, select the number of storefronts shown per page (described below), adjust colors, change category preferences, add or merge user profiles within a single residence, set location, zip code, or other location parameters, or set friends networks, among others. Additionally, in some embodiments, a geographic scope 530a, page listing 530b, search bar 530c, or options menu 530d may not be included, or in some embodiments, other options, selections, or variations may be included with regard to 530a, 530b, 530c, and 530d. Further, in other embodiments, additional or selections may be included in selection strip 530.

The number of storefronts 519 per page may be defined by a component of the advertisement system 100 or the user, among others. Additionally, as seen in the top corner of the storefront 519 in FIG. 5, the user may delete a storefront 519 by selecting the delete icon 535. The categories 520 and 525 and delete icon 535 are not required, and the number and location of the categories 520 and 525 and delete icon 535 are not required in the number or position as indicated in FIG. 5, as they may be in different number or locations and the location and size may vary for each ad stamp 119.

The engagement system 110, content system 130, and/or user system 150 may store in any memory of advertisement system 100 information related to the user and relate the saved information to the user profile 510, such as ad stamps 119 or storefronts 519 associated content advertisements that were broadcast, downloaded, recorded, streamed, or otherwise received by the user de system vice 150, a list of the ad stamps 119 or storefronts 519 the user selected, a list of the engagement ads 118 the user viewed and the length of time the user viewed each engagement ad 118 (or other type of content advertisement), and a list of the user's ecommerce activities within the user profile 510, among others. Also, the user may be enabled to manage the user profile 510, including deleting old or undesirable storefronts 519, ad stamps 119, and/or content advertisements, shifting storefronts' 519, ad stamps' 119, and/or content advertisements' positioning, setting storefronts' 519, ad stamps' 119, and/or content advertisements' priorities, requesting to be excluded from being shown certain types of ads, products or activities, saving certain storefronts 519, ad stamps 119, and/or content advertisements, viewing storefronts 519, ad stamps 119, and/or content advertisements, or organizing storefronts 519, ad stamps 119, and/or content advertisements according to categories, among others.

Also, in some embodiments, individuals, groups, or corporations unassociated with advertisements may be enabled to create storefronts 519, ad stamps 119, or content advertisements to be shown to the users. For example, a child of an elderly person, nurse, doctor or other service provider could be permitted, by the advertisement system 100 to place storefronts 519, ad stamps 119, or content advertisements on the elderly person's user system 150, whereby the elderly person would then be enabled to quickly make a selection to engage the storefront 519, ad stamp 119, or content advertisement provider instantly in communication (e.g., telephone or video conversation) to reach out for help or perform other activities. The user could place an icon for a new application, such as calendar, contacts lists, email, video conferencing, cooking recipes, health related information, directories, pictures, quick access to ecommerce (such as ordering medicine refills, pizza or other food deliveries), emergency services, friends or family direct contact, etc. The stamp also could be set to become part of the user profile 510. Also, there may be multiple other applications for individuals, groups, or corporations unassociated with advertisements to create storefronts 519, ad stamps 119, or content advertisements.

In some embodiments, when an ad stamp 119 or content advertisement is shown, a user may be enabled to select to purchase the service or good that is depicted on the display 152 of the user system 150 by the use of ecommerce. In some embodiments, a user may be enabled to use a pointer associated with a control device 160 to select different items or indicated services shown on the display 152 by the user system 150, to find out more information associated with the item or service and/or purchase the item or service (if these options are available). In some embodiments, a user, by the use of the control device 160, may be enabled to select to purchase a good or service that is shown in an ad stamp 119, content advertisement, storefront 519, or any other location on the display 152 by a selection made by the user on the control device (e.g., the user may only have to select one button or one touch on a touch screen in order to purchase a good or service depicted on the display 152). The user may only have to input their payment information, delivery location, and other necessary information one time in the user profile 510, and in some embodiments, the advertisement system 100 may be enabled to export the user's information to the user system 150 or other part of the advertisement system 100 from another location.

Figure 6:
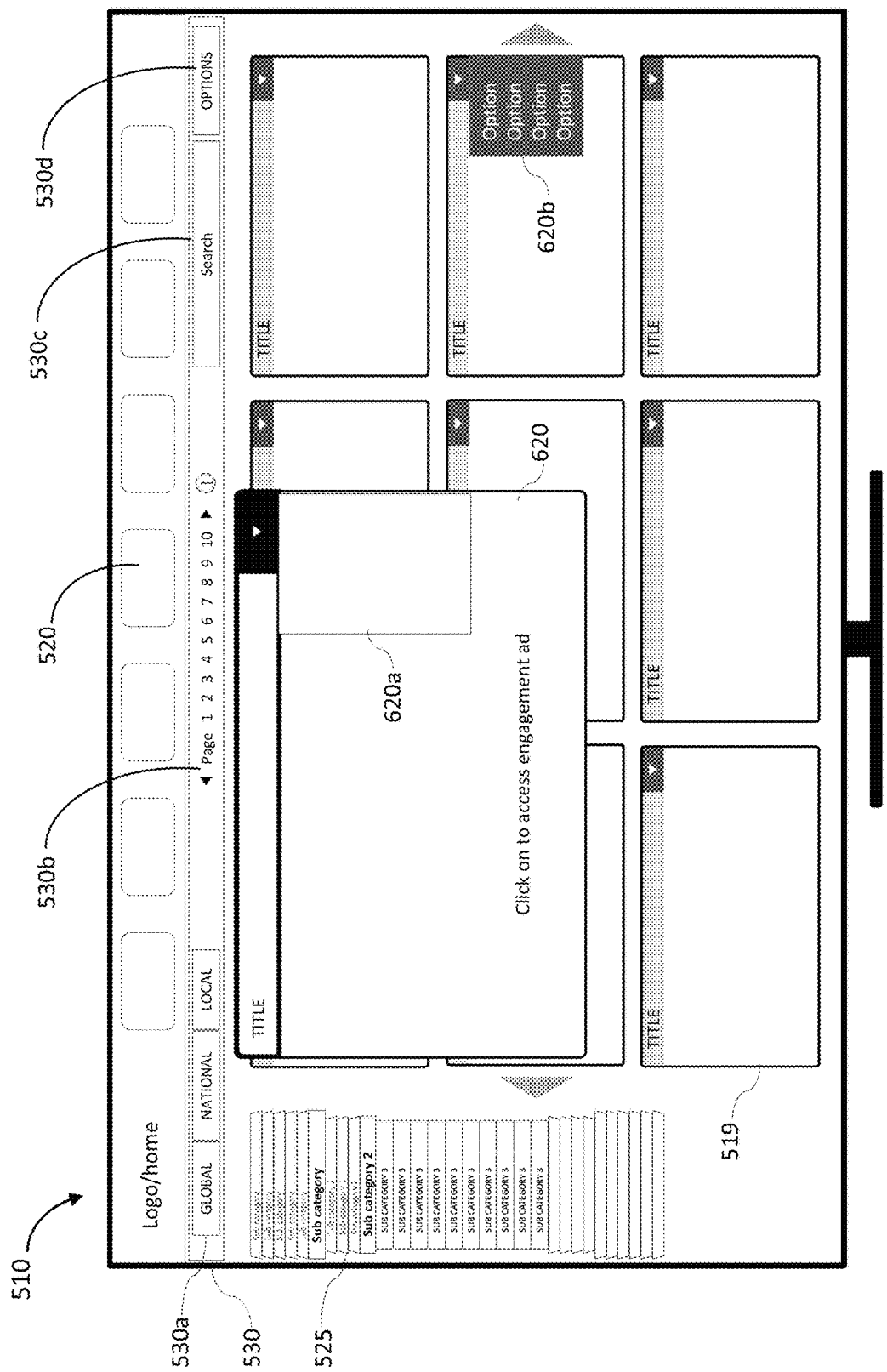
FIG. 6 is an exemplary user profile with a pop-up and options selections on the display of the advertisement system of FIG. 1, in accord with one embodiment of the current disclosure.

FIG. 6 shows the user profile 510 of FIG. 5 with a pop-up interface 620 that appears when a user, using control device 160, places a pointer or otherwise navigates selections on the display 152. Pop-up interface 620 may appear when a user hovers over or otherwise selects a particular store front 519 (associated with an ad stamp 119). The pop-up interface 620 may show a short video, advertisement, or content preview related to the respective storefront 519. However, in other embodiments, the pop-up interface 620 may depict a still image or other type of image or logo. As can be seen, in the current embodiment, when the pop-up interface 620 is shown, the user is still able to see some, or at least a portion, of the surrounding storefronts 519 shown on the particular page. Although the surrounding store fronts 519 may be seen in the current embodiment, such a configuration is not required.

Also, in some embodiments, if the user hovers over or otherwise selects the arrow or other identification indicated as options 620a, the pop-up interface 620 will display different options that are available for the user. Options 620a is not required, and in some embodiments, options 620a may include a different symbol of the options and may be in a different location from that depicted in FIG. 6. Options 620a may include options of, for example, mark content/storefront, customize, send to mobile, send to friend, among others. If mark content/storefront is selected, then the user profile 510 stores the marked content. If customize is selected, the user may be enabled to modify the pop-up, choose to not see a particular pop-up in the user's user profile, see more of a particular category associated with a particular pop-up, among others. If send to mobile is selected, the advertisement system 100 uses information provided by the user or otherwise saved related to the user in order to send the information (e.g., a link, ad stamp 119, or content advertisement, among others) via text message, short message service (SMS), email, Dooreme application, or any other known method to the user's or another's mobile device. If send to friend is selected, the advertisement system 100 uses information provided by the user, previous information supplied regarding information sent to another, or otherwise information saved related to another on the user's user profile or another's user system 150 in order to send the information (e.g., a link, ad stamp 119, or content advertisement, among others) via any other known method to another (e.g., via mobile device, user system, tablet, or other electronic device). Additionally, in some embodiments, if a user hovers over or otherwise selects the indicator labeled option 620b of the storefront 519, then the options provided in options 620a may drop down or otherwise appear in the storefront 519 of the selected options 620b. However, in other embodiments pop-up interface 620, options 620a and/or 620b may not be included, and in some embodiments, options 620a and 620b may be located in different locations, include different indicators, and/or include different options from one another.

Further, the engagement system 110 and/or user system 150 may collect anonymous and/or public user data regarding interactions with the content of the advertisement system 100, including, for example, saved storefronts 519, ad stamps 119, and/or content advertisements, clicked on storefronts 519, ad stamps 119, and/or content advertisements, viewed storefronts 519, ad stamps 119, and/or content advertisements, and the duration of the view of each engagement ad 118, what broadcast channel the ad stamps 119, and/or content advertisements associated lead ad 138 came from, and the time it was served, among others. Additionally, the advertising system 100 could offer additional storefronts 519, ad stamps 119, and/or content advertisements performance measurements, such as, for example, if users interact more with storefronts 519, ad stamps 119, and/or content advertisements with celebrities (or certain celebrities in them), if users interact with automobile storefronts 519, ad stamps 119, and/or content advertisements containing red cars more than other colors, among others. The advertisement system 100 may track preferences and history for each user that may be stored in any component of the advertisement system (e.g., engagement system 110, content system 130, user system 150) regarding the types of storefronts 519, ad stamps 119, and/or content advertisements or products and services the particular user likes based on their engagement behavior with the collection of storefronts 519, ad stamps 119, and/or content advertisements in their user profile 510. Based on information tracked, the engagement system 110 or other component of the advertisement system 100 may select, or otherwise recommend, what type of storefronts 519, ad stamps 119, and/or content advertisements should be served later to that particular user.

As previously mentioned, in some embodiments, the advertisement system 100 may be capable of monitoring user interactions with storefronts 519, ad stamps 119, and/or content advertisements and provide recommendations, based on information such as the number of storefronts 519, ad stamps 119, and/or content advertisements viewed by the user, the number of engagement ads 118 the user selected, whether or not the user watched the full duration of each engagement ad 118 (or if not, the length of time the user watched the engagement ad 118 or percentage of the full time), what type of storefronts 519, ad stamps 119, and/or content advertisements the user watched fully and partially, whether the user watched or selected a storefront 519, ad stamp 119, and/or content advertisement more than once, whether or not there is a correlating factor (e.g., determining interests based on categories like sports, news, documentaries, reality television, etc.) between the storefronts 519, ad stamps 119, and/or content advertisements the user selected and watched more of and/or more than once, among others.

The advertisement system 100 enables broadcasters, distributors, and/or MSO's to keep track of and analyze what users are watching. The advertisement system 100 enables the broadcasters, broadcasters, and MSO's to keep track of what viewers are watching because at least ad stamps 119, storefronts 519, and engagement ads 118 are sent to user systems 150 based on what users are watching. Therefore, the data associated with what users are watching may be kept track of by any component of the advertisement system 100. As such, the advertisement system 100 may be more beneficial than any other rating system (e.g., the Nielsen Ratings) because the advertisement system 100 may keep track of what is viewed by each user of the advertisement system 100, and the advertisement system 100 may have a lot of other information about the users because of information pertaining to demographics, location, viewing habits, among others.

Further, in some embodiments, storefronts 519 may be arranged to be placed, leased, or rented by an individual, company, or group that is represented by the advertisement or that paid for the advertisement, or some other individual or group associated with the advertisement. Such a lease or rental may be arranged or created by a request and information provided or other type of request by the individual, company, or group that is represented by the advertisement or that paid for the advertisement, or some other individual or group associated with the advertisement. In some embodiments, the request may be made by a selection at any location within the advertisement system 100, and the information associated with the storefront 519 may be uploaded or input in a form (e.g., a "do-it-yourself" electronic form) or application provided by the advertisement system 100. Such information and/or request may be provided to a component of the engagement system 110, content system 130, or user system 150. As previously described with respect to content advertisements, the information associated with a storefront 519 may be stored in any memory within the advertisement system 100, and transmitted, via any processor, to the user system 150 at different times or streamed. Also, the information related to each storefront 519 may be stored in the engagement system 110, the content system 130, the user system 150, or any other component of the advertisement system 100. In some embodiments, the price to lease or rent a storefront 519 may be fixed or variable, and if variable the price may be based on, for example, characteristics of a particular user (e.g., interest in a particular device, company, type of product or service, hours and time of day the user watches display 152, demographics, or other category, among others), demand for storefront 519 placements overall or based on certain time periods, the hierarchy or level of visibility for each storefront 519 (e.g., more costly to be on page 1 than page 5), the time of day or week, or viewership with respect to the user system 150 (e.g., primetime or important, highly watched, events are more costly), among others.

If a storefront 519 is leased or rented, a particular storefront 519 may be placed on a certain group of user systems 150, but the particular storefront 519 may not be placed on others user systems 150. Further, even if the same storefront 519 may be on more than one user's user system 150, the location and even content of the storefront 519 may be different on all user's user systems 150. Such determinations may be made by the engagement system 110, as previously described, and information obtained about the user with respect to the user profile 510 (e.g., user's viewing habits, likes, interests, purchases, demographics, etc.). For example, the engagement system 110 may enable the individual, company, or group that is represented by the advertisement or that paid for the advertisement, or some other individual or group associated with the advertisement to better use, or optimize, their advertising dollars for renting or leasing storefronts 519 based on the amount of money they will spend and the individualized information that may be accessible about any particular user. However, in some embodiments, different storefronts 519 may not be provided to the user system 150, and each user system 150 may be configured to have similar storefronts 519 in the same locations of the user profile 510. In some embodiments, the storefronts 519 may be regionalized or grouped among broader categories. When a user selects a storefront 519, the pop-up interface 620 may appear, and in some embodiments, a user may be able to select to see the engagement ad 118 and engagement ad interface 710 after display of the pop-up interface 620 or without the display of the pop-up interface 620. In some embodiments, different parameters may be used when storefronts 519 are leased or rented, and in some embodiments, the storefronts 519 may not be leased or rented.

Figure 7:
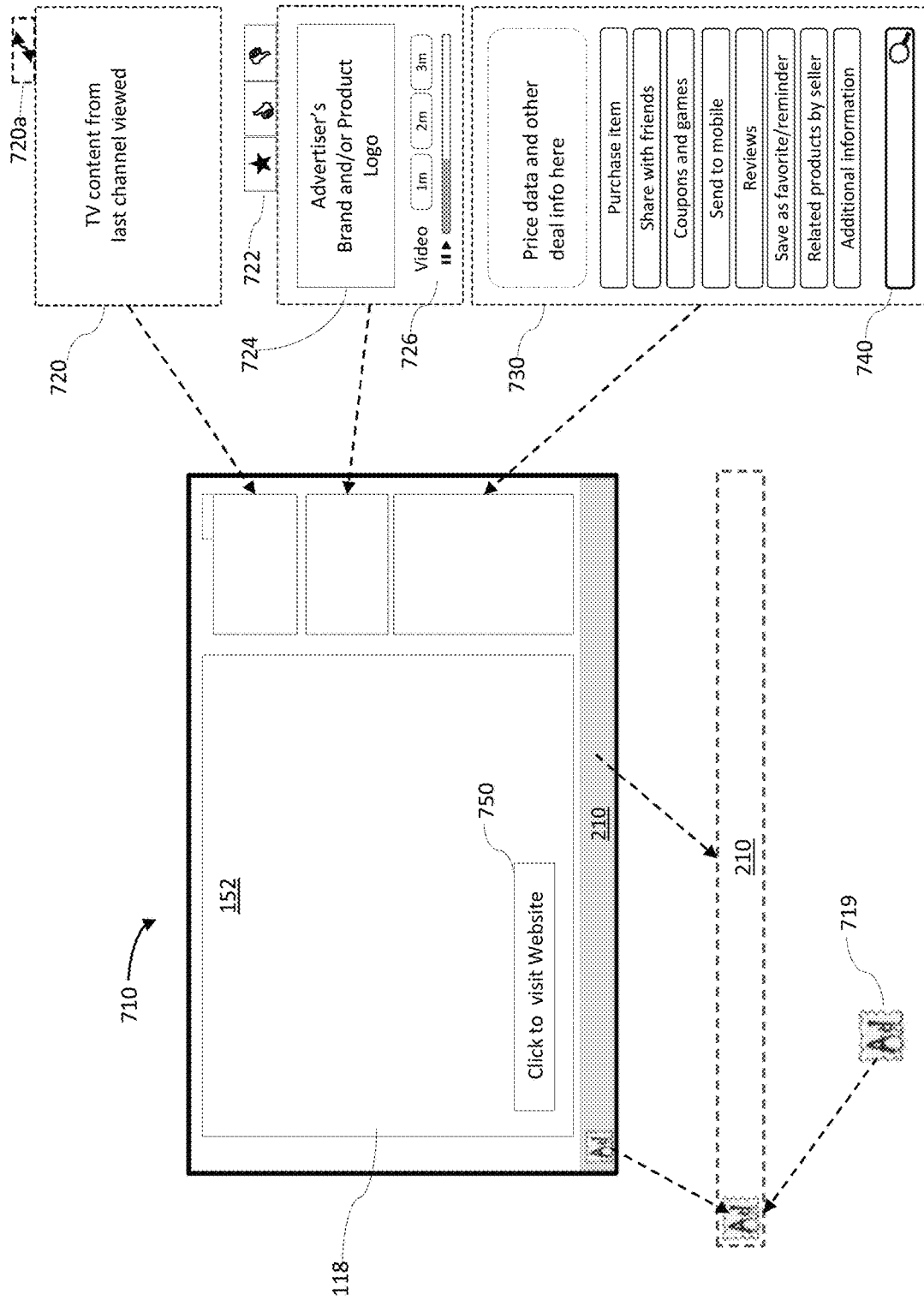
FIG. 7 is an exemplary user profile on the display of the advertisement system of FIG. 1, in accord with one embodiment of the current disclosure.

FIG. 7 shows an engagement ad interface 710, which includes an area on the display 152 for an engagement ad 118 to be shown, which may vary and change. The engagement ad 118 may be automatically selected or manually selected by the user from the ad stamps 119 of the user profile 510, as shown in FIG. 5. On the side of the strip 210, a profile icon 719 may be provided. The shape, icon, and location of the profile icon 719 is not essential, and any other shape, icon, or location may be used. Also, in some embodiments, the profile icon 719 is not provided. If the user selects the profile icon 719, the user system 150 will be modified to display the user profile 510 on display 152 of FIG. 5. Engagement ad interface 710 may also include a content box 720 that would enable a user to see the content that is provided from the content system 130 to the user system 150 (i.e., the programming that is on the channel the user has selected to be received and displayed). Additionally, toggle 720a may be provided, which enables the user to switch to a full screen display of the content in content box 720 on the display 152. In some embodiments, after the content of content box 720 is displayed in full screen on display 152, a toggle 720a may also be provided at some location on display 152 for a fixed or variable period of time to enable the user to return to engagement ad interface 710.

Engagement ad interface 710 may also include an interest section 722, which may include options for the user to interact and select whether they are interested (e.g., thumbs up icon) or uninterested (e.g., thumbs down) in the engagement ad 118, and interest section 722 also enables users to mark the engagement ad 118 as a favorite (e.g., the star symbol) and delete the currently displayed engagement ad 118. Engagement ad interface 710 may also include engagement ad information 724, which may include a logo or other product/service identification, and a video tool 726. Video tool 726 enables the user to select a video about the product/service in the engagement ad 118 that lasts different lengths of time or covers different aspects of the product/service in the engagement ad 118. Also, video tool 726 may include a video measurement tool that indicates the length of the video and how much of the video has been watched at a given time. All such information can be logged in the user system 150, advertisement system 110, the user profile 510, or a combination thereof, and such information may be used by the person, group, or company that logs the information or passed along and/or sold to other persons, groups, or companies that may find the information valuable (e.g., target advertising).

Engagement ad interface 710 may also include an information section 730 that enables the user to do a multitude of things, including selecting from additional options. For example, information section 730 may include an option for the user to obtain price information associated with the engagement ad 118 product or service, an option for a user to purchase the product or service by the use of ecommerce. The ecommerce option may be a link to an application or uniform resource locator (URL) directing the user to a website provided by a third party (e.g., direct the user to Amazon or other online retailers); however, in some embodiments, the engagement system 110, content system 130, and/or user system 150 may provide a program or system to the user in order to complete an ecommerce transaction. In some embodiments, a digital wallet may be saved to the user profile 510 where the user may be able to save their payment information (e.g., credit card) to enable the user to order items or services without providing their payment information multiple times (e.g., a "quick action" button). Such an option enables the user to act quickly and get back to viewing content thereafter, or to act quickly to order product/service in cases when the product/service is being auctioned, or where there is a limited supply, or offered only to the first (number) of consumers that apply. In some embodiments, the individual, company, or group that is represented by the advertisement or that paid for the advertisement, or some other individual or group associated with the advertisement may have the ability to change an offering of or certain features of the supplied ecommerce at the time of designing the engagement ad 118 and ad stamp 119. Also, in some embodiments, after the engagement ad 118 and/or ad stamp 119 are created, changes may occur by a selection made from a list of offered features and tools provided by the engagement system 110, or otherwise, by requesting the addition of other features and tools.

Additionally, information section 730 may include an option to share information associated with the engagement ad 118 product or service with friends, an option to use coupons or play games associated with the engagement ad 118 product or service (e.g., user can use the coupons to purchase or play games provided by the person, group, corporation, or associated entity in order to win discounts or free items), an option to send information associated with the engagement ad 118 product or service to another user's or another's mobile or smart device, an option to see reviews or conduct a review of a product or service, an option to save as favorite/reminder, an option to find related products or services, an option to obtain additional information, and an option to conduct a search using a search box 740. Such options in the information section 730 are not required. Some may not be included in the information section 730, and additionally, some options not disclosed above may be included.

Further, in some embodiments, a website option 750 may be included to enable the user to be directed to the website of the individual, group, company, product, or service associated with the engagement ad 118. Moreover, the location, description, and form of each of the at least engagement ad 118, content box 720, toggle 720a, interest section 722, engagement ad information 724, video tool 726, information section 730, website option 750, strip 210, profile icon 719, or any other option or section on the engagement ad interface 710 is not meant to be limiting and the location, description, form, as well as more or fewer options may be provided on the engagement ad interface 710.

Figure 8:
FIG. 8 is an exemplary user profile on the display of the advertisement system of FIG. 1, in accord with one embodiment of the current disclosure.

FIG. 8 shows the engagement ad interface 710 of FIG. 7; however, FIG. 8 includes an exemplary engagement ad 118 and other associated information. Additionally, in some embodiments, when additional ad stamps 119 are provided, as seen in strip 210, the user may select a new engagement ad 118 to view by selecting its associated ad stamp 119 without returning to the user profile 510.

Content system 130 and/or engagement system 110 operators may utilize the advertisement system to charge advertisers a fee for the engagement ad 118 and ad stamp 119 and the content advertisement, clicks on ad stamps 119 and viewing of associated engagement ads 118, links to full page, or partial page e-commerce or websites, among others. The costs of ad stamps 119 and engagement ads 118 may be based on a percentage of the costs of the associated lead ads 138.

Figure 9:
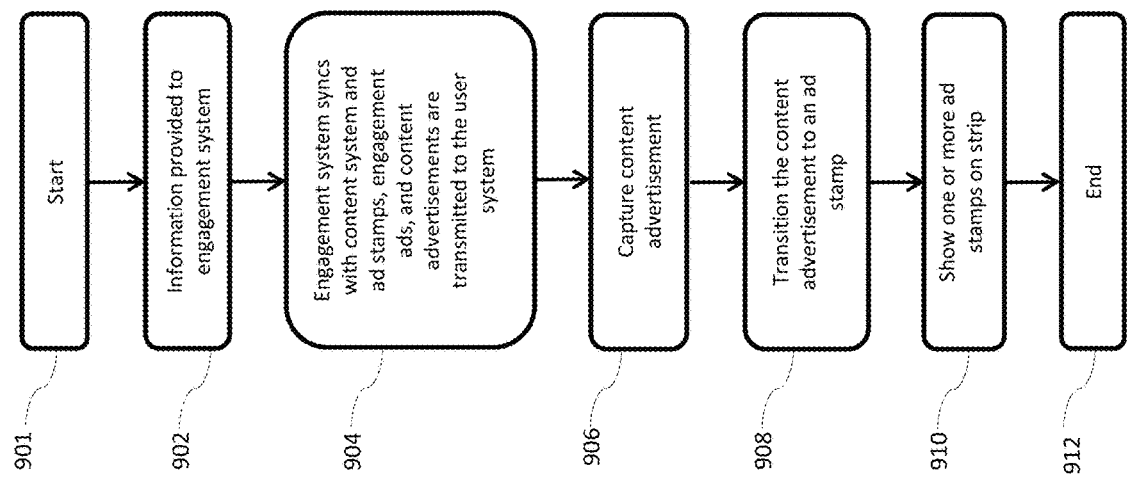
FIG. 9 is a flow diagram illustrating a method and process for displaying an ad stamp on the display of the advertisement system of FIG. 1, in accord with one embodiment of the current disclosure.

FIG. 9 shows a method and process for displaying an ad stamp 119 on the display 152. As shown in block 902, a person, group, corporation, or advertisement agency may provide or enable information to be provided to the engagement system 110 and stored in memory 114. Such information may include an engagement ad 118, an ad stamp 119 (including the icon to be displayed), a date the engagement ad 118 and ad stamp 119 should no longer be used, website information, a logo and/or name of the individual, group, or corporation, product, and/or service, a picture of the product or service, a minimizing lead ad 138a, categories the engagement ad 118 and ad stamp 119 would apply to, additional videos to be viewed (such as videos in 726), a website and other ecommerce sources where the product or service may be found, products or services related to the engagement ad 118 or ad stamp 119, and any additional information they may wish to provide. If the engagement ad 118 and ad stamp 119 are associated with an ad placement 438, then the individual, group, or company may provide information about the broadcast or programming the ad placement 438 occurs in and when the ad placement 438 occurs in the programming.

As shown in block 904, the engagement system 110 is synced with the content system 130, and the ad stamps 119, engagement ad 118, and content advertisements are transmitted to the user system 150. Also, the order of syncing and transmission is not required to be the same, and different embodiments may adjust and vary the order of syncing and transmitting. Syncing may occur in a multitude of ways. In some embodiments, a unique identification may be assigned to a particular engagement ad 118 and/or ad stamp 119, and the unique identification may be transmitted to the content system 130 and associated with a corresponding lead ad 138, ad placement 438, and/or card ad 139, or as a group the content advertisement (not required to include at least one of each, can be one or more of the lead ad 138, ad placement, and card ad 139). When a content advertisement is transmitted and played on a particular user system 150, the engagement system 110 may transmit the engagement ad 118 and ad stamp 119 to the user system 150 (push) or the user system 150 may request the engagement ad 118 and ad stamp 119 from the engagement system 110 (pull). In some embodiments, once the engagement ad 118 and ad stamp 119 are input and stored in the engagement system 110, the engagement system 110 may transmit the engagement ad 118 and ad stamp 119 along to the content system 130, and once the content advertisement is sent to and captured on the user system 150, the engagement ad 118 and ad stamp 119 are sent along with the content advertisement, and are thereby available for the user system 150 to display and play.

Still in some embodiments, once the engagement ad 118 and ad stamp 119 are input and stored in the engagement system 110, the engagement system 110 may transmit the engagement ad 118 and ad stamp 119 along to the user system 150 (or the user system 150 may request the engagement ad 118 and ad stamp 119 to be transmitted) at predefined times or based on information associated with what the user usually watches at certain times and days, certain programs the user records or watches, or what type of programming or channel the user is currently watching or scheduled to record or watch in the future, among others. Once the content advertisement is transmitted and played on the user system 150, the engagement ad 118 and ad stamp 119 will be stored based on a corresponding unique identification related to the content advertisement, and the engagement ad 118 and ad stamp 119 may be configured to be ready to play on the user system 150 or the user system 150 may then run a check to see if the engagement ad 118 and ad stamp 119 are stored at the user system 150.

As shown in block 906, the content advertisement may be captured (e.g., shown or recorded) at the user system 150, and once the content advertisement begins to play or record, the user system 150 may search the advertisement system 100 to find out whether or not there is an engagement ad 118 or ad stamp 119 associated with the particular content advertisement (e.g., by the methods described above relating to the unique identification, or transmitted along with the content advertisement). However, in some embodiments, this step is not required. The user system 150 may search the memory 156 of the client server 154 to clarify that the engagement ad 118 and/or ad stamp 119 are downloaded or otherwise stored at the user system 150. If the engagement ad 118 and/or ad stamp 119 are not stored at the user system 150, then the user system 150 will download, stream, or otherwise receive the engagement ad 118 and/or ad stamp 119 from the engagement system 110. In some embodiments, if both the ad stamp 119 and engagement ad 118 are not stored at the user system when the content advertisement begins to play or record, the advertisement system 100 may prioritize downloading, streaming, or otherwise receiving the engagement ad 118 or ad stamp 119 from the engagement system 110 before the other. In some embodiments, when the content advertisement is recorded, the content advertisement shown when the recorded content is played and/or viewed (e.g., from a digital video recorder that may be associated with the client server 154) may freeze or otherwise adjust (e.g., show a particular logo or item) if the user fast forwards through the content advertisement.

Block 908 indicates that once the content advertisement is shown, the user system 150 may be configured to transition the content advertisement to the associated ad stamp 119 by, for example, the use of a minimizing lead ad 138*a* or minimizing ad placement 438*a*. However, in other embodiments, the content advertisement may transition to the associated ad stamp 119 without any minimizing lead ad 138*a*, minimizing ad placement 438*a*, or other type of minimizing effect (e.g., minimizing a card ad 139 to the strip of ad stamps 119). The advertisement system 100 may be aware of when the content advertisement is complete based on timing information provided by the content server 140, or by otherwise tracking the time and knowing the length of time each content advertisement will play.

At block 910, the engagement system 110, user system 150, or other component of the advertisement system 100 may determine which ad stamps 119 to show on strip 210. As previously described, if there are more than a certain number (e.g., about twenty) of ad stamps 119 to show on strip 210, then a different icon (such as an ad stamps indicator 219) may indicate that a certain number of ad stamps 119 are saved or stored within that icon. Additionally, engagement system 110, user system 150, or other components of the advertisement system 100 may analyze which ad stamps 119 to show on strip 210 based on the channels and time the user system 150 was tuned to the one or more channels (including recordings), the current time or time the content advertisement was viewed, the dates and/or times of certain events and deals associated with the ad stamp 119 and storefronts 519, among others. Therefore, in some embodiments, if the current time is after the time and date of an occurrence (e.g., an event, deal, or other ending date and time provided by the person, group, corporation, or advertisement agency related to the engagement ad 118 and ad stamp 119), then the ad stamp 119 may not appear on the strip 210 even if the content advertisement still plays and appears.

Further, in some embodiments, the engagement system 110 may add or replace ad stamps 119, storefronts 519, and engagement ads 118 that are not associated with content advertisement that were played on programming the user watched or other recorded programming by the user. In this case, the newly added ad stamps 119 would be shown on the strip without an associated lead ad 138, ad placement 438, and/or card ad 139. Such determinations to add new ad stamps 119 may be made manually or automatically by the engagement system 110 based on, among other things, information associated with the user of the user system 150.

Figure 10:
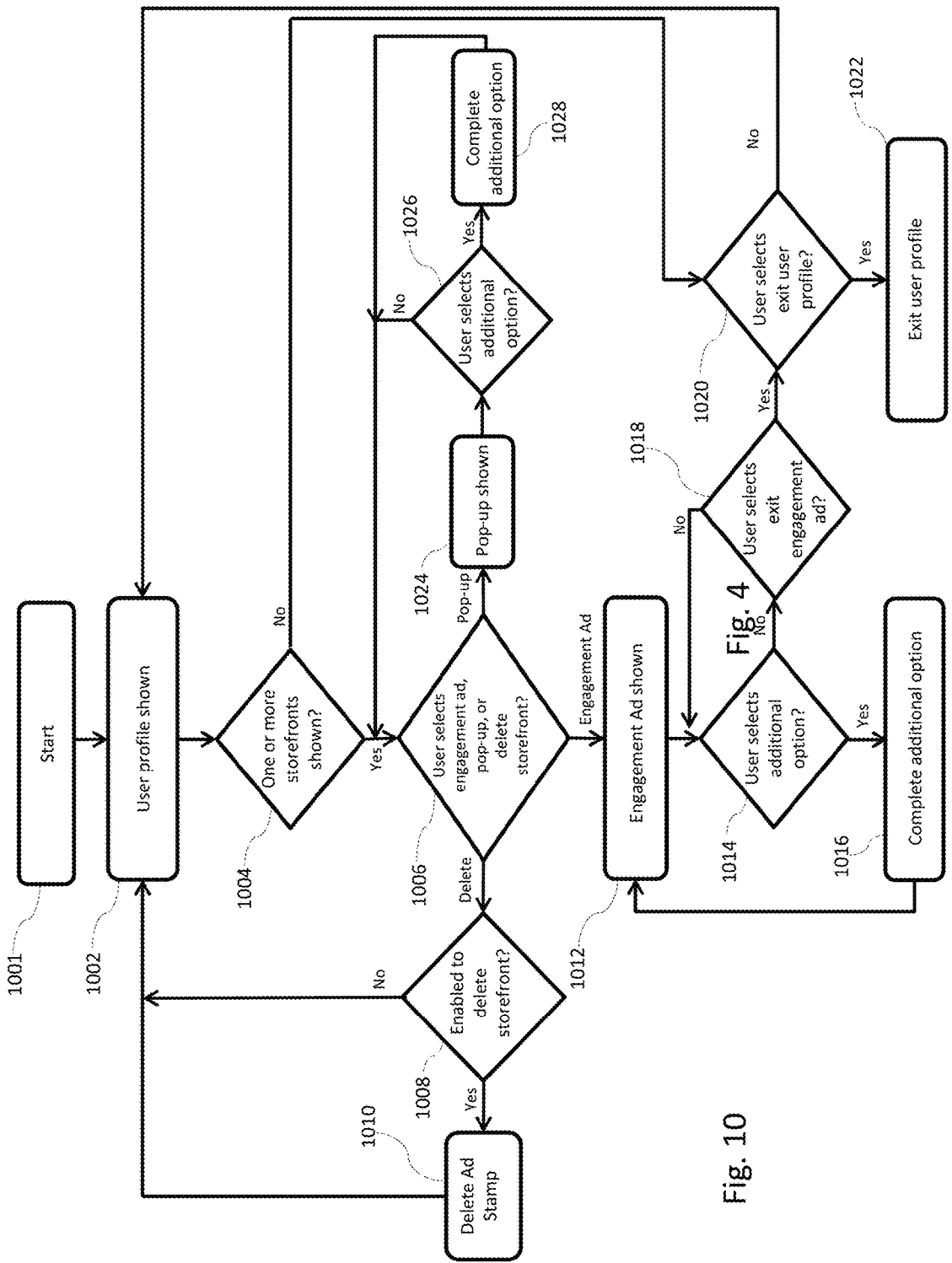
FIG. 10 is a flow diagram illustrating a method and process for accessing and utilizing the user profile, engagement ad, and associated features in the advertisement system of FIG. 1, according to various implementations of the present disclosure.

FIG. 10 shows a flow chart for the user profile 510, engagement ad 118, and associated features to be accessed and utilized in the advertisement system 110. Block 1002 indicates that the user profile 510 is shown. In some embodiments, the user profile 510 may be selected by the user, as previously described, or the user profile 510 may be automatically shown. Block 1004 indicates that the engagement system 110, user system 150, or a combination of the two may determine whether or not there are ad stamps 119 or engagement ads 118 to show. If there are not any ad stamps 119 or engagement ads 118 to view, the user may be able to select to exit the user profile 510 (shown at block 1020). When the user profile 510 is automatically shown, the user profile 510 may be the initial interface or home page for the user system 150, or the engagement system 110 and/or user system 150 may require the user to view a certain number of engagement ads 118 before the user can return to viewing the content and user recordings on the user system 150. For example, the user may be required to view five to ten engagement ads 118 per day, week, per hour of content watched, or other defined time period or condition. Additionally, the user may be prompted by the user system 150 or engagement system 110 to be able to see content or recorded content without lead ads 138, ad placements 438, and/or card ads 139 if the user agrees to watch a certain number of engagement ads 118 by a certain date and time. In some embodiments, one or more ad stamps 119 may be configured to be removed from the strip 210 after a period of time.

At block 1006, if there are ad stamps 119 or engagement ads 118 to show, a user may select to delete or view certain engagement ads 118 by selecting the ad stamp 119 associated with the engagement ad 118. If the user selects to delete certain ad stamps 119 and associated engagement ads 118 by the use of delete icon 535, the user system 150, engagement system 110, or a combination of the two may determine if the user is able to delete them, as shown in block 1008. The user system 150, engagement system 110, or a combination of the two may have certain requirements associated with them to always have a certain number of ad stamps 119 to display on the user profile 510, or not delete certain ad stamps 119, among other requirements. Therefore, in some embodiments, the user may be unable to delete one or more of the ad stamps 119 appearing on the user profile 510 based on certain conditions related to the user profile 510. If the user is able to delete the selected ad stamp 119, shown at block 1010, then the ad stamp 119 will be removed from the user profile 510. If the user is unable to delete the selected ad stamp 119, then the user profile 510 may provide a message to indicate the ad stamp 119 may not be deleted and return to the user profile 510 or just return directly to the user profile 510, otherwise returning to block 1002.

As shown in block 1012, the user may select to view engagement ads 118. A user may select to view one or more engagement ad 118 because, for example, they are required to (as described above), they receive rewards or credits for their internet/cable bill for each or each set of engagement ads 118 they view, they receive points to use as rewards for products and services, etc. After the user selects to view an engagement ad 118 by selecting the associated ad stamp 119, the engagement ad 118 is shown as in FIGS. 6 and 7.

Additionally, as shown in block 1014, after the engagement ad 118 is shown, the user may select additional options as described in FIGS. 7 and 8. If an additional option is selected, as shown in block 1016, the additional option is complete, and the user profile 510 will return the engagement ad 118 that was shown in block 1012. If an additional option were not selected, then as seen in block 1018, the user may select to exit the engagement ad 118. If the user selects to exit the engagement ad 118, then the user may select to exit back to the user profile 510, seen at block 1020, and return to block 1004. Otherwise, if the user does not want to exit to the user profile 510, then the user may return to the content of user system 150 (if enabled, as previously discussed), seen at block 1022. The exits associated with block 918 and 920 may be done by a prompt provided by the user profile 510 or by the user without a prompt, among other ways.

As shown in block 1024, the user may select or otherwise initiate the pop-up interface 620, shown in FIG. 6. After the pop-up interface is shown in block 1024, the user may select an additional option, as described and shown in FIG. 6. If the user selects an additional option, as shown in block 1026, then the additional option may be completed at block 1028, and the user system 150 may return to block 1026. However, if a user does not select an additional option, then the user system may return to block 1006.

Figure 11:
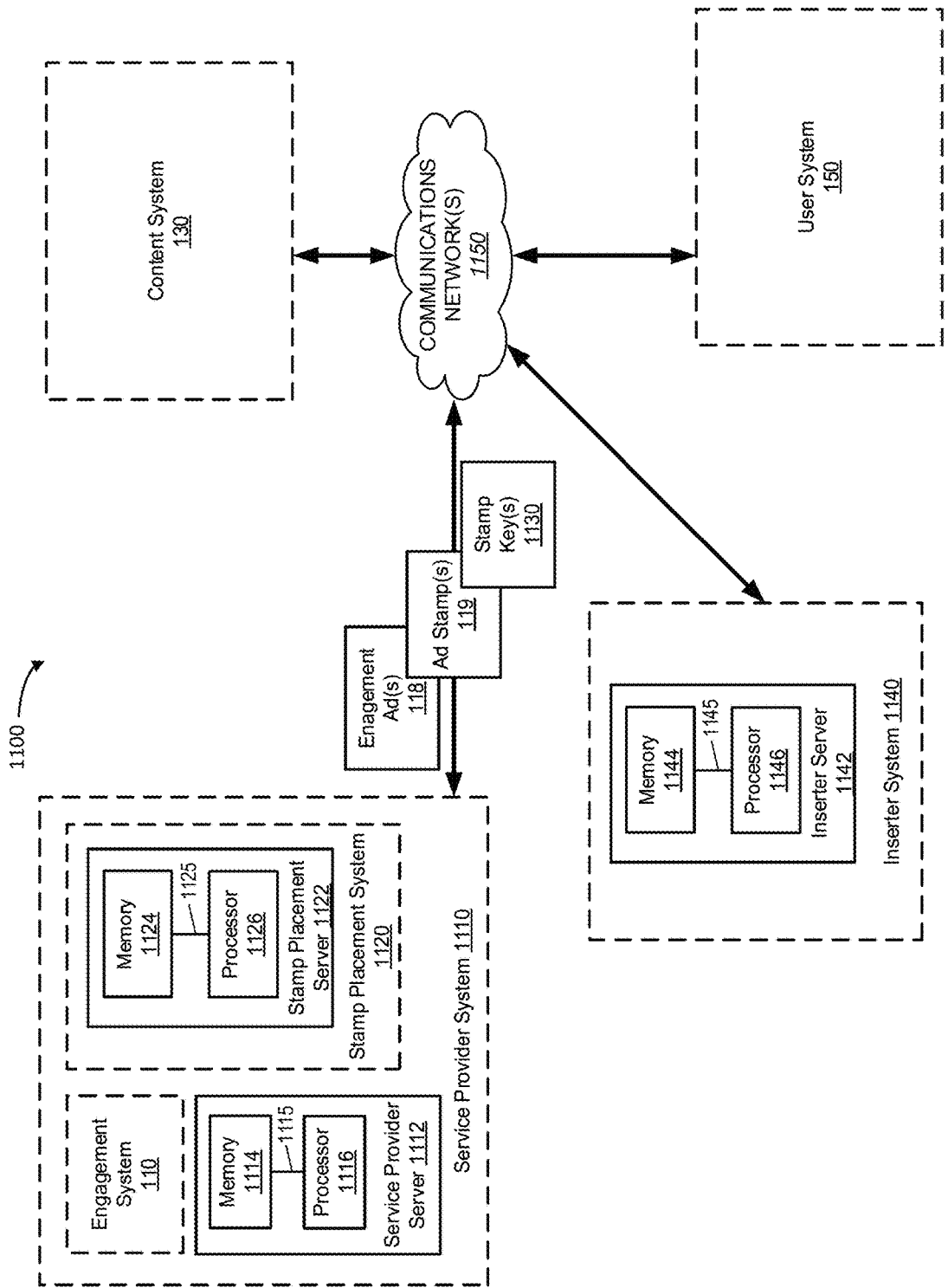
FIG. 11 is a block diagram illustrating a computer architecture for computing devices described herein as part of an advertisement system, in accord with one embodiment of the current disclosure.

FIG. 11 is a block diagram illustrating a computer architecture for computing devices described herein as part of an advertisement system 1100, in accord with one embodiment of the current disclosure. The advertisement system 1100 may also be referred to herein as the "Dooreme system" or "Dooreme". As shown in FIG. 11, similar to FIG. 1, for example, advertisement system 1100 may include a service provider system 1110, an engagement system 110, a stamp placement system 1120, an inserter system 1140, a content system 130, and a user system 150. However, the engagement system 110 may be included as a part of the service provider system 1110. The service provider system 1110 may include a service provider server 1112 that includes one or more memory 1114 operatively connected by connection 1115 (similar to connection 115 described in FIG. 1) to one or more processor 1116. The at least one memory 1114 and at least one processor 1116 are not required to be at the same location as one another or at the same locations as other portions of the memory 1114 and processor 1116. Service provider server 1112 may be a web server or any other type of server that enables communication of commands and data content.

The service provider system 1110 may include the engagement system 110 and a stamp placement system 1120. The stamp placement system 1120 may include a stamp placement server 1122 that includes one or more memory 1124 operatively connected by connection 1125 (similar to connection 115 described in FIG. 1) to one or more processor 1126. The at least one memory 1124 and at least one processor 1126 are not required to be at the same location as one another or at the same locations as other portions of the memory 1124 and processor 1126. Stamp placement server 1122 may be a web server or any other type of server that enables communication of commands and data content.

In some embodiments, engagement ad(s) 118, ad stamp(s) 119, and stamp key(s) 1130 (as described in further detail herein) may be stored in the engagement system 110, service provider system 1110, stamp placement system 1120, or in the inserter system 1140. Additionally, these and other systems, including the user system 150, and content system 130, are capable of interacting and communicating via one or more communication network(s) 1150. The communication network(s) 1150 may include telephone lines, such as land line or public switched telephone network (PSTN) systems, mobile phone channels and systems (e.g., cellular towers), communication channels for exchanging data and information, such as a local area network (LAN), wide area network (WAN), the Internet, or other data, communication, and/or telecommunication networks. Communication network(s) 1150 may transmit errors, problems, issues, complaints, or comments, among others between the engagement system 110, service provider system 1110, stamp placement system 1120, the inserter system 1140, and user system 150.

Content system 130 may also be included in the advertisement system 1100. In the current embodiment, in addition to the description in FIG. 1 included herein, the content system 130 may include information and other content that is provided by a content provider, multichannel video programming distributor (MVPD), broadcaster, over-the-top (OTT) content service provider, and/or multi-system operator (MSO) of content. In some embodiments, an advertisement agency may provide the content and information to the content system 130.

Also, in some embodiments, the engagement system 110, and service provider system 1110 may be combined and operate on the same one or more servers. Additionally, in some embodiments, the engagement system 110 may be able to exchange information and communicate with the content system 130 through communication network(s) 1150. In some embodiments, the advertisement system 1100 may include more than one service provider system 1110, more than one engagement system 110, more than one stamp placement system 1120, more than one inserter system 1140, more than one content system 130, and more than one user system 150.

Inserter system 1140 communicates with and receives information, content advertisement, and content (including but not limited to engagement ads 118, ad stamps 119, stamp keys 1130, storefronts 519, engagement ad interface 1300, mall interface 1500, entertainment content, and/or ad placement 438) from the service provider system 1110 and/or the content system 130 through communication network(s) 1150. In the current embodiment, an inserter system 1140 may be a stand-alone system; however, the inserter system 1140 may be combined with and/or operate in conjunction with the service provider system 1110, the content system 130, and user system 150. In some embodiments, a portion of or all of the engagement system 110 may be combined with the inserter system 1140 and operate from the same location as the user system 150, service provider system 1110, content system 130, or in a remote location. In some embodiments, a portion of or all of the inserter system 1140 may be combined with the service provider system 1110 and operate from the same location as the service provider system 1110 and/or in a remote location. In some embodiments, a portion of or all of the inserter system 1140 may be combined with the content system 130 and operate from the same location as the content system 130 and/or in a remote location. In some embodiments, a portion of or all of the inserter system 1140 may be combined with the user system 150 and operate from the same location as the user system 150, for example, as an OTT content device, a set-top box, other type of cable box, a web server, or any other type of device that enables communication of commands and data content. In an example embodiment, the inserter system can be installed as a software platform within the content system 130, for example, such that a distributor, a programmer, or the like, of media content can run the inserter system 1140 on their respective servers, or run an application of the inserter system from a cloud environment.

The inserter system 1140 may include an inserter server 1142. Inserter server 1142 may include one or more memory 1144 operatively connected by connection 1145 to one or more processors 1146. The at least one memory 1144 and at least one processor 1146 are not required to be at the same location or at the same locations as other portions of the memory 1144 and processor 1146. Connection 1145 may include a wired connection, wireless connection, or a combination of a wired and wireless connection. The connection 1145 may use communication channels for exchanging data and information, such as a computer bus channel, a local area network (LAN), wide area network (WAN), the Internet, among others.

User system 150, as described in FIG. 1 included herein, may also be included in the advertisement system 1100. The user's control device 160, as described herein, may include mobile devices such as smart phones, including iPhones, BlackBerries, and Android-based devices, application-enabled mobile phones, personal computers, etc. Furthermore, as described in FIG. 1, the user system may include a software application on the user device. In some embodiments, the software application may execute directly on a control device 160 and interface with the client server 154 over the communication network(s) 1150. The software application may further represent a web-based application executing on the client server 154 or other web server and delivered to a web browser executing on the control device 160 over the communication network(s) 1150. The software application may be implemented in hardware, software, or any combination of the two on the control devices 160, the client server 154, and/or other computing systems in the advertisement system 1100. The software application may also be referred to herein as the "Dooreme app," "Dooreme application," "Adport app," or "AdPort application." The Dooreme application, as described herein, provides better information than current systems about the user to the content provider, or the like. For example, the Dooreme application can provide the GPS location, wallet information, name and number, time of use, travel routs, consumer gender, personal preference, etc.

The Dooreme application may act as a companion application for the television or other media content display device, and the Dooreme application be used as remote control to manage the television usage. In one embodiment, the Dooreme application may utilize a mirroring feature, wherein the control device 160 will act as a second screen looking at and managing the same user profile 510, the engagement ad interface 710 or 1300, or the mall interface 1500, that appears on the user's television. This mirroring feature may provide full integration and/or convergence between any different media platform, for example, television, Internet and mobile applications. With cloud-based user profiles and media content being managed through any type of media device, the user experience may be significantly enhanced—allowing the user to start the viewing experience on one device, such as the control device 160, and then easily shift to another device. In some embodiments, the Dooreme application on the control device 160 may allow engagement with the service provider system 1110 by displaying the selectable icon 1210, during other operations of the mobile device allowing quick access to the Dooreme application, or, as an example, to save engagement ads 118 to the user's profile 510 as a favorite. The selectable icon 1210 can comprise a watermark, an overlay, or similar method to embed a custom selectable element on a website, media content, or the like, on a display.

The Dooreme system provides an integrated, full-stack platform for television with digital and mobile capabilities. The Dooreme system integrates and manages all types of content, search, promotion, scheduling, user access, engagement and monetization with full-stack advertising tools including new techniques for ad display, user engagement, ad impact magnification, e-commerce capabilities, and new user and advertiser management of ad activities. The Dooreme system provides seamless integration with mobile and digital technologies and environments.

In some embodiments, the advertisement system 1100 and user system 150 may work with regular, distributor provided remote controls, or any other media content provider described herein. The user system 150 may only need a few buttons (direction buttons and select button) to navigate through ad stamps 119, storefronts 519, and categories 520, 525, and 1502 (including the category roller(s) 1510). The remote control buttons may be repurposed during an ad break, for example, to work with the advertisement system 1100. In other embodiments, the advertisement system 1100 may integrate with media platforms developed by any media content provider to enable use of their technology infrastructure and features, for example, voice commands and button selectors in remote controls, to enable simple integration and convenience for the user. In some embodiments, the ad stamp(s) 119 could be numbered so that existing remote controls could be used to select ad stamp(s) 119 and access corresponding engagement ads 118. For example, one button on a remote could be designated to switch numbers functionality between ad stamp(s) 119 and channel changing.

In some embodiments, the advertisement system 1100 may detect if the user system 150 is using a connected TV, a smart TV, or the like, and utilize that connection to serve ad stamp(s) 119, bypassing MVPDs if necessary, when there is a direct connection between the television and the Internet.

In some embodiments, the advertisement system 1100 may assign new identification numbers to users to help content providers provide personalization, but without revealing the true identification of the consumer. The advertisement system 1100 may use data from the user's control device 160, another mobile device, or zip codes, to determine the local designation of the consumer. The advertisement system 1100 may allow content to be sorted on a local, national, and global levels. Advertisers may target users on a global level (everywhere in the world), in particular nations or in local cities or towns, using the advertisement system 1100.

In some embodiments, the advertisement system 1100 may detect whether a user has seen a particular content advertisement, engagement ad 118, ad stamp 119, storefront 519, or any other content media described herein. Further, the advertisement system 1100 may detect whether a user saw the entire media content or a portion of it. The advertisement system 1100 may then determine if the consumer is entitled to see this particular content once or twice for free, or may have to pay to see it a second or more times. This determination may be based on other predetermined criteria. Certain media content may be made available for one time viewing for free, while additional viewing could be at additional costs. This example embodiment is not limited to content advertisements, as this embodiment may enable subscription-based content distributors and providers, such as Comcast, Netflix, Amazon Prime, or the like, to offer lower monthly subscription rates with access to all their library of content while charging additional fees for additional viewing. Media content providers of any kind could offer the first (number) of episodes of a series for free, for example, while charging to view the rest of the series episodes.

In some embodiments, the Dooreme system can detect which mobile device(s) are in the room based on the local network, Bluetooth, or by any other connectivity means, to personalize the experience for each user. The personalized experience may utilize their user profile 510 to customize the media content to be displayed, determine which ad stamps 119 or media content that have already been shown, or which ad stamps 119 and advertisements an advertiser may want engaged with a particular user based on their demographics in their respective user profile 510.

In some embodiments, the advertisement system 1100 may allow advertisers to save digital ads that were verifiably shown to a user to also show in the digital section of an ad summary page. The ads shown on mobile devices, television, OTT environments, or in theaters and arenas will also track the user's profile 510 and list the ads that were served to a particular user in the "my Ad Summary Page" of the user's profile 510. In some embodiments, the user may only see the ads that were served to him in his Ad Summary Page. In some embodiments, the advertisement system 1100 may have a build section as a depository where all past commercials will be placed and can be accessed by the user system 150. The advertisement system 1100 may be used in any sales environment, for example, for Home Depot. The advertisement system 1100 may allow the user to download and organize other television applications in its storefronts 519, engagement ad interface 710 or 1300, or mall interface 1500, including telephone apps, picture apps, and much more.

In some embodiments, the advertisement system 1100 may allow auction targeting for a particular media content access. For example, the content distributor or provider may set a minimum target price for consumption of a particular media content, e.g., a movie or a TV show. Said price may be displayed to the consumer, such as on display 152, control device 160, or the like. Consumer may be provided the option of paying said price for consuming the media content, or selecting to watch an advertisement(s) instead of issuing a payment. The consumer can select the number of advertisements he/she is willing to watch for a full or partial discount on the cost of the content. The more advertisements the consumer agrees to watch will lower the price he/she will be required to pay for the content. The consumer may be able to select the type of advertisements he/she is willing to watch, and what advertisements or type of advertisements to be excluded. In some example embodiments, the consumer may click on each of the selected advertisements and engage with each advertisement in the engagement ad interface 1300 to watch the advertisement. This functionality ensures advertisement consumption verification. This feature of selecting the time to watch, may be disabled for consumers who do not keep their commitments to watch advertisements.

In some embodiments, the advertisement system 1100 may enable a user to pick the length of a news reports. For example, CNN could produce on-demand headline programs and place them in storefronts 519, and also produce longer format reports on each of the topics it covers. Users can select which topics to view, more or less of, and the like. In some embodiments, the advertisement system 1100 may enable content producers to create private channels for television programs and reruns. For example, if someone wants to see a certain show (e.g. Modern Family) all the episodes would be presented in a storefront 519.

Figure 12:
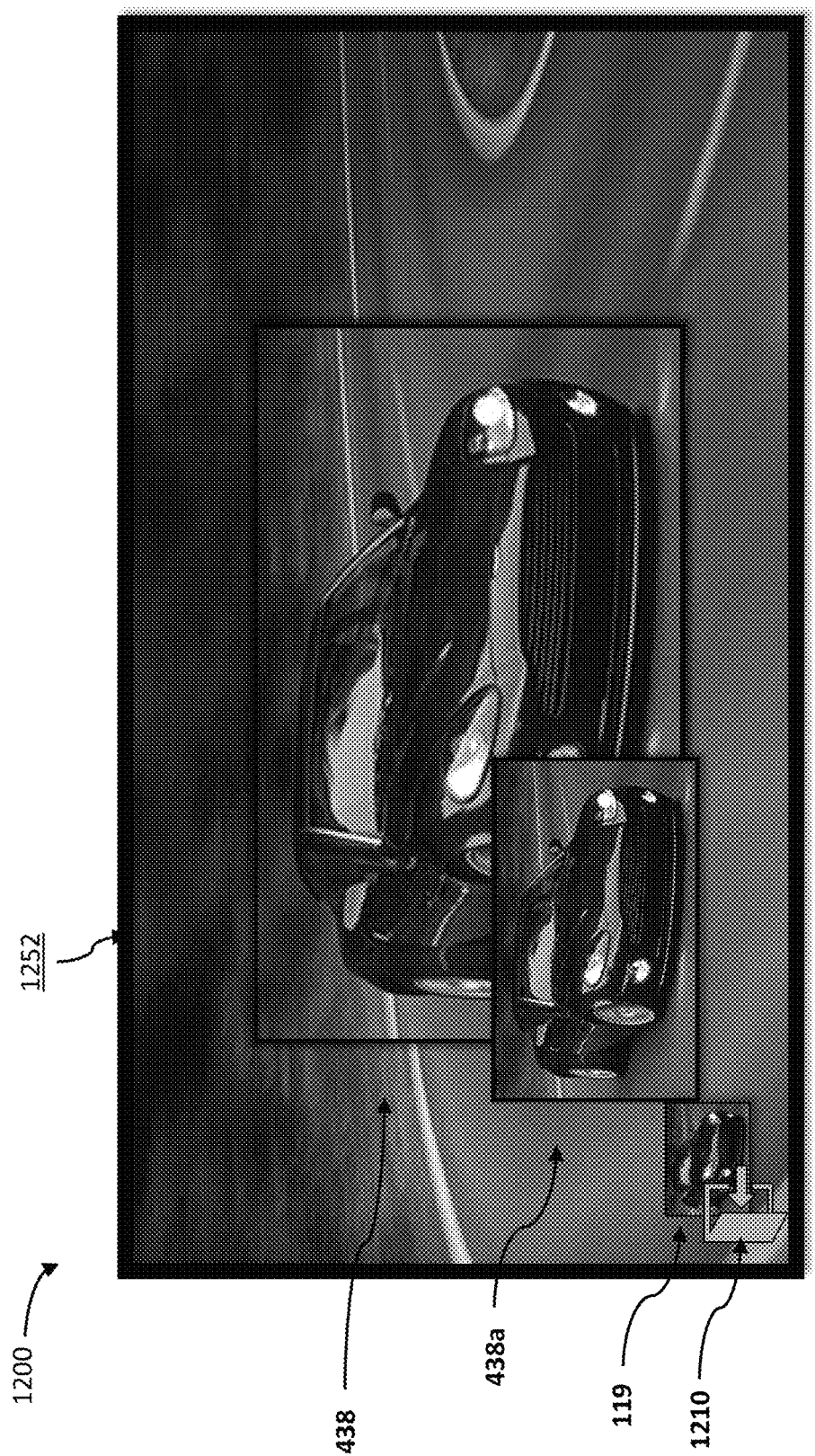
FIG. 12 is an exemplary diagram of a media content placement, minimizing media content placement, ad stamp, and a selectable icon on the display of the advertisement system of FIGS. 1 and 11, in accord with one embodiment of the current disclosure.

FIG. 12 is an exemplary diagram of a media content placement, minimizing media content placement, ad stamp, and a selectable icon on the display of the advertisement system of FIGS. 1 and 11, in accord with one embodiment of the current disclosure. As shown in FIG. 12, similar to FIG. 4, for example, a car may be depicted in the content of programming, and an ad stamp 119 may be associated with the car. FIG. 12 shows a minimizing ad placement 438a transitioning the ad placement 438 to an ad stamp 119, similar to that shown in FIGS. 3-4. A minimizing ad placement 438a is not required, and in some embodiments, the ad placement 438 may be transitioned directly to the selectable icon 1210 without an ad stamp 119. In other embodiments, the system may transition to an ad stamp 119 and display the ad stamp 119 for five seconds while the content of the programming is still playing, and then the ad stamp 119 fades, or another type of transition or animation known in the art, into the selectable icon 1210, notifying the user that the content in the ad placement 438 may be accessed and interacted with later by a mobile application the user downloads from the advertisement system provider, or may be accessed in the engagement ad interface 1300 of FIG. 13 or mall interface 1500 of FIG. 15. Further, in some embodiments, the ad stamp 119 may be associated with other media content, and may not only be associated with an advertisement, such as the ad placement 438.

In the example embodiment, stamp placement system 1200 may be a movie theater, and the display 1252 may be a movie theatre screen. In arenas, such as movie theaters, concert halls, sports arenas, or the like, the stamp placement system 1200 can create a geo-fence to detect who is in the audience based on input from other location based applications on their mobile devices. In some embodiments the control device 160 may be the mobile device in the movie theater using the stamp placement system 1200, however in some embodiments any mobile device in the theater may be detected. Further, in the example embodiment, the stamp placement system 1200 does not require the mobile device to have a preinstalled mobile application, such as the Dooreme app, installed. The stamp placement system 1200 can detect each mobile device based on other currently active mobile applications. The stamp placement system 1200 then can send notifications to the audience's mobile device informing them of the ad placement(s) 438 that were displayed on the display 1252, and embedded into the selectable icon 1210 in the movie or other ads displayed in the arena. By clicking on the sent/received notifications consumers can be transferred to the mall interface 1500, as discussed further in FIGS. 15-17, to see and interact with the ads placed in storefronts 519. In the example embodiment, the selectable icon 1210 is a translucent icon. In some embodiments, the selectable icon 1210 may be present for the entire duration of the movie. Further, the selectable icon 1210 may only be present for a limited amount of time during the movie, for example, a duration between 15 seconds to 5 minutes. In some embodiments, the stamp placement system 1200 may be associated with contextual and native ads embedded into media content. Further, the associated content of the ad stamp 119 placed in the arena may be any media content associated with the ad stamp 119, and is not limited to advertisements.

In other embodiments, the stamp placement system 1200 may be used with any media content shown on a television or similar display device, OTT boxes, in an arena, or on billboards as further examples of engagement with users. As an example embodiment in regards to the use with billboard advertisements, the stamp placement system 1200 may serve the purpose of capturing content advertisements on a typical street billboard and in other places, such as posters or bulletins that are viewed by residents, commuter traffic, or pedestrians walking nearby. The stamp placement system 1200 may associate them with a storefront 519, which users can then visit to learn more about the content advertisements. The stamp placement system 1200 utilizes global positioning system (GPS) on a user's mobile device, such as control device 160, to detect travel routs, and then present those billboard advertisements that were on the users rout to the user utilizing the Dooreme application. In some embodiments, the Dooreme system may determine an identity of a specific user of the user device, and customize the associated content of the ad stamp displayed on the user device based on the identity of the specific user.

In additional embodiments, the Dooreme system can detect a consumer who spends a predetermined amount of time looking at a particular product at a particular identified store, such as a window shopper who engages with a particular product. In the example embodiment, the stamp placement system 1200 can utilize GPS, or other location means described herein, on a user's mobile device, such as control device 160, to measure the proximity of the consumer to the product or window displaying the product to determine a consumer's interest in the product. In some embodiments, a particular displayed product, or the area in which a particular product is being displayed, utilizes an identification marker, beacon, or the like. The identification marker can use communication channels for sending identification information for accurate location information, such as Bluetooth, Wi-Fi, radio frequency identification (RFID), GPS, Near-field communication (NFC), or the like. The Dooreme application on the user device can then detect the identification marker using any of the location information technologies described herein. The Dooreme system can then present the products storefront 519 using the Dooreme application on the consumers mobile device, for example, or by using the Dooreme application on any other computer means that can run the software application described herein.

Additionally, in some embodiments, the stamp placement system 1200 can be used with online movies distributors, e.g., Netflix, Hulu, Amazon Prime, Apple TV, Google TV and many more, as well as with other online content providers such as YouTube and others. In some embodiments, the media content shown on the programmed content can be reduced into ad stamps 119 and be found later and engaged through the Dooreme application described herein, the mall interface 1500 of FIG. 15, through a storefront 519, a hover-over storefront window 1610, or an engagement ad interface 710 or 1300. All these content sources can display a selectable icon 1210 to signify that their ads can be seen and engaged later in the service provider system 1110. In some embodiments the selectable icon 1210 may be a selectable icon provided by the service provider which allows access to the engagement ad interface 710, the engagement ad interface 1300, or to the mall interface 1500, which will be further understood as described below with reference to FIGS. 13-18.

Additionally, in some embodiments, stamp placement system 1200 can be used with a video on demand (VOD) environment. The stamp placement system 1200 with VOD allows users to skip a number of ads in an ad pod and save other ads to view later. By removing certain ad stamps 119 from a pod, the user can skip the corresponding full length ads and make the ad break shorter. Programmers can charge more cost per thousand impressions (CPM) for the ads that are viewed or saved to be viewed later, while also not charging for the ads consumers have skipped. This methodology enables programmers to reduce the length/amount of ad interruptions on users, therefore better satisfying user desires, increase engagement and measurement with the ads that were viewed or saved for later, reduce the cost of ad campaigns for advertisers whose ads where skipped, while also generating more revenue through higher CPMs.

In some embodiments the stamp placement system 1200 may provide selection mechanism enabling the user the option to customize the ad stamps 119 to select to not see same content advertisement more than, for example, three times in one day on the television or through the OTT. The ad stamp(s) 119 may be set to display at once when the first ad in a commercial break runs, or to display as each advertisement in an ad break runs.

Further, in some embodiments, a user records media content for later viewing on a connected or distributor supplied digital video recorder (DVR), or similar technology to record media content displayed on a device, such as a television. Or some media content providers allow the ability to fast forward without having be recorded by the user. Often users try to fast forward through ad breaks to reduce the content interruptions and avoid seeing content advertisements. Users also often try to fast forward through mundane, slow or previously seen content within a particular movie, television show, etc. In an example embodiment, the stamp placement system 1200 can detect when the user utilizes the fast forward operation such that programmers, distributors, advertisers, or the like, can display ad stamp(s) 119 during the fast forward operation to display advertisements or other media content. This feature can entice the user to not fast forward or to view advertisements during the fast forward operation. In some embodiments, content programmers may allow consumers to pay for content or watch it with a number of ads the consumer selects from among a bunch of ads specified by programmer using the advertisement system 100 or 1100. Moreover, in some embodiments, the stamp placement system 1200 may allow a content provider to allow an advertiser to place a content advertisement or brand logo on the display during the fast forward through ad breaks using the advertisement system 100 or 1100.

In some embodiments, the advertisement system 1100 may include an advertising tracking system (hereinafter "AdTrack"). AdTrack is a system where ad stamp(s) 119 for native ads are tracked within websites including display or textual content. For example, at the expected time the reader is reaching and reading a text ad (Volvo cars, for example) an image ad stamp 119 associated with Volvo would appear on top of the text and then drag to the bottom, then pull into the selectable icon 1210.

In some embodiments, the stamp placement system 1200 mobile application may use signals from the user's WiFi to automatically connect the control device 160 designated as mobile control to the television when in close proximity. The control device 160 supplements the set-top-box functionality is some cases when the advertisement system 1100 is displayed on the user system 150. Users may use their phone or designate an old phone or tablet as the control device 160.

Figure 13:
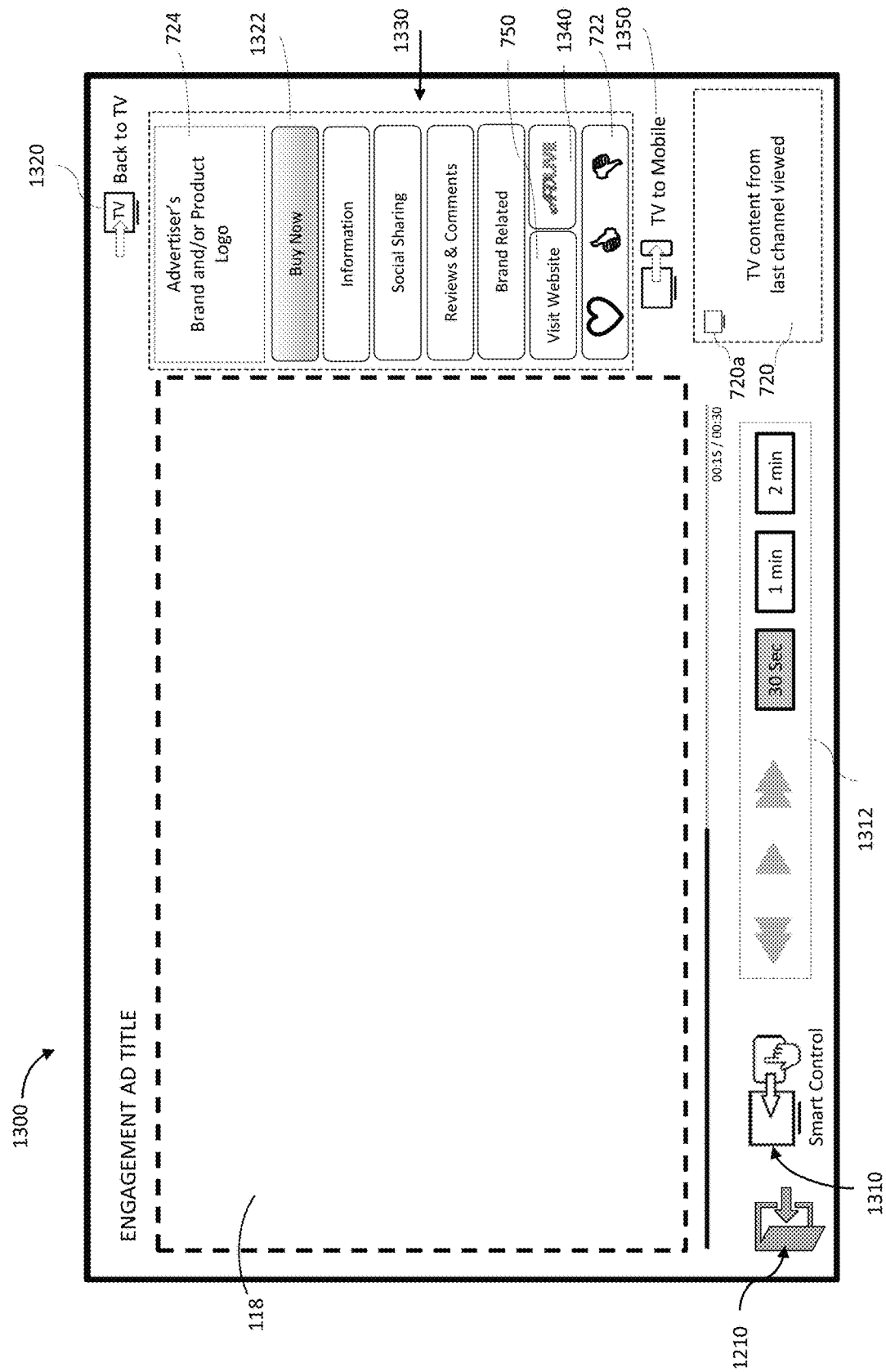
FIG. 13 is an exemplary engagement ad interface on the display of the advertisement system of FIG. 11, in accord with one embodiment of the current disclosure.

FIG. 13 is an exemplary engagement ad interface 1300 on the display of the advertisement system 1100 of FIG. 11, in accord with one embodiment of the current disclosure. The engagement ad interface 1300 may have similar features as the engagement ad interface 710, as described herein, and as shown in FIGS. 7-8. The engagement ad 118 may be automatically selected or manually selected by the user from selecting an ad stamp 119, selecting a storefront 519 from the mall interface 1500 or user profile 510, or utilizing the Dooreme application on the control device 160. The advertisement system 1100 may identify and report the number of times an engagement ad 118 or content advertisement was served and viewed in the engagement ad interface 1300 and by which particular user.

In some embodiments, engagement ad interface 1300 may include a smart control 1310. The smart control 1310, when selected by the user, initiates the Dooreme application as described herein on the control device 160 to allow the user to control the engagement ad interface 1300, similar to a remote control feature. The smart control 1310 enables the user to shift to a smart device control on the control device 160 with one button push on a remote control, touch screen TV, or any display showing the media content. By clicking the button on TV, for example, the Dooreme app on the control device 160 launches automatically, without further user actions, and displays a TV control page. With the smart control 1310 feature, the user will be able to use the control device 160 and its resources to manage the Dooreme app on the TV, including pointing, typing, entering information and comments, ordering products and services, and the like.

In some embodiments, engagement ad interface 1300 may also include a TV to mobile push 1350. The TV to mobile push 1350, when selected by the user, may push the engagement ad 118 content to the user's control device 160 for viewing. The TV to mobile push 1350 differs from the smart control 1310 feature because the smart control 1310 initiates the Dooreme application for allowing the user control over the engagement ad interface 1300, while the TV to mobile push 1350 sends the engagement ad 118 to the control device 160 to interact with separately.

In some embodiments, a video tool 1312 enables the user to select a video about the product/service in the engagement ad 118 that lasts different lengths of time or covers different aspects of the product/service in the engagement ad 118. Further, video tool 1312 may include a video measurement tool that indicates the length of the video and how much of the video has been watched at a given time. Additionally, ad information section 1330 may include an option to select social sharing button 1410, which will be further discussed in FIG. 14 below. In some embodiments, engagement ad interface 1300 may also include a content box 720 and toggle 720a, as described in FIG. 7.

In some embodiments, engagement ad interface 1300 may also include an ad information section 1330, similar to that of information section 730 in FIG. 7, that enables the user to do a multitude of options. However, information section 1330 has additional features, for example, ad information section 1330 may include an customizable option button 1322. In the current embodiment shown in FIG. 13, the customizable option button 1322, "Buy Now," may allow the user to obtain price information associated with the engagement ad 118 product or service, and an option for a user to purchase the product or service by the use of ecommerce as described herein for FIG. 7. In some embodiments, the digital wallet described in FIG. 7, may be accessed from the user profile 510 by selecting the customizable option button 1322. The customizable option button 1322 may be configured by an advertiser when they request an ad stamp 119 and stamp key 1130 to be created by the service provider as described below in FIG. 19, where the service provider may embed customized options that are engaged with the customizable option button 1322 is selected for each particular engagement ad 118.

In some embodiments, ad information section 1330 may also include an interest section 722, which may include options for the user to interact and select whether they are interested (e.g., thumbs up icon) or uninterested (e.g., thumbs down) in the engagement ad 118, and interest section 722 also enables users to mark the engagement ad 118 as a favorite (e.g., the heart symbol) and delete the currently displayed engagement ad 118. Ad information section 1330 may also include engagement ad information 724, which may include a logo, video, graphics interchange format (GIF), or other product/service identification.

Further, in some embodiments, a visit website option 750 may be included to enable the user to be directed to the website of the individual, group, company, product, or service associated with the engagement ad 118. In some embodiments, an AdLive 1340 option, when selected, may allow a user to directly interact with an advertiser's live chat feature which may allow a user of the advertisement system 1100 to directly interact with a live person via video, voice, or text that represents the advertiser of the engagement ad 118, where the advertiser is associated with the content system 130.

In some embodiments, engagement ad interface 1300 may also include a back to TV 1320 option, that when selected by the user, will exit the engagement ad interface 1300, and return to the media content that was previously displayed before the user interacted with the engagement ad 118 or ad stamp 119. Moreover, the location, description, and form of each of the at least engagement ad 118, content box 720, smart control 1310, TV to mobile push 1350, toggle 720a, interest section 722, engagement ad information 724, video tool 1312, ad information section 1330, website option 750, or any other option or section on the engagement ad interface 1300 is not meant to be limiting and the location, description, form, as well as more or fewer options may be provided on the engagement ad interface 1300.

In some embodiments, engagement ad interface 1300 may allow advertisers who place multiple images in an engagement ad 118 to enable the user to click on an image within the engagement ad 118 in the engagement ad interface 1300, and learn more about the product represented in that image. For example, a furniture store can show whole living room and allow a user to click on a sofa or side lamp to learn more and buy that sofa or side lamp.

Figure 14:
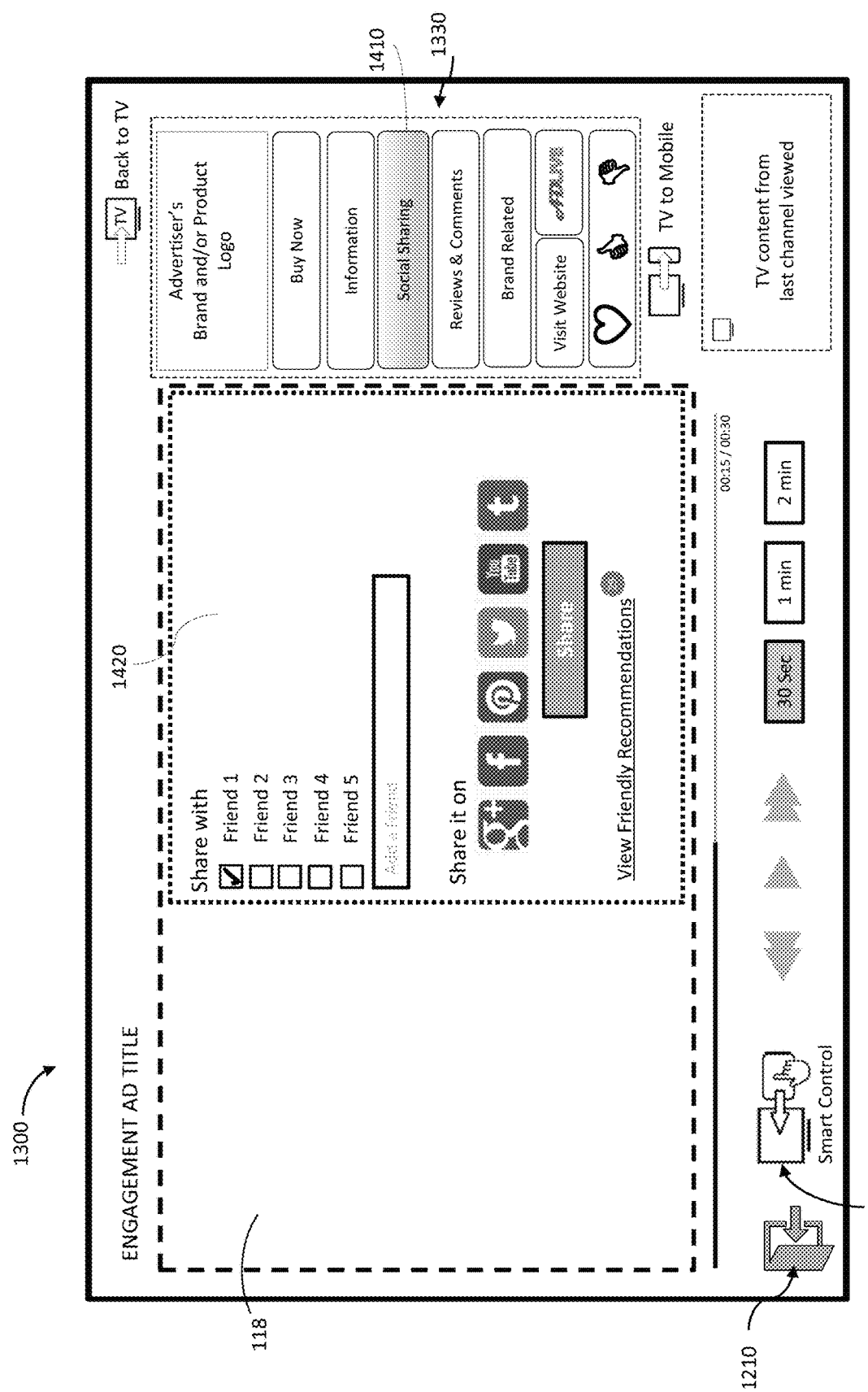
FIG. 14 is an exemplary engagement ad interface on the display of the advertisement system of FIG. 11, in accord with one embodiment of the current disclosure.

FIG. 14 is an exemplary engagement ad interface on the display of the advertisement system 1100 of FIG. 11, in accord with one embodiment of the current disclosure. FIG. 14 shows the engagement ad interface 1300 of FIG. 13; however, FIG. 14 includes the social media interface window 1420. In some embodiments, when the user selects social sharing button 1410, the social media interface window 1420 appears. The social media interface window 1420 includes instructions and templates for allowing engagement ads 118 to be published to social networks, such as Facebook, Twitter, Flikr, LinkedIn, Google+, etc. The social media interface window 1420 may be configured to allow users to authenticate existing user accounts on social networks to create accounts, to connect with other friends and/or social networks, and to manage user content on social networks, including uploading new content, such as engagement ads 118. Other implementations may omit one or more of the functions disclosed herein.

In some embodiment, the social media interface window 1420 may include an add section in a community feature that may enable users to create their own folders with content advertisement and storefronts 519 they like, and for friends to follow them on these folders. Folders could include recipes, product, services, movies, television shows, news, articles, websites and the like. In some embodiments, people or entities may put their events, pictures, videos, video commentaries, and the like in a community or news sections. For example, a "News and Views" category, users or entities can become private reporters by putting their video news reports in the service provider system 1110. Users or entities may also have their own user generated content channel on the service provider system 1110.

Figure 15:
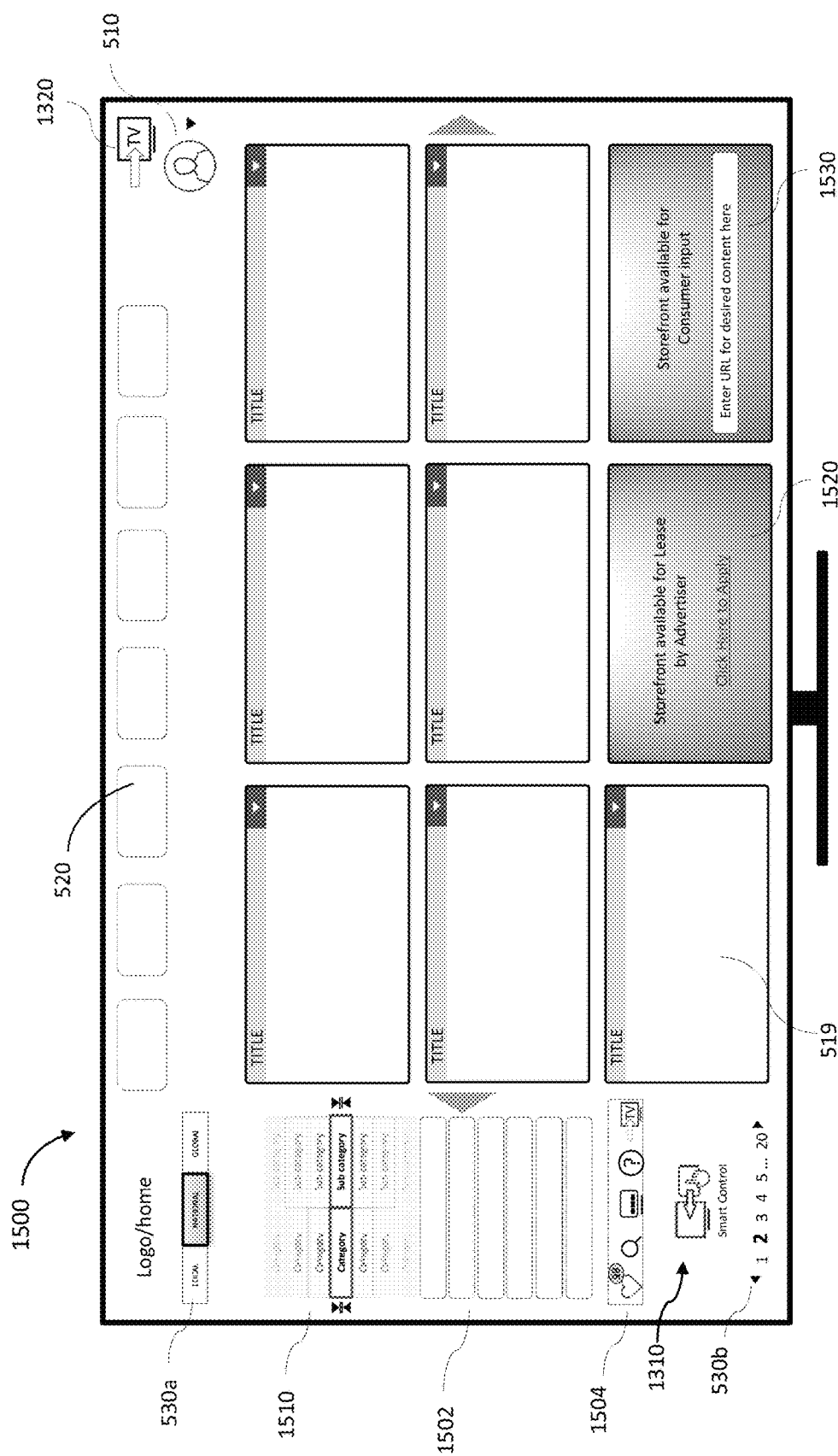
FIG. 15 is an exemplary mall interface on the display of the advertisement system of FIG. 11, in accord with one embodiment of the current disclosure.

FIG. 15 is an exemplary mall interface 1500 on the display of the advertisement system 1100 of FIG. 11, in accord with one embodiment of the current disclosure. The mall interface 1500 may be accessed in a multitude of ways, including, for example, the user selecting an ad stamp 119 with the control device 160, the user selecting the selectable icon 1210 on the engagement page interface or within stamp placement system 1200, the user selecting a particular option or button on the control device 160 to bring the user to the mall interface 1500, the user selecting a particular option or button in the Dooreme application on the control device 160, or the user system 150 automatically causing the display 152 to depict the mall interface 1500 after one or more condition(s) are met. The mall interface 1500 may be stored at any location or multiple locations within the advertisement system 1100, including engagement system 110, inserter system 1140, service provider system 1100, and user system 150. The advertisement system 1100 may identify and report the number of times a storefront 519 was served and viewed in the mall interface 1500 and by which particular user based on the user profile 510.

In some embodiments, as shown in FIG. 15, the mall interface 1500 may include categories 520 and 1502, and category roller(s) 1510, for the user to be able to quickly utilize up to four levels of categories to search within the mall interface 1500 of storefronts 519 or other media content, including, but not limited to, television channels, media content guide information, etc. The category roller(s) 1510 in the category roller(s) feature 2116 is further described in FIG. 24.

In some embodiments, as shown in FIG. 15, the mall interface 1500 may include mall interface options 1504. Mall interface options 1504 may include, but are not limited to, for example, mark content/storefront as a favorite, customize, send to mobile, back to TV, send to friend, help feature, storefront search 1702 (further discussed in FIG. 17), among others. In some embodiments, as shown in FIG. 15, the mall interface 1500 may include options to access to the user profile 510, geographic scope 530*a*, and page listing 530*b*, as described in FIG. 5. The mall interface 1500 may also include smart control 1310 and back to TV 1320, as described in FIG. 13.

In some embodiments, as shown in FIG. 15, the mall interface 1500 may include storefront for lease 1520 and add storefront 1530. Storefront for lease 1520 allows an advertiser or any business or consumer to add a storefront 519 or lease a storefront 519 to the advertisement system 1100. Add storefront 1530 allows a user to enter or copy/paste a Uniform Resource Locator (URL) directly, and the advertisement system 1100 may create a storefront 519 using the media content found under the URL from the user. The new storefront 519 created by add storefront 1530 may become available to other users using the advertisement system 1100 depending based on certain criteria.

In some embodiments, the mall interface 1500 may include a media content guide section (not shown) which enables content advertisers (producers, broadcasters, distributors, or the like) to place content advertisements far in advance of the scheduled broadcast time of the content because it is a matter of placing advertisements in storefronts 519. Traditional television guides do not show content more than a few days at a time. The media content guide section (not shown) also allows content to be sorted by channel, producer, time, cast, genre, origin, distributors, region, and more. In the media content guide section, users may select to save a broadcast program to replay it later, possibly for a fee. The media content guide section (not shown) allows content ads to stay in the storefront(s) 519 long after the program has aired, therefore allowing users to go back in time and find the previously aired content and play it again by linking to the server where the content is hosted. The link to the hosted content may be entered by a content advertiser at the time of leasing and setting up the storefront(s) 519. In an example embodiment, the media content guide section (not shown) allows the user to pay to view the content or to watch it with advertisements. Traditional electronic television guides are unable to show past content times. The media content guide section displays content based on television programs, not just the channels. The television guide is based on advertisements placed in a leased storefront (e.g. storefront for lease 1520) and inputted by a programmer, not based on collecting and sorting television data and placing it in a grid, as a standard current television guide. The time slots may be another meta tag and search/sorting category. Advertisements related to television content may be sorted and personalized in service provider pages by the user, for example, which the television guide does not enable, therefore giving users more desired experiences.

Figure 16:
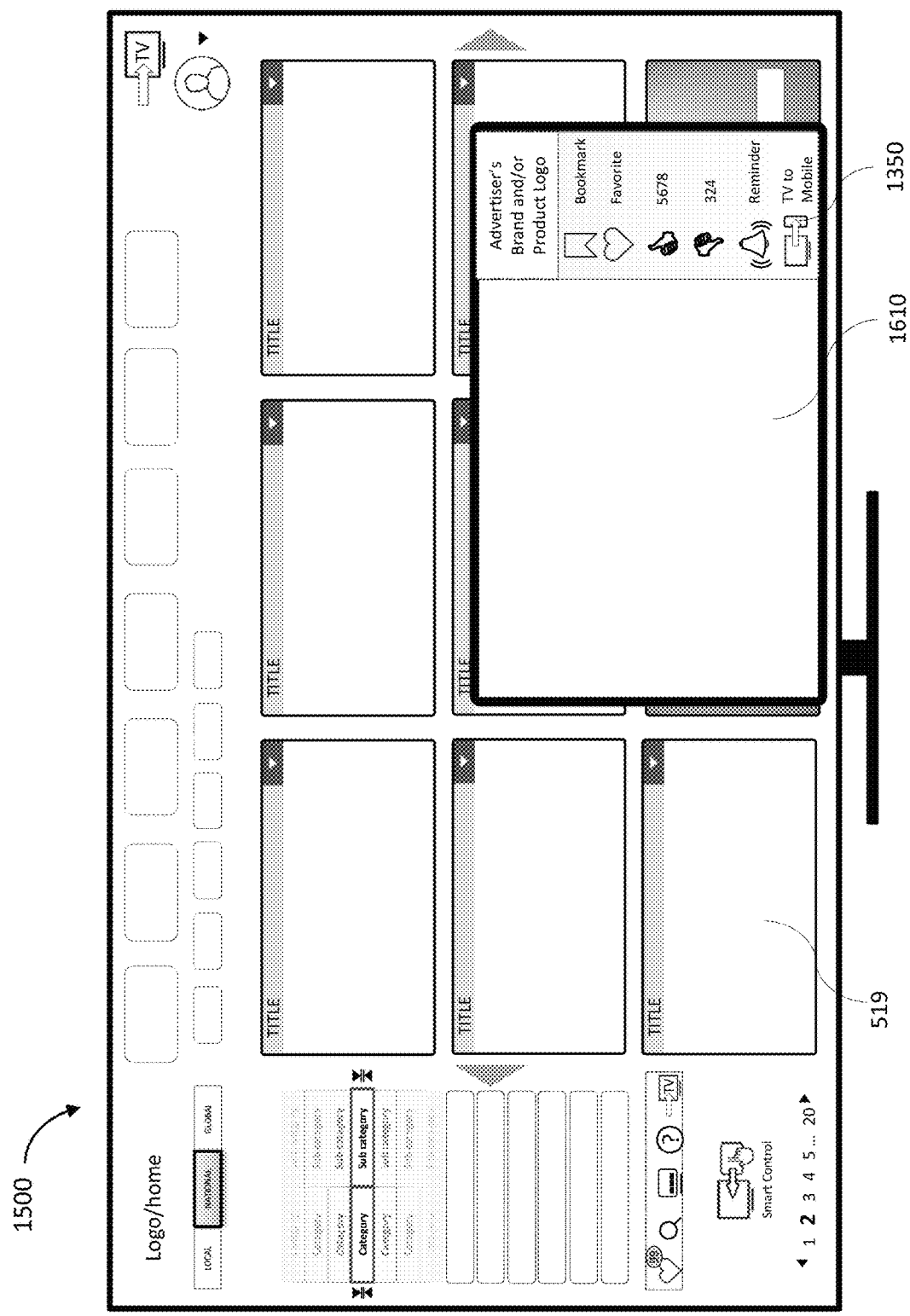
FIG. 16 is an exemplary mall interface on the display of the advertisement system of FIG. 11, in accord with one embodiment of the current disclosure.

FIG. 16 is an exemplary mall interface on the display of the advertisement system 1100 of FIG. 11, in accord with one embodiment of the current disclosure. FIG. 16 shows the mall interface 1500 of FIG. 15; however, FIG. 16 includes a hover-over storefront window 1610 that appears when a user, using control device 160, places a pointer or otherwise navigates selections in the mall interface 1500. Hover-over storefront window 1610 may appear when a user hovers over or otherwise selects a particular store front 519 (associated with an ad stamp 119). Furthermore, in some embodiments, and as shown in FIG. 16, for example, the user is able to select several options that are also available in the engagement ad interface 710 or 1300, such as rating the engagement ad 118 represented by the hover-over storefront window 1610, sending the engagement ad 118 to the control device via TV to mobile push 1350. The hover-over storefront window 1610 may show a short video, advertisement, or content preview related to the respective storefront 519. However, in other embodiments, the hover-over storefront window 1610 may depict a still image or other type of image or logo. As shown in the current embodiment, when the hover-over storefront window 1610 pops up, the user is still able to see some, or at least a portion, of the surrounding storefronts 519 shown on the particular page. Although the surrounding store fronts 519 may be seen in the current embodiment, such a configuration is not required. The hover-over storefront window is further described in FIG. 23 herein.

Figure 17:
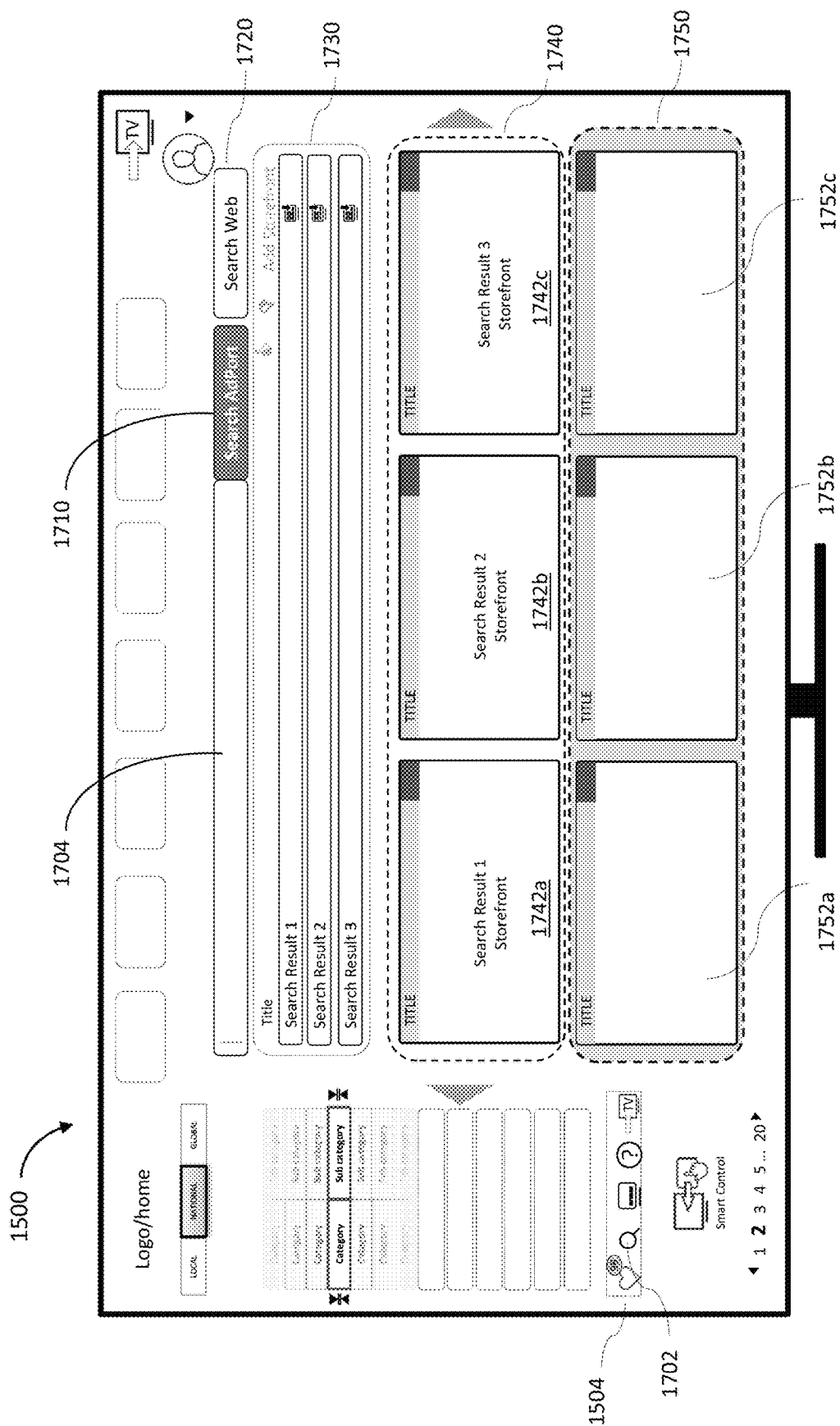
FIG. 17 is an exemplary mall interface on the display of the advertisement system of FIG. 11, in accord with one embodiment of the current disclosure.

FIG. 17 is an exemplary mall interface on the display of the advertisement system 1100 of FIG. 11, in accord with one embodiment of the current disclosure. FIG. 17 shows the mall interface 1500 of FIG. 15; however, FIG. 17 includes the search storefront button 1710 and search web button 1720 search engines available after the user selects the storefront search 1702 from mall interface options 1504. In some embodiments, these search features of the mall interface 1500 may be triggered by other conditions or criteria in the advertisement system 1100. The service provider storefront search process flow is further described for method 2500 in FIG. 25. After the user enters the search criteria in the search bar 1704 using the control device 160 or by other devices such as a keyboard, and selects either the search storefront button 1710 or search web button 1720 search engine options, the top three search results are displayed in the storefront search window 1730, with the ability to rate and add each individual storefront directly from the storefront search window 1730. In some embodiments, the top three search results are also displayed as individual storefronts, for example, search result storefronts 1742*a*-1742*c* in the top searched storefront display 1740. This storefront type of search provides a more visual and intuitive based search compared to a text based search. In some embodiments, additional storefronts, for example, customized search result storefronts 1752*a-c* are displayed in the customized search storefront display 1750. Customized search result storefronts 1752*a-c* are displayed based on predetermined criteria as determined by the service provider, advertiser, content provider, MVPD, or similar entity. For example, customized search result storefronts 1752*a-c*, would display the top three storefronts 519 from advertisers that had the highest bid to have their storefronts 519 shown if the searched storefronts were in similar categories, as determined by the advertisement system 1100.

In another embodiment, search web button 1720, when selected, may display internet search results in a separate window (not shown) that may overlap or replace the storefront search window 1730 and the top searched storefront display 1740. This embodiment would allow the user to search the internet within the mall interface 1500. The customized search storefront display 1750 may still display customized search result storefronts 1752*a-c* that would correspond with the search web button 1720 selection. In some embodiments, the customized search result storefronts 1752*a-c* may include sponsored advertisements based on the web search.

In some embodiments, the search storefront button 1710 search engine enables users to populate a storefront 519 in categories from their search results or by inputting a URL for a website. As a number of users place the same search result into multiple storefronts 519, the service provider system 1110 detects this popularity and may place that same content result into a storefront 519 permanently. The storefront search feature may allow a user to save a search result into a storefront 519 with the same category, the mall interface 1500 may ask the user what category the saved result should go into. The storefront search feature may enable an auctions of storefronts 519 that will appear when a user searches for a particular term within the service providers storefront(s) 519 or on the Internet.

Figure 18:
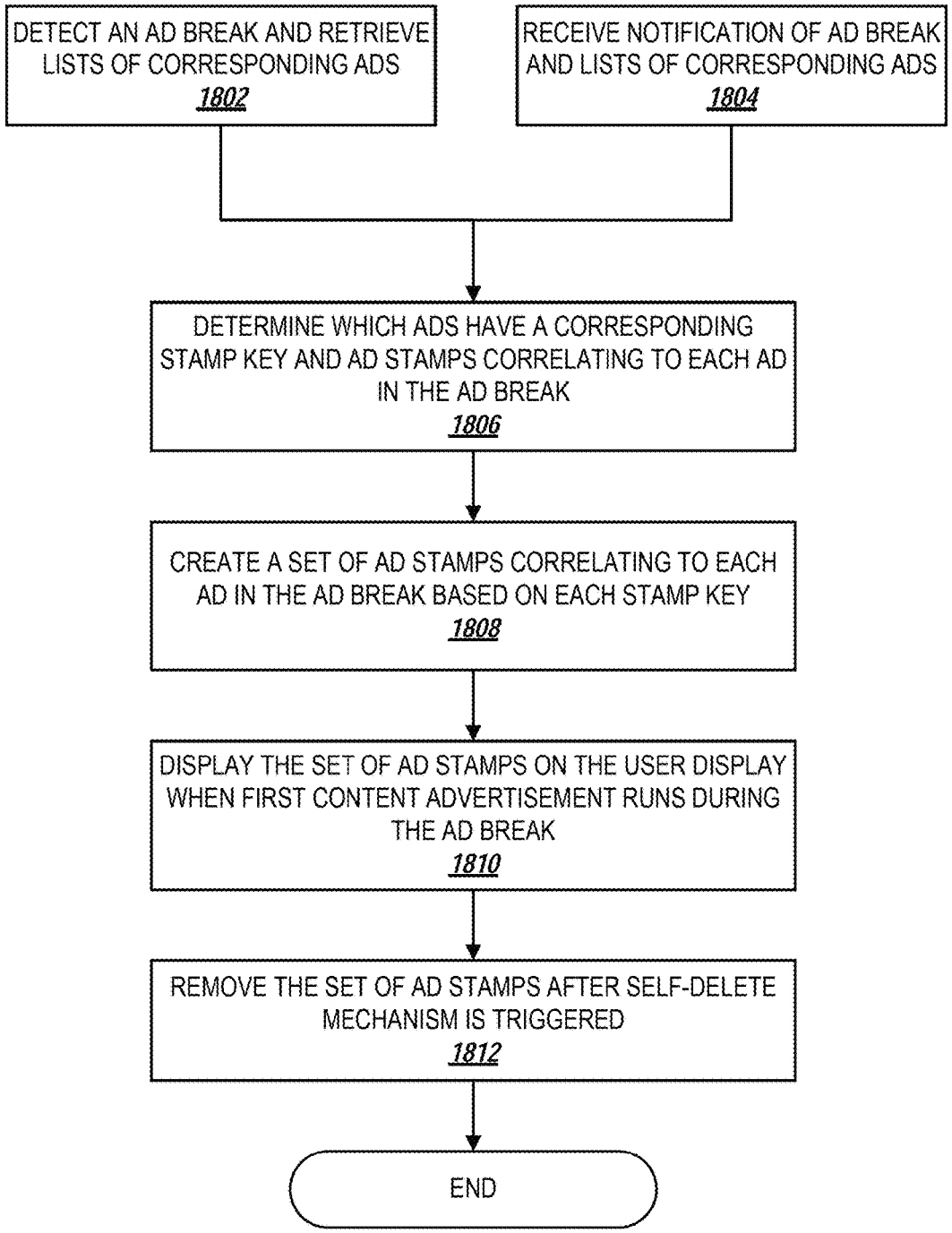
FIG. 18 is a flow diagram illustrating one method for determining which ads have a corresponding stamp key and ad stamp in an ad break, according to some embodiments of the present disclosure.

FIG. 18 shows one example of a method 1800 for determining which ads have a corresponding stamp key 1130 and ad stamp 119 in an ad break, according to some embodiments of the present disclosure. The method 1800 is performable and executable on a computing device or system such as the service provider system 1110, inserter system 1140, the content system 130, the user system 150, a service provider application running on a OTT box, or any similar system such as those described above with reference to FIGS. 1 and 11, to determine which content advertisements in an ad break from a media content have a corresponding stamp key 1130. As will be understood, the present disclosure may facilitate creating and presenting ad stamps 119 to a user utilizing the advertisement system 1100, and removing the ad stamps 119 after certain criteria is met or a triggered event occurs. The criteria may be determined by the service provider, user, advertiser, content provider, MVPD, or any entity using the advertisement system 100 or 1100 as described herein with reference to FIGS. 1 and 11. According to some embodiments, the method 1800 may be implemented by the service provider system 1110, inserter system 1140, or a service provider application running on a OTT box, for example.

At step 1802, an ad break is detected and the corresponding system then retrieves a list of corresponding advertisements. In another embodiment, in step 1804, a notification is received of an upcoming ad break and a list of corresponding content advertisements in the ad break is received. Following either step 1802 or 1804, at step 1806, a determination is made which content advertisements in the ad break have a corresponding stamp key 1130 and ad stamps 119 correlating to each content advertisement in the ad break. The method continues at step 1808 where a set of ad stamps 119 are created that are correlated to each content advertisement in the ad break based at least on each corresponding stamp key 1130. After the set of ad stamps 119 are created, at step 1810, they are displayed to the user, for example, on display 152, when the first content advertisement runs during the ad break. After the set of ad stamps 119 are displayed, at step 1812, the set of ad stamps 119 are removed from the display after a self-delete mechanism is triggered. The self-delete mechanism may be triggered by criteria determined by the service provider, advertiser, MVPD, or similar entity involved with content advertisements in the advertisement system 100 or 1100 as described herein with reference to FIGS. 1 and 11.

Figure 19:
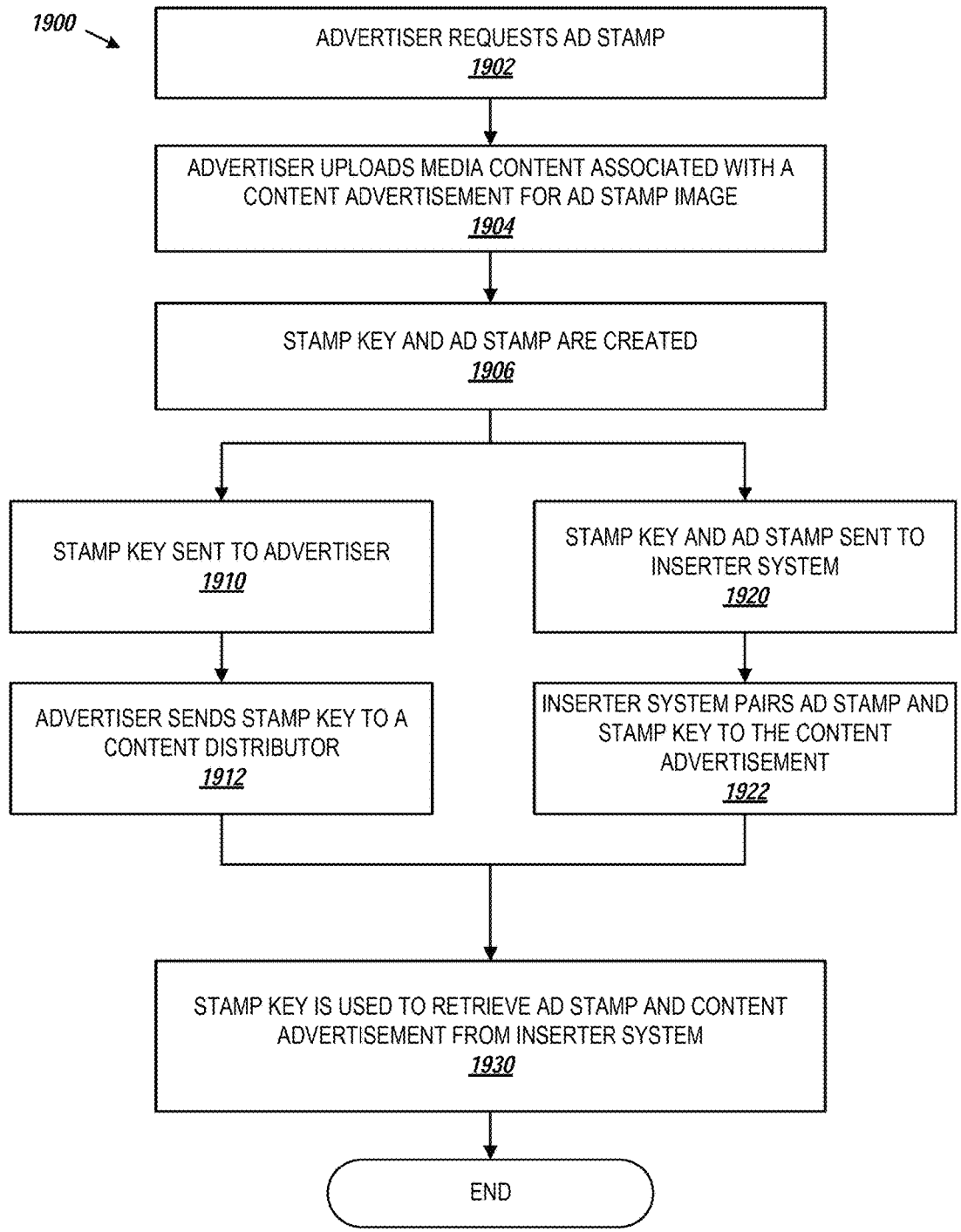
FIG. 19 is a flow diagram illustrating one method for creating a stamp key and an ad stamp, according to some embodiments of the present disclosure.

FIG. 19 shows one example of a method 1900 for creating a stamp key 1130 and an ad stamp 119, according to some embodiments of the present disclosure. The method 1900 is performable and executable on a computing device or system such as the service provider system 1110, inserter system 1140, the content system 130, the user system 150, a service provider application running on a OTT box, or any similar system such as those described above with reference to FIGS. 1 and 11, to create a stamp key 1130 and an ad stamp 119.

At step 1902, a request is sent to the service provider for an ad stamp by an advertiser, for example. At step 1904, the advertiser uploads media content desired to represent and be associated with a content advertisement to be displayed for an ad stamp 119 image. At step 1906, the service provider accepts the request for an ad stamp, receives the media content for the ad stamp 119 image, and creates a particular ad stamp 119 and a unique stamp key 1130 that correlates with the particular ad stamp 119 requested. In one embodiment, the advertiser side (ad agency, ad inventory buyer or sales staff) connects to service provider's stamp placement system 1120, fills a short form, uploads an image, video clip, or GIF, and receives a stamp key 1130. The stamp key 1130 is a unique digital code identification, also known as a "digikey." The ad stamp 119 may be hosted at the service provider servers, such as the service provider server 1112, stamp placement server 1122, or at the inserter server 1142. In the example embodiment, at step 1920, the stamp key 1130 and ad stamp 119 are sent to the inserter system 1140. At step 1922, the inserter system 1140 pairs the ad stamp 119 and stamp key 1130 to the content advertisement. The stamp key 1130 may be digitally attached to both the content advertisement and to the associated ad stamp 119 in order to match the two components and provide confirmation after they run.

In the example embodiment, the stamp key 1130 may be used to track later viewing of the ad stamp 119 by the end user, thereby changing an served advertisement to a viewed advertisement. Information pertaining to an ad pod, ad pod slot, region, channel, customer, device, etc. associated with when, where and how the content advertisement, whether a video advertisement for insertion/substitution in the primary programming content stream, or a contextual advertisement which is embedded in the primary programming stream, will also be stored in the service provider system 1110, and through the association of the stamp key 1130, will be used to pair and display the ad stamp 119 with the base advertisement. With current industry practices, the base advertisements are typically stored at a special ad server(s) managed by the content provider, MVPD, broadcaster, or OTT service provider, and at the designated time, arranged in groups (ad pods) and inserted into the primary program content stream, or individually embedded in the primary program content stream as contextual ad(s). Using the information cited above, or a real-time request citing the stamp keys 1130 of the base ad(s) to be inserted or embedded in the primary programming content stream, the service provider system 1110 may deliver the requisite ad stamp 119 with the same stamp key 1130 to the content provider's, MVPD's, broadcaster's or OTT service provider's ad insertion/embedding processor or ad server.

At step 1910 the stamp key 1130 is sent to the advertiser, who then, at step 1912, sends the stamp key 1130 to a content distributor, MVPD, or similar entity as described herein. Following both step 1912 and 1922, at step 1930, the stamp key 1130 is used by one of the systems in the advertisement system 1100 to retrieve the ad stamp 119 and content advertisement from the inserter system 1140. In another example embodiment, inserter system 1140 could be placed after the content provider's, MVPD's, broadcaster's or OTT service provider's ad insertion/embedding processor/server, and before the end device at the user system 150. Furthermore, in another example embodiment, the content provider, MVPD, broadcaster or OTT service provider, may be able to load the inserter server 1142 directly into one of their server racks, or the service provider may provide a software application that could run on their servers. This special inserter software application of the Dooreme system detects the unique stamp keys 1130 associated with each upcoming ad and provides the service provider server 1112 an electronic request for a list of upcoming advertisements that will play on the upcoming media content, such as a television channel.

In another example embodiment, due to the complexity of the television broadcast systems and advertisement placing into media content distributions, the service provider may provide the content provider, MVPD, broadcaster or OTT service provider, certain specifications in order for the content provider, MVPD, broadcaster or OTT service provider to build their own modified proprietary software application to run on their servers.

Figure 20:
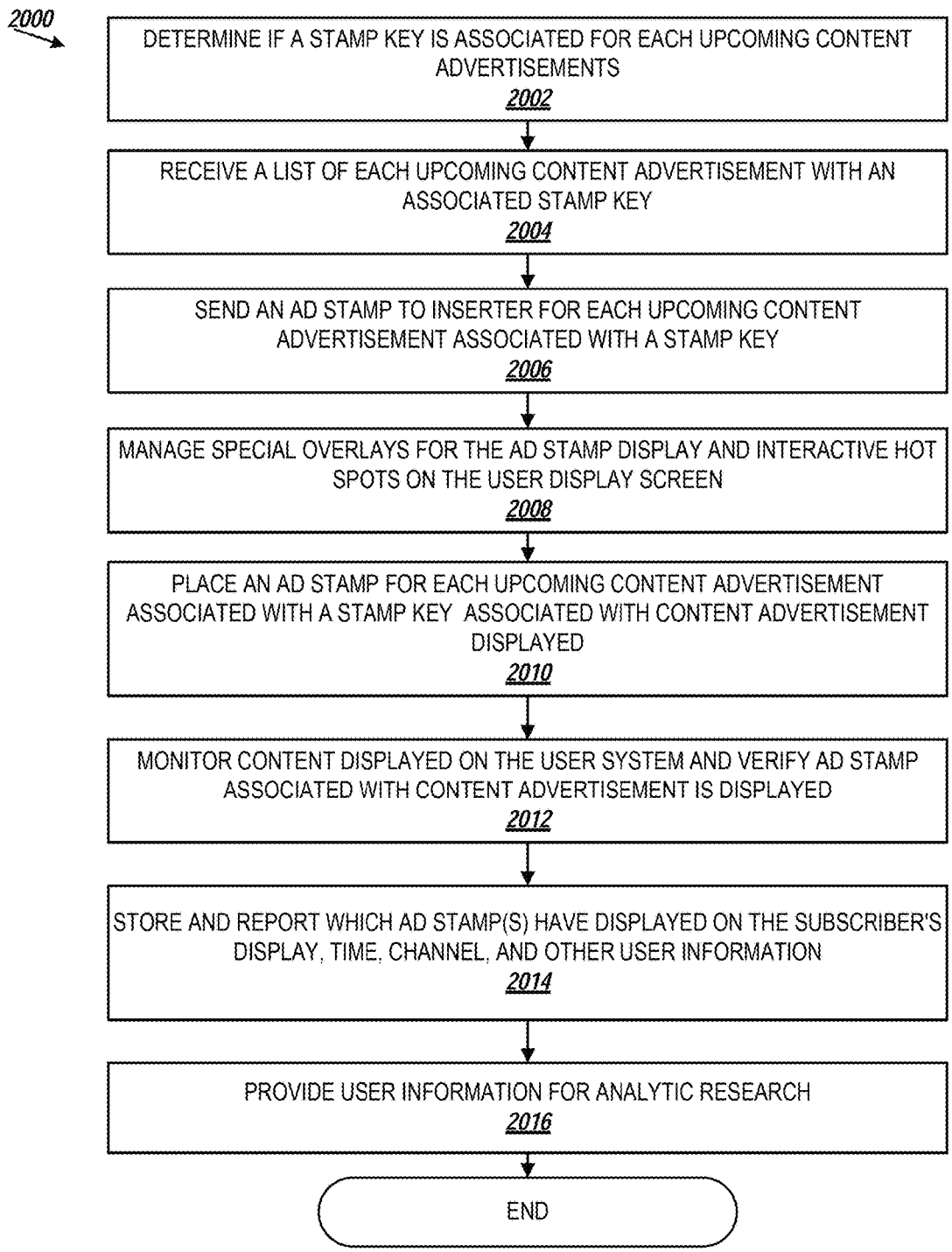
FIG. 20 is a flow diagram illustrating one method for managing the advertisement system of FIG. 11 by the service provider agent, according to some embodiments of the present disclosure.

FIG. 20 shows one example of a method 2000 for managing the advertisement system 1100 of FIG. 11 by the service provider agent, according to some embodiments of the present disclosure. The method 2000 is performable and executable on a computing device or system such as the service provider system 1110, inserter system 1140, the content system 130, the user system 150, a service provider application running on a OTT box, or any similar system such as those described above with reference to FIGS. 1 and 11, for managing the advertisement system 1100.

At step 2002 a determination by the inserter system 1140 is made if a stamp key 1130 is associated for each content advertisement. As described herein, the inserter system 1140 may be physically located at several different points in the advertisement process, may be a software application provided by the service provider, or may be proprietary software created by an entity within the content system 130 following the service provider specifications in order to mimic the inserter system 1140 functionality. After a determination is made that at least one stamp key is present for an upcoming ad pod, ad block, or ad break, at step 2004, a list of each of those content advertisements and stamp keys 1130 is received by the service provider. At step 2006, a corresponding ad stamp 119 is sent to the inserter system 1140 for each upcoming content advertisement associated with a stamp key 1130. At step 2008, the inserter system 1140 will manage special overlays for the ad stamp 119 display and interactive hot spots on the user display 152, based on predetermined criteria. The predetermined criteria may be determined by the service provider, user, advertiser, content provider, MVPD, or any entity using the advertisement system 100 or 1100 as described herein with reference to FIGS. 1 and 11.

Method 2000 continues at step 2010, where in the inserter system 1140 places an ad stamp on the display 152 for each upcoming content advertisement that was determined to have an associated stamp key 1130. The ad stamp(s) 119 may be embedded as watermarks (e.g. selectable icon 1210), overlays, ancillary data, or even closed caption extended data, depending on the point of embedding, and subsequently displayed on the user's display 152.

In some embodiments, the advertiser, content provider, or the like, depending on authorization level, may have the ability to modify the ad stamp(s) 119 images and/or the list of ad stamp(s) 119 in each ad pod at any time before the advertisement is displayed. This example embodiment allows advertisers, programmers, and the like, to target ad stamp(s) 119 based on region, device, auction, individual user, or user preferences based on actions or priority settings. Further, ad stamp(s) 119 are not limited to serving only advertisements. Ad stamp(s) 119 may be used to serve notifications and reports, surveys, coupons, caller IDs, email and text messages, service notifications, or the like.

In some embodiments, the service provider system 1110, the inserter system 1140, and/or the stamp placement system 1120 may collect coupon offers the user saw on TV and store them in a database. This may be accomplished by the user selecting the selectable icon 1210, or similar watermark, overlay, or the like, when the coupon offer is presented on the display, or by similar means. In some embodiments, the coupon offers are digital coupons embedded in media content and each coupon comprises a digikey embedded by a provider or source associated with a business associated with the digital coupon. The digikey comprising of a unique digital key for the coupon. The Dooreme application can detect each digikey that is presented or viewed on the user device. In some embodiments, the system may be configured to automatically store any coupon offer associated with a storefront 519 or engagement ad 118 the user engages with that an advertiser wants to present to a user. The user may access them later via the Dooreme application on their computer, tablet, smart phone, or other device that may be configured to work and function as a client server 154, such as control device 160, or the user may access them through the mall interface 1500. The system may keep track of the coupons' expiration dates and remind the consumer before expiration with a notification reminder. The notification reminder is of a predetermined time that may be customized by the user in the user profile 510, for example, a 24-hour notice before the coupon offer expiration date.

In some embodiments, the Dooreme application can remind the user and send a notification when they are in a business, such as a retailer or restaurant, that they have coupon offers stored, e.g., utilizing the GPS (or other location-based services) of the control device 160, or any other device utilizing the Dooreme application described herein. The notification can be a push notification on a mobile device, or the like. In this example embodiment, the Dooreme application reminds the user, with a notification on a mobile device, when the user is within proximity of a facility that the user can cash the coupon, such as a restaurant, a service facility or retail store of any kind. The proximity can be configured at a predetermined distance, and the user can change the value of the predetermined distance with the Dooreme application. The Dooreme application also presents the notification in a scanable code, such as a Quick Response Code ("QR code"), or code that can be factored into a digi-wallet payment feature to provide automated factoring of the value of the coupon with the payment system accepted by the particular business.

At step 2012, the inserter system 1140 may monitor the content displayed on the user system and verify that the ad stamp 119 associated with the correct content advertisement is displayed. The inserter system 1140, at step 2014, may store and report which ad stamp(s) 119 have displayed on the user's display, time, channel, and other user information. At step 2016, the inserter system 1140 may provide the user information obtained in method 2000 to the service provider, user, advertiser, content provider, MVPD, or any entity using the advertisement system 100 or 1100 as described herein with reference to FIGS. 1 and 11, for analytic research. The analytic research that may be performed based on the data obtained may be consumer data analytics, ad performance analytics, and media performance analytics, that will be described further herein.

Figure 21:
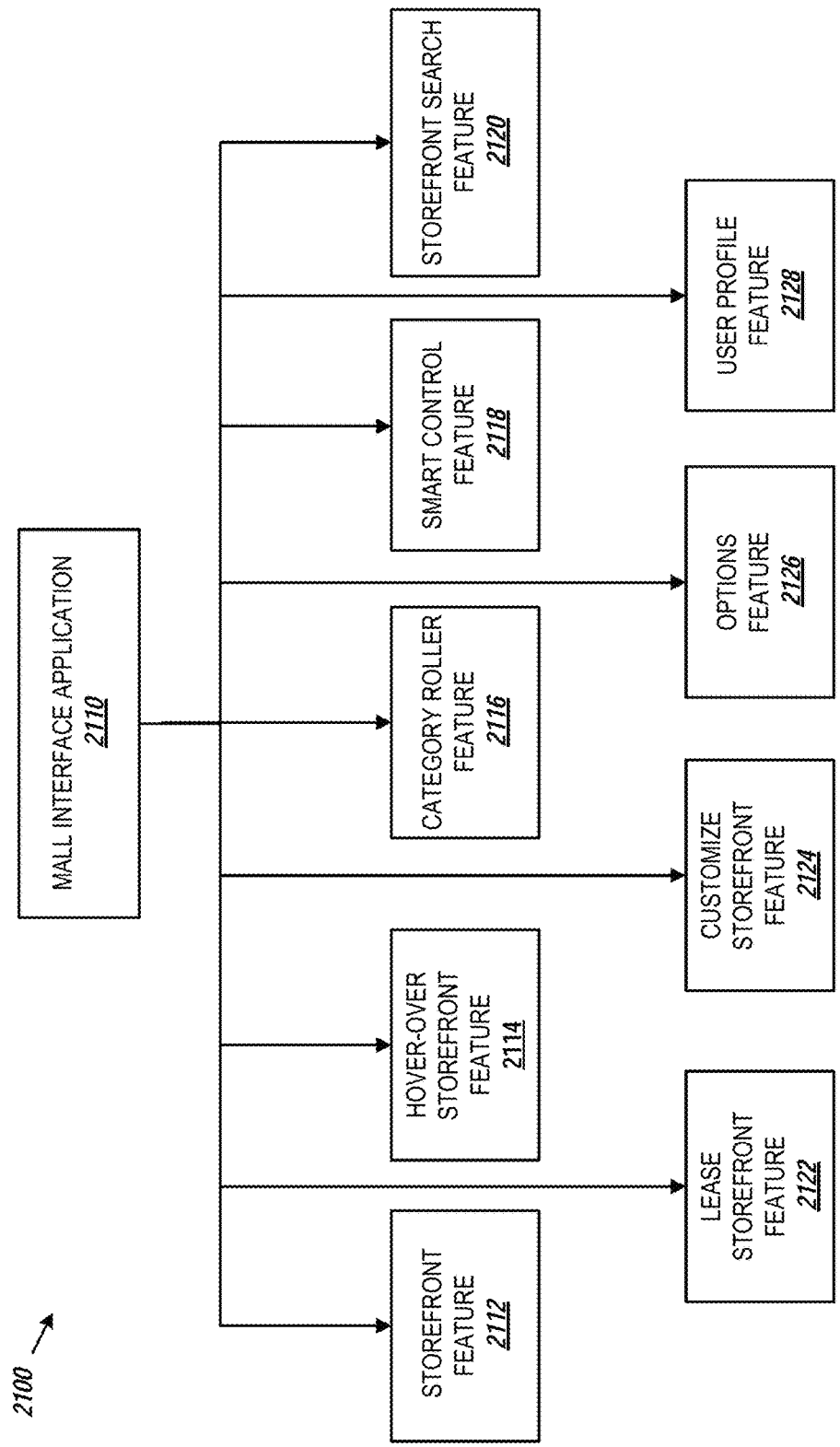
FIG. 21 is a block diagram illustrating a hierarchy of functions implemented by a mall interface application, according to some embodiments of the present disclosure.

FIG. 21 shows a hierarchy 2100 of functions implemented by a mall interface 1500, according to some embodiments of the present disclosure. The mall interface 1500 is performable and executable on a computing device or system such as the service provider system 1110, inserter system 1140, the content system 130, the user system 150, a service provider application running on a OTT box, or any similar system such as those described above with reference to FIGS. 1 and 11, to provide the functionality and use of the mall interface 1500 for a user as described herein with reference to FIGS. 15-17. At 2110, a user opens the mall interface application, such as mall interface 1500, which may be running on the user's television, computer, mobile device, or through a web browser, as described herein. At the mall interface application 2110, the user may select the storefront feature (2112) to access an engagement ad interface 710 or 1300. Alternatively, the user may select the hover-over storefront feature (2114) to access the hover-over storefront window 1610, the user may select the category roller feature (2116) to access the category rollers 1510, the user may select the smart control feature (2118) to access the smart control 1310, or the user may select the storefront search feature (2120) to access the storefront search 1702, as described herein for the mall interface 1500 with reference to FIGS. 15-17. Further, the user may select the lease storefront feature (2122) to access the storefront for lease 1520, the user may select the customize storefront feature (2124) to access the add storefront 1530, the user may select the options feature (2126) to access the mall interface options 1504, or the user may select the user profile feature (2128) to access the user profile 510, as described herein for the mall interface 1500 with reference to FIGS. 15-17.

Figure 22:
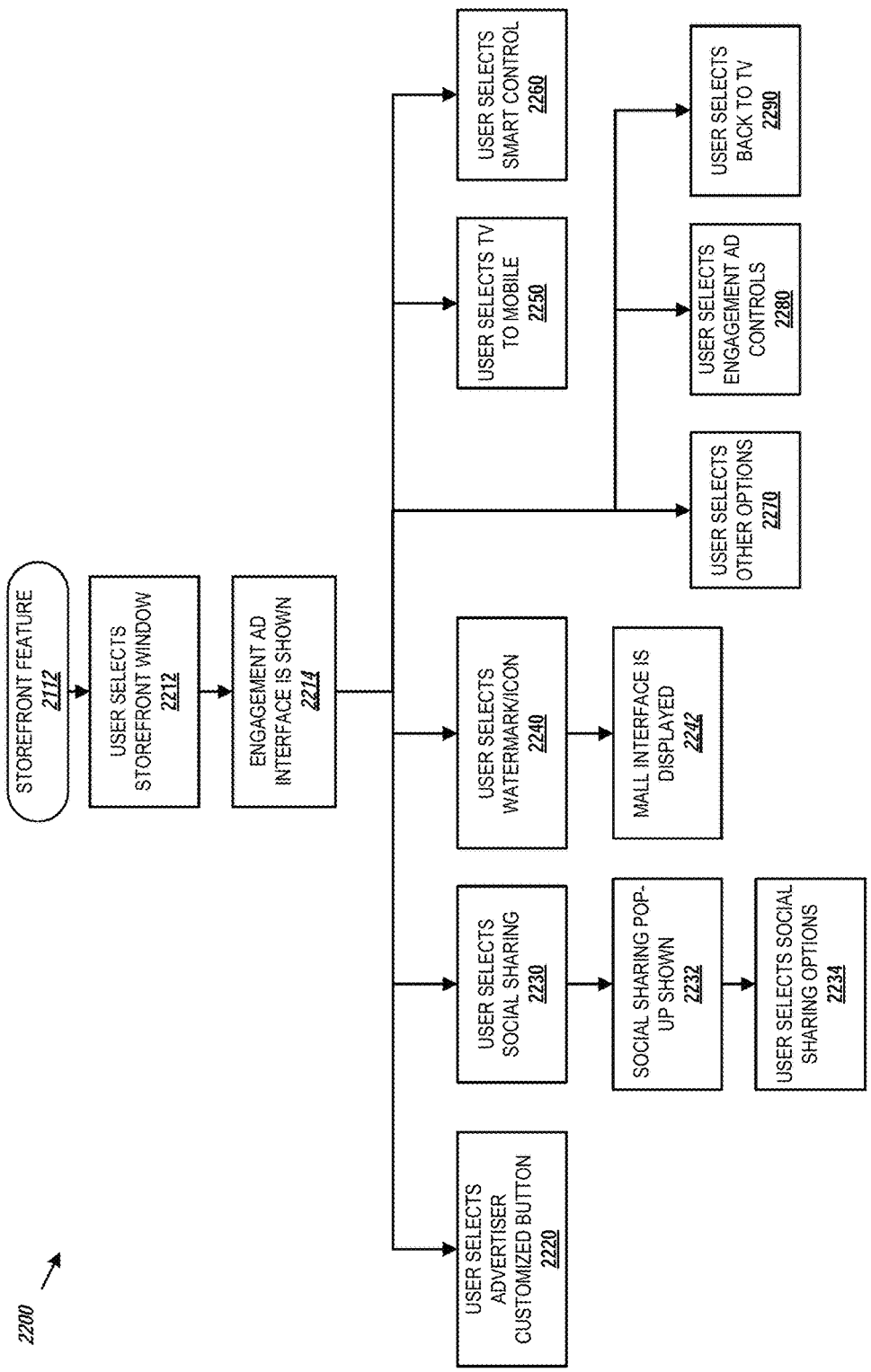
FIG. 22 is a flow diagram illustrating one method for selecting a storefront from the mall interface and using the engagement ad interface, according to some embodiments of the present disclosure.

FIG. 22 shows one example of a method 2200 for selecting a storefront 519 from the mall interface 1500 and using the engagement ad interface 1300, according to some embodiments of the present disclosure. The method 2200 is performable and executable on a computing device or system such as the service provider system 1110, inserter system 1140, the user system 150, the content system 130, a service provider application running on a OTT box, or any similar system such as those described above with reference to FIGS. 1 and 11, to provide the functionality and use of the engagement ad interface 1300 for a user to interact with a selected storefront 519 as described herein with reference to FIGS. 13-14. At the mall interface application 2110, the user may select the storefront feature (2112) to access an engagement ad interface 1300.

At step 2212, the user selects a storefront 519 window shown on the mall interface 1500. At step 2214, the engagement ad interface 1300 is displayed. From the engagement ad interface 1300, at step 2220, the user may select the advertiser customizable option button 1322, as described herein with reference to FIGS. 13-14. At step 2230, the user may select the social sharing button 1410, where at step 2232, the social media interface window 1420 pops up over the engagement ad 118, and then at step 2234, the user may select the social sharing options, as described herein with reference to FIG. 14. At step 2240, the user may select the selectable icon 1210, where at step 2242, the mall interface 1500 is now displayed, as described herein with reference to FIGS. 12-13. At step 2250, the user may select the TV to mobile push 1350, or at step 2260 the user may select the smart control 1310, as described herein with reference to FIG. 13. Alternatively, at step 2270, the user may select other options in the ad information section 1330, or at step 2280 the user may select the engagement ad controls using the video tool 1312, or at step 2290 the user may select back to TV 1320, as described herein with reference to FIG. 13.

Figure 23:
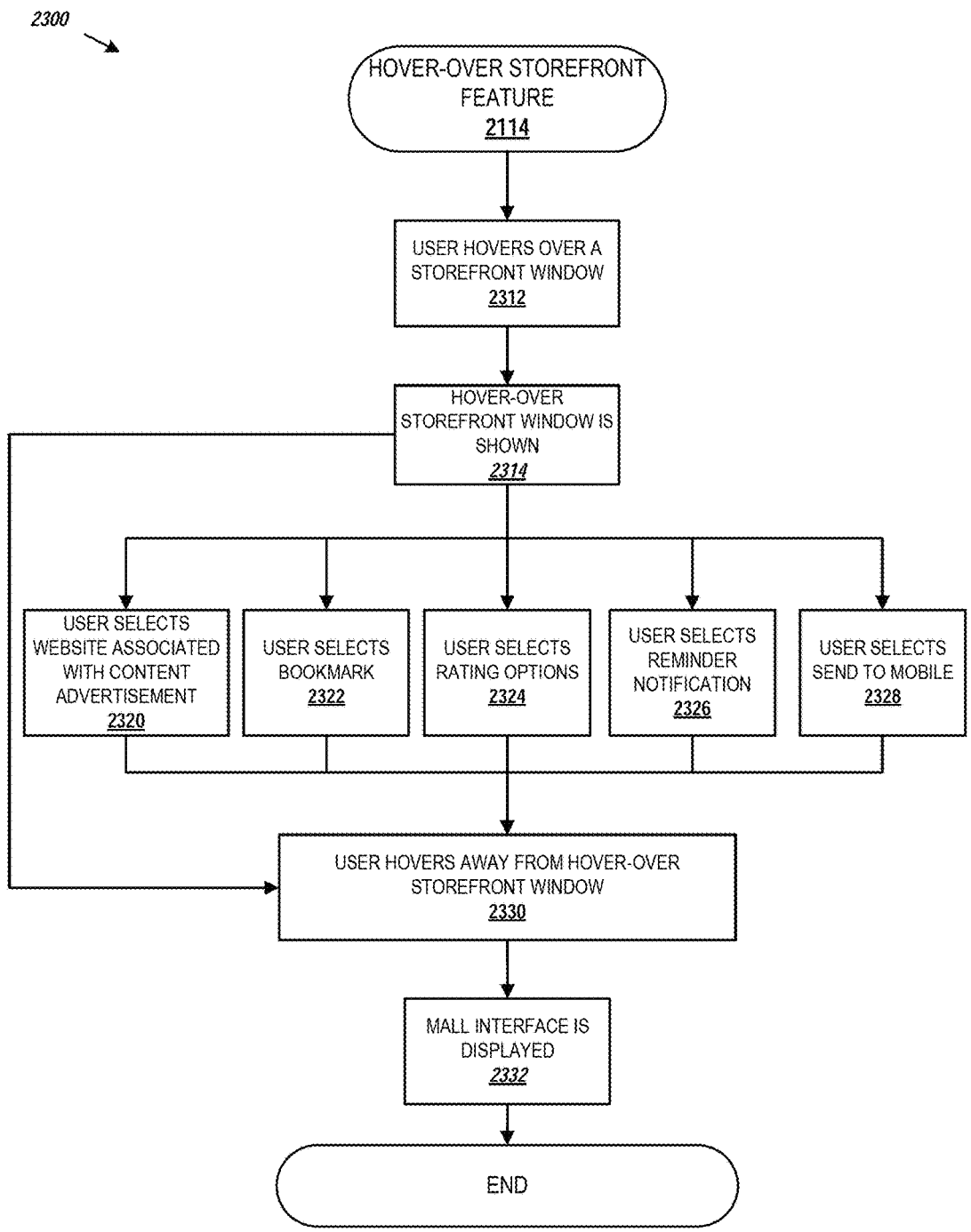
FIG. 23 is a flow diagram illustrating one method for using the hover over storefront window, according to some embodiments of the present disclosure.

FIG. 23 shows one example of a method 2300 for using the hover-over storefront window 1610, according to some embodiments of the present disclosure. The method 2300 is performable and executable on a computing device or system such as the service provider system 1110, inserter system 1140, the content system 130, the user system 150, a service provider application running on a OTT box, or any similar system such as those described above with reference to FIGS. 1 and 11, to access the hover-over storefront window 1610 as described herein with reference to FIG. 16. At the mall interface application 2110, the user may select the hover-over storefront feature (2114) to access the hover-over storefront window 1610.

At step 2312 a user hovers with the mouse on a remote control or computer system, or touches a touchscreen on the control device 160 (or touch and holds depending on the control device 160 settings), over a storefront 519. At step 2314, the hover-over storefront window 1610 is shown as a separate pop-up display window. In the example embodiment as shown in FIG. 16, the hover-over storefront window 1610 only covers a portion of the mall interface 1500, where the user may still see and/or utilize the other functions of the mall interface 1500 that are visible and able to be selected by the user. In another embodiment, the hover-over storefront window 1610 may have most, if not all, of the functions of the engagement ad interface 710 or 1300. The user now has several options to choose from within the hover-over storefront window 1610. For example, at step 2320, the user may select the website associated with the content advertisement or engagement ad shown by selecting the advertiser's brand and/or product logo. At step 2322, the user may select the bookmark feature to save to the user's profile 510, as described herein with reference to FIG. 5. At step 2324, the user may select one of the ratings options, similar to the ratings options in the interest section 722, as described herein with reference to FIGS. 7 and 13. At step 2326, the user may select a reminder notification to set an alarm the user can select from a predetermined list of time allotments, or after completion of the currently viewed media content, or the user can create a customized alarm to remind the user of a particular engagement ad 118, storefront 519, or advertiser they may want to look at a later time. At step 2328, the user may select the TV to mobile push 1350, as described herein with reference to FIG. 13. Following either steps 2320-2328, the user may continue with and select either steps 2320-2328 continuously (not shown), or the user may want to leave the hover-over storefront window 1610 and in step 2330, hover the mouse away from the hover-over storefront window 1610, or tap the touchscreen on the control device 160 away from the hover-over storefront window 1610. Furthermore, the user may also choose to skip steps 2320-2328, and proceed directly to step 2330 from step 2314. Following step 2330, in step 2332, the entire mall interface 1500 is displayed without the hover-over storefront window 1610.

Figure 24:
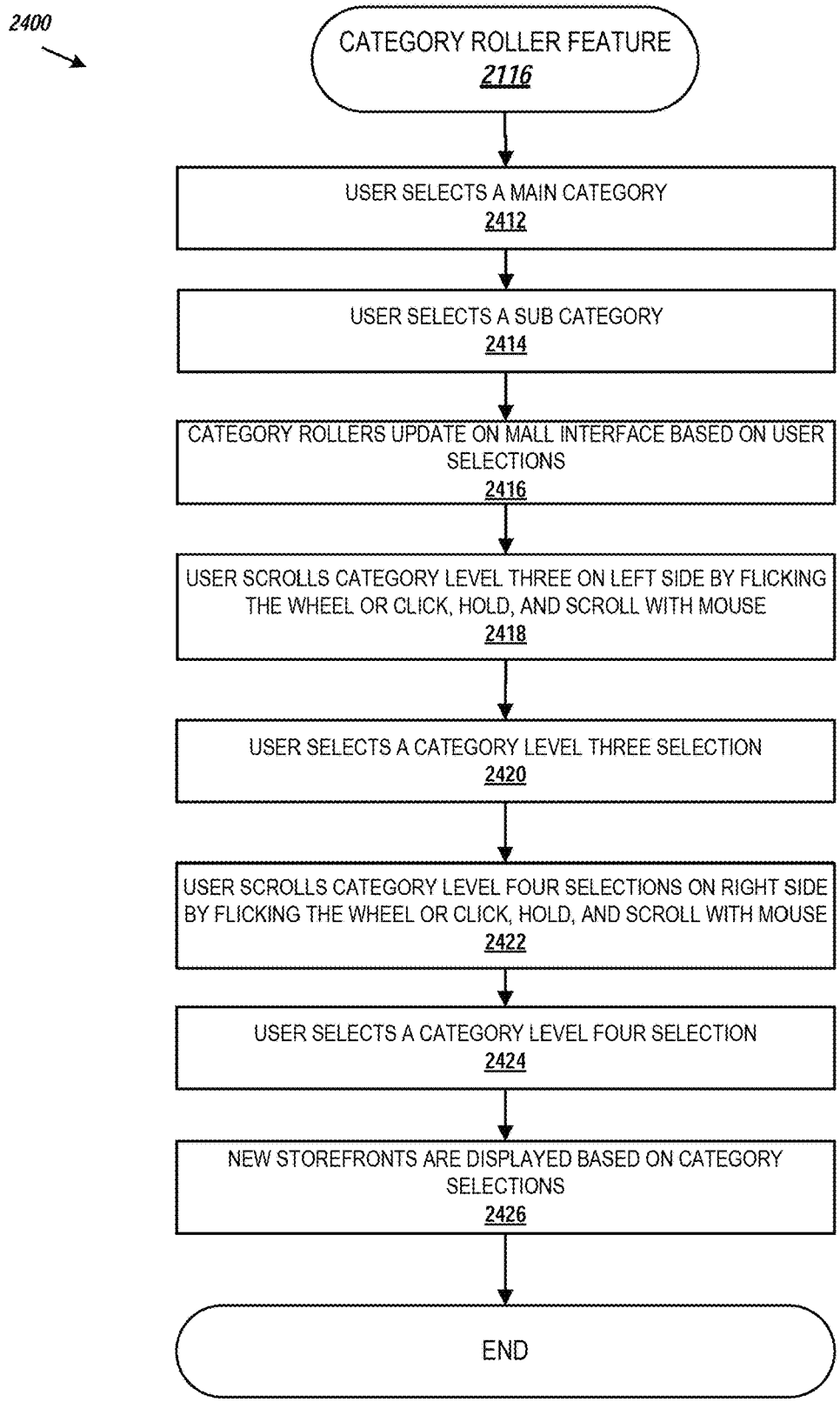
FIG. 24 is a flow diagram illustrating one method for utilizing the category rollers to drill down four levels of categories, according to some embodiments of the present disclosure.

FIG. 24 shows one example of a method 2400 for utilizing the category rollers to drill down four levels of categories, according to some embodiments of the present disclosure. The method 2400 is performable and executable on a computing device or system such as the service provider system 1110, inserter system 1140, the content system 130, the user system 150, a service provider application running on a OTT box, or any similar system such as those described above with reference to FIGS. 1 and 11, to utilize the category rollers to drill down up to four different levels of categories, as described herein with reference to FIG. 15 and the mall interface 1500. At the mall interface application 2110, the user may select the category roller feature (2116) to access the category roller(s) 1510. In the example embodiment, in order to use the category roller(s) 1510 and drill down four levels, the user must make a selection in order to get to the intended third and fourth level of categories that are searched using the category roller(s) 1510. However, in another embodiment, there may be more than one category roller(s) 1510 to drill down several levels, including the first main category and sub category.

In the example embodiment as shown for the mall interface 1500, as described herein with reference to FIG. 15, at step 2412, the user selects a main category from categories 520, and then at step 2414, the user selects a sub category, or second level category from categories 1502. At step 2416, the category roller(s) 1510 either appear or update the category and sub category levels, which are the third and fourth level of categories under the main category selection. In order to utilize the category roller(s) 1510, the user, at step 2418, scrolls category level three on the left side of the category roller(s) 1510 by flicking the wheel, or clicking, holding, and scrolling the wheel with the mouse or with the touchscreen on the control device 160. At step 2420, after the left side of the category roller(s) 1510 has rolled to the users preferred selection, the user makes a category level three selection by clicking on the highlighted category. The category level four selections appear that correlate with the category level selection, and at step 2422, the user scrolls category level four on the right side of the category roller(s) 1510 by flicking the wheel, or clicking, holding, and scrolling the wheel with the mouse or with the touchscreen on the control device 160. At step 2424, the user makes a category level four selection. At step 2426, the mall interface updates the storefront(s) 519 shown with storefront(s) 519 that correlate with the four level category selections by the user.

Figure 25:
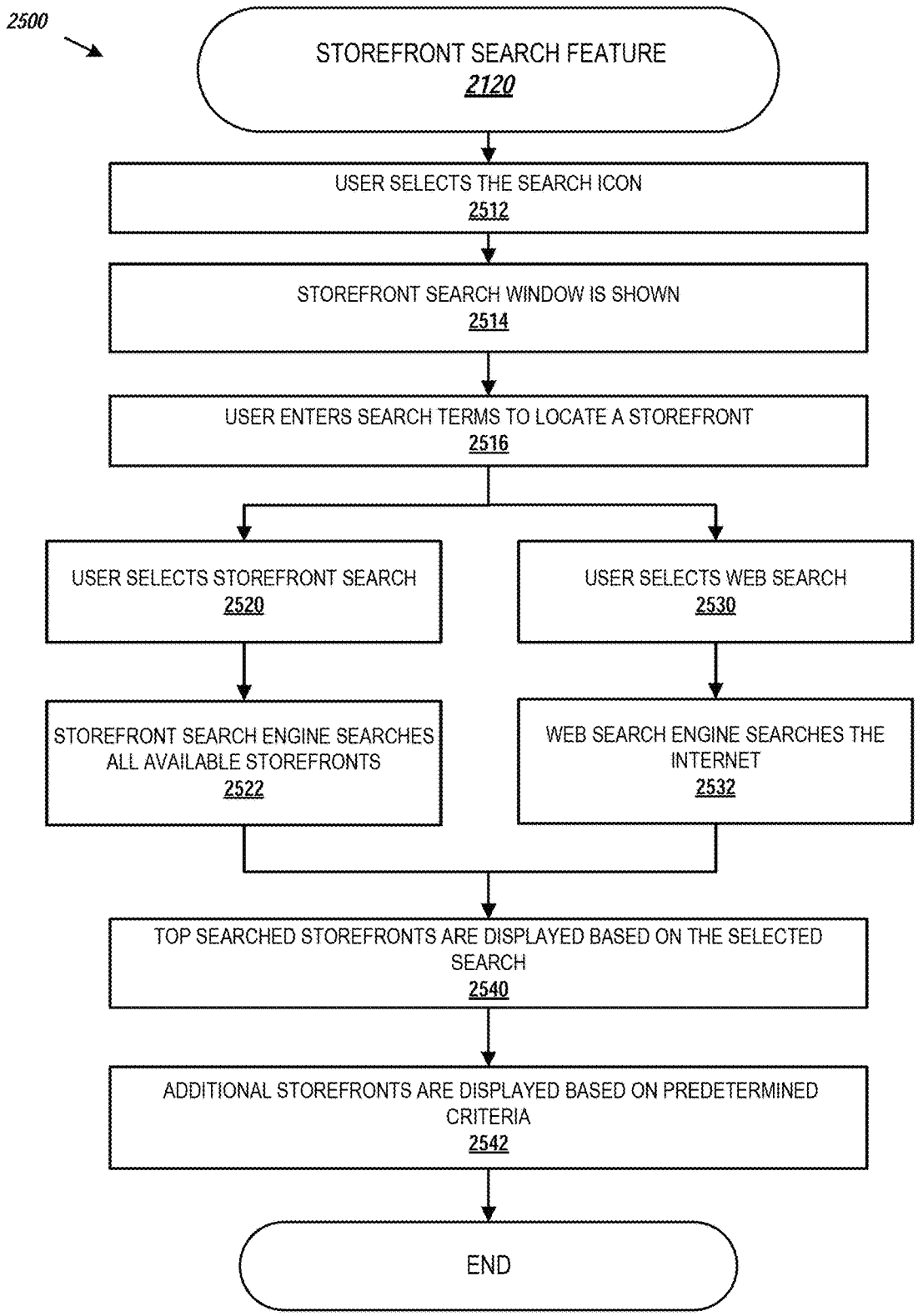
FIG. 25 is a flow diagram illustrating one method for utilizing the storefront search, according to some embodiments of the present disclosure.

FIG. 25 shows one example of a method 2500 for utilizing the storefront search, according to some embodiments of the present disclosure. The method 2500 is performable and executable on a computing device or system such as the service provider system 1110, inserter system 1140, the content system 130, the user system 150, a service provider application running on a OTT box, or any similar system such as those described above with reference to FIGS. 1 and 11, to utilize the storefront search capability as described herein with reference to FIG. 17 and the mall interface 1500. At the mall interface application 2110, the user may select the storefront search feature (2120) to access the storefront search 1702.

At step 2512, the user initiates the storefront search 1702 by selecting the storefront search 1702 icon. At step 2514, in the current embodiment shown in FIG. 17, the search bar 1704, the search storefront button 1710, the search web button 1720, and the storefront search window 1730 are all shown. However, initially the storefront search window 1730 would not show any results until after a search is activated and results are displayed at step 2540 discussed herein. At step 2516, the user enters search terms into the search bar 1704 to search for a storefront desired. The user may select the search storefront button 1710 at step 2520 in order to utilize the service providers search engine feature. At step 2522, the service provider utilizes a visual storefront search engine to search all available storefronts. However, after step 2516, the user may instead select search web button 1720 at step 2530 in order to utilize an internet search engine. At step 2532, the service provider utilizes a web search engine, such as Google, Yahoo, Bing, etc. to search the internet for results of the users storefront search. Following steps 2522 or 2532, at step 2540, the top searched storefronts are displayed based on either search performed. For the search storefront button 1710 selection, the top three search result storefronts 1742a-1742c are displayed in the top searched storefront display 1740. For the search web button 1720 selection, the top three company or product searches on the internet are displayed as the search result storefronts 1742a-1742c top searched storefront display 1740, where the first image found on each website of the top three searches is displayed on each corresponding storefront in the search result storefronts 1742a-1742c in the top searched storefront display 1740. At step 2542, and virtually simultaneously to the user, customized search result storefronts 1752a-c are displayed in the customized search storefront display 1750. Customized search result storefronts 1752a-c are displayed based on predetermined criteria as determined by the service provider, advertiser, content provider, MVPD, or similar entity, as discussed herein with reference to FIG. 17.

In some embodiments, interaction information on the engagement ad interface 710 or 1300, user profile 510, or mall interface 1500 can be logged in the advertisement system 100 or 1100, such as the user system 150, inserter system 1140, service provider system 1110, or the user profile 510, or a combination thereof, and such information may be used by the person, group, or company that logs the information or passed along and/or sold to other persons, groups, or companies that may find the information valuable (e.g., target advertising) by utilizing certain analytical tools to measure interactive information such as consumer data analytics, ad performance analytics, and media performance analytics.

In some embodiments consumer data analytics may include, but are not limited to, consumer rating (individual consumer's tendency to engage ads through advertisement system 1100); market rating (e.g. number and percentage of consumers who engage ads in general); consumer focus (e.g. type of consumer/household interests based on advertisement system 1100 interactions); ad absorb (e.g. frequency and duration of consumer engagement with advertisement system 1100); ad clicks (e.g. number of consumer clicks on the particular ad stamp 119); conversion lift (e.g. consumer search and purchase activities resulting from engagement ads 118); ad viewing (e.g. viewer attention, via clicks on other ads or information within an ad pod or ad break); ad race (e.g. each consumer engagements with competing product engagement ads 118); and program rating (e.g. what shows a target consumer watches most).

In some embodiments ad performance analytics may include, but are not limited to, ad magnetics (e.g. number of times same consumer is attracted to re-engage the same engagement ad 118); ad ranking (e.g. ad engagement score within each ad pod or ad break and same categories 520, 1502, or in the category roller(s) 1510); ad click rating (e.g. number and percentage of consumers who clicked on the particular engagement ad 118); ad tune-ins (e.g. number and percent of televisions on which the engagement ad 118 actually appeared); ad hooks (e.g. consumer engagements with each feature within the engagement ad interface 710 or 1300); ad race (e.g. ranking of same consumer engagements with competing product engagement ad 118); ad goal (e.g. conversion lift—the rate and value of ecommerce engagements following engagement ad 118); and ad return-on-investment (ROI) (e.g. measures engagement ad 118 views, clicks, engagements and transactions versus advertisement cost).

In some embodiments media performance analytics may include, but are not limited to, stamp landings (e.g. indicates number and region of televisions and program where lead ad 138 appeared); program rating (e.g. indicates which media content inspired more ad stamp 119, engagement ad interface 1300 or 710, or mall interface 1500 clicks); mall rating (e.g. number and percentage of consumers who browse or shop via mall interface 1500); mall page rating (e.g. viewing ranking of every page within mall interface 1500); storefront rating (e.g. percentage, number and duration of consumer engagements with a storefront 519); hover-over rating (e.g. percentage, number and duration of consumer engagement with hover-over storefront window 1610); and engagement rating (e.g. percentage, number and duration of engagements with engagement ad interface 1300 or 710).

The advertisement systems 100 and 1100 described above can be used to display a variety of other content types and/or images. For example (without limitations), the advertisement systems 100 and 1100 may be used to offer/display breaking news items or "Amber Alerts" when appropriate, where a "lead notice" similar to a "lead ad" of short duration will be broadcast and will allow a "stamp' associated with the notice/alert similar to an "ad stamp" to be displayed and become accessible to the user.

The advertisement systems 100 and 1100 described above, in conjunction with other available consumer info marketing data, or in conjunction with data that the advertisement systems 100 and 1100 may be able to about individual consumers through interactivity with the system, may be able to provide unique content to individual consumers or to target a group of consumers with similar interests. For example, advertisement systems 100 and 1100 could be used for personalized notifications where, for example, Facebook could send a notification to alert an individual user that information by friends was placed on the user's Facebook page. Additionally, by way of example, an engineering company that is looking to hire engineers could send a short lead ad 138 to only prospect engineers, with an ad stamp 119 that the engineers could click on to apply online for the job.

The auction targeting for the advertisement system 1100, described herein, may provide a major disruption, shift and solution in media distribution. Auction targeting may enable media distributors to offer lower monthly subscription fees for consumers who consume more content. The advertisement system 1100 may offer to advertisers in real-time a consumer profile describing the type of consumer who is about to consume the content. The profile information may include age and income bracket, general location, highlight of relevant active searches and purchase history through advertisement system 1100, without allowing personal consumer information to be shared. Advertiser may be able to bid, in real time, a certain fee to publish their content advertisements on-demand to that particular consumer. Content distributors can increase their profits through this auction feature, when the total amount of bided fees for the published ads exceeds the cost the distributor pays to the content provider/owner for distribution to the particular consumer. The consumer can commit to watching, and decide when to watch, these advertisements before, during, or at some time, within a time window, after consuming the content. Consumer must click on each of the selected advertisements in the engagement ad interface 1300 to watch the advertisement. This functionality ensures advertisement consumption verification. This feature of selecting the time to watch, may be disabled for consumers who do not keep their commitments to watch advertisements.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed:

1. A system for distributing media content, the system comprising:
    a processor; and
    a memory coupled to the processor, wherein the memory stores executable instructions for causing the processor to present a mall interface on a display of a user system, the mall interface comprising a plurality of storefronts and a search function,
detect a user selection of the search function,
display a customized search result storefront based on the user selection,
present a selectable icon on the display of the user system, wherein the selectable icon is configured to be selected by a user through a control device,
subsequent to a user selecting the selectable icon, present on the display of the user system an engagement ad interface, wherein the engagement ad interface displays an engagement ad,
monitor whether the user watched the full duration of the engagement ad, and
provide a user a smart control comprising a selectable icon displayed on a mobile device and the display of the user system, wherein initiating the smart control on the display automatically launches a mobile application on the mobile device, and wherein initiating the smart control on the mobile application on the mobile device automatically launches the mall interface on the display.

2. The system of claim 1, wherein the mall interface is configured to be selected by a user by the control device.

3. The system of claim 1, wherein the mall interface comprises at least one of a category selection, a user profile, a smart control, and a hover-over window.

4. The system of claim 3, wherein the smart control comprises an application on the control device, the application configured to allow a user to control the mall interface via the control device.

5. The system of claim 3, wherein the category selection comprises a category roller, the category roller comprising a category wheel and configured to allow a user to scroll through multiple levels of categories by flicking the category wheel via the control device.

6. The system of claim 1, wherein the customized search result storefront comprises sponsored advertisements based on the search function.

7. The system of claim 1, wherein the search function comprises a storefront search.

8. The system of claim 1, wherein the search function comprises an internet search.

9. The system of claim 1, wherein the search function comprises an integrated storefront/internet search.

10. A computer-implemented method comprising:
presenting a mall interface on a display of a user system, the mall interface comprising a plurality of storefronts and a search function;
detecting a user selection of the search function;
displaying a customized search result storefront based on the user selection,
presenting a selectable icon on the display of the user system, wherein the selectable icon is configured to be selected by a user through a control device;
subsequent to a user selecting the selectable icon, presenting on the display of the user system an engagement ad interface, wherein the engagement ad interface displays an engagement ad;
monitoring whether the user watched the full duration of the engagement ad; and
providing a user a smart control comprising a selectable icon displayed on a mobile device and on the display of the user system, wherein initiating the smart control on the display automatically launches a mobile application on the mobile device, wherein initiating the smart control on the mobile application on the mobile device automatically launches the mall interface on the display.

11. The computer-implemented method of claim 10, wherein the mall interface is configured to be selected by a user by the control device.

12. The computer-implemented method of claim 10, wherein the mall interface comprises at least one of a category selection, a user profile, a smart control, and a hover-over window.

13. The computer-implemented method of claim 12, wherein the smart control comprises an application on the control device, the application configured to allow a user to control the mall interface via the control device.

14. The computer-implemented method of claim 12, wherein the category selection comprises a category roller, the category roller comprising a category wheel and configured to allow a user to scroll through multiple levels of categories by flicking the category wheel via the control device.

15. The computer-implemented method of claim 12, wherein the customized search result storefront comprises sponsored advertisements based on the search function.

16. The computer-implemented method of claim 10, wherein the search function comprises a storefront search.

17. The computer-implemented method of claim 10, wherein the search function comprises an internet search.

18. The computer-implemented method of claim 10, wherein the search function comprises an integrated storefront/internet search.

* * * * *